United States Patent [19]
Klosky et al.

[11] 3,905,022
[45] Sept. 9, 1975

[54] DATA ENTRY TERMINAL HAVING DATA CORRECTION MEANS

[75] Inventors: John Patrick Klosky, Mentor; James Lucian Maynard, Northfield, both of Ohio

[73] Assignee: Addressograph Multigraph Corporation, Cleveland, Ohio

[22] Filed: June 26, 1973

[21] Appl. No.: 373,777

[52] U.S. Cl. .............................................. 340/172.5
[51] Int. Cl. .......................... G06f 1/00; G06f 13/00
[58] Field of Search ..................... 340/172.5, 324 A

[56] References Cited
UNITED STATES PATENTS

| | | | |
|---|---|---|---|
| 2,911,624 | 11/1959 | Booth | 340/174 |
| 3,456,243 | 7/1969 | Cass | 340/172.5 |
| 3,465,299 | 9/1969 | Schellenberg | 340/172.5 |
| 3,501,746 | 3/1970 | Vosbury | 340/172.5 |
| 3,518,629 | 6/1970 | Frankel | 340/172.5 |
| 3,544,975 | 12/1970 | Hunter | 340/172.5 |
| 3,636,519 | 1/1972 | Heath | 340/172.5 |
| 3,643,252 | 2/1972 | Roberts | 340/324 A |
| 3,651,481 | 3/1972 | Evans | 340/172.5 |
| 3,683,359 | 8/1972 | Kleinschanitz | 340/324 A |
| 3,699,531 | 10/1972 | Heimann | 340/172.5 |

Primary Examiner—Gareth D. Shaw
Assistant Examiner—James D. Thomas
Attorney, Agent, or Firm—Robert B. Sundheim; Harry M. Fleck, Jr.

[57] ABSTRACT

A data entry terminal is disclosed for use in a data communication system. The terminal includes a content addressable memory for storing a variable character length data field and an associated field separator. A message comprised of at least one data field and a separator is outputted from the memory in a character series sequence in the order in which the characters were entered into the memory. The length of the message may be shortened by deleting the data characters in the last entered data field.

14 Claims, 39 Drawing Figures

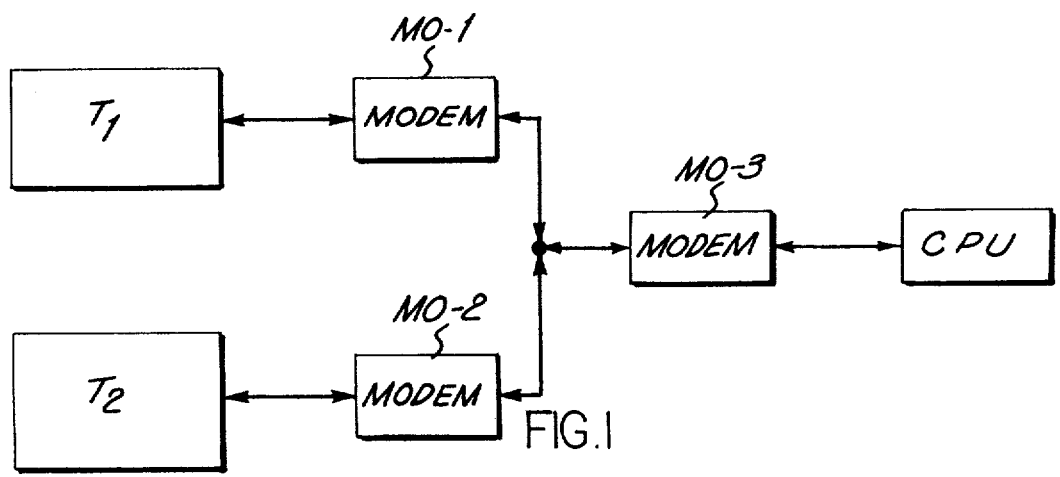
FIG.1
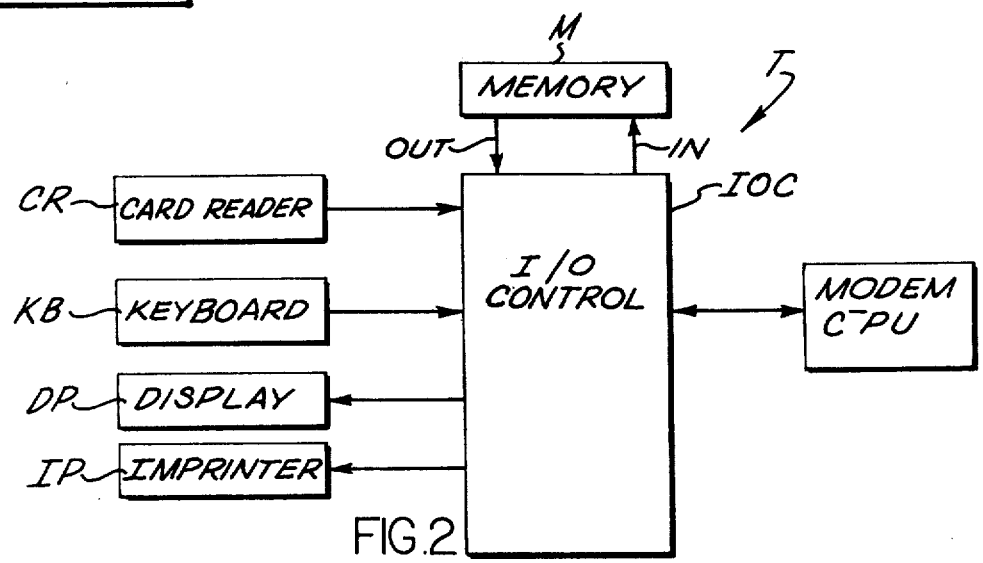
FIG.2
FIG.3
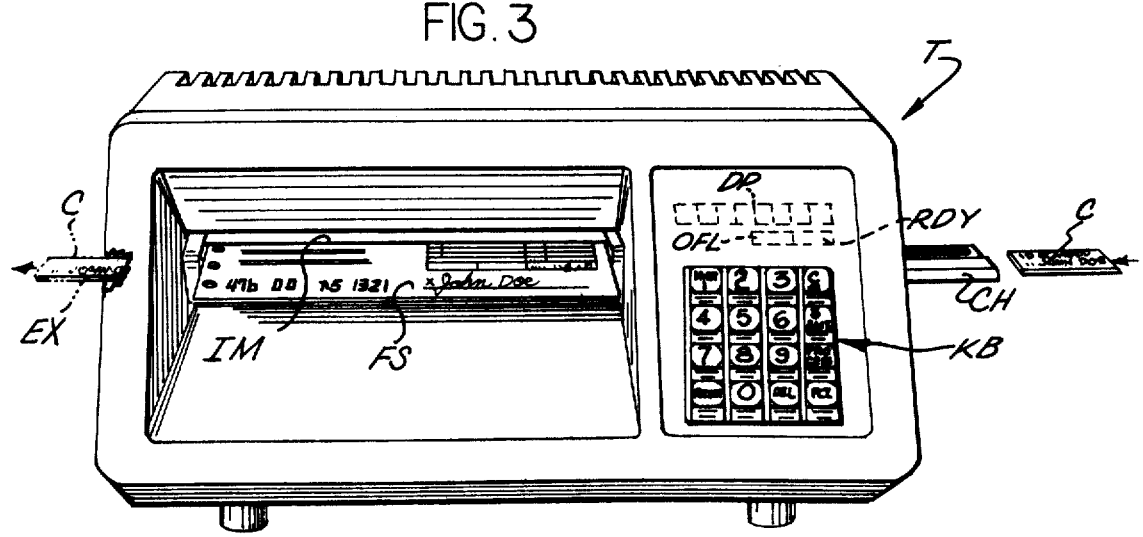

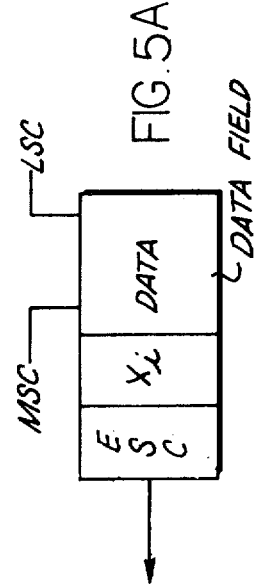

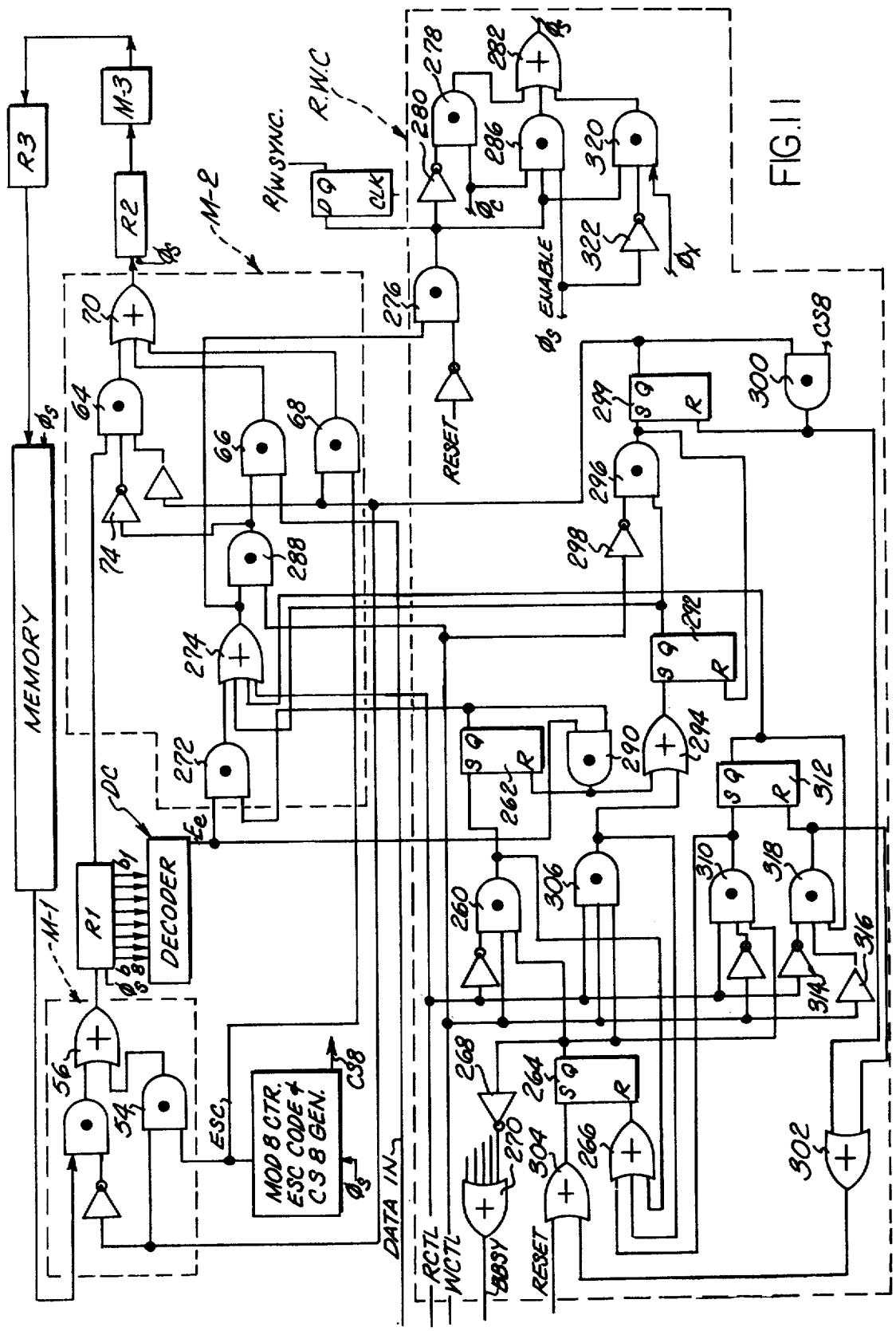

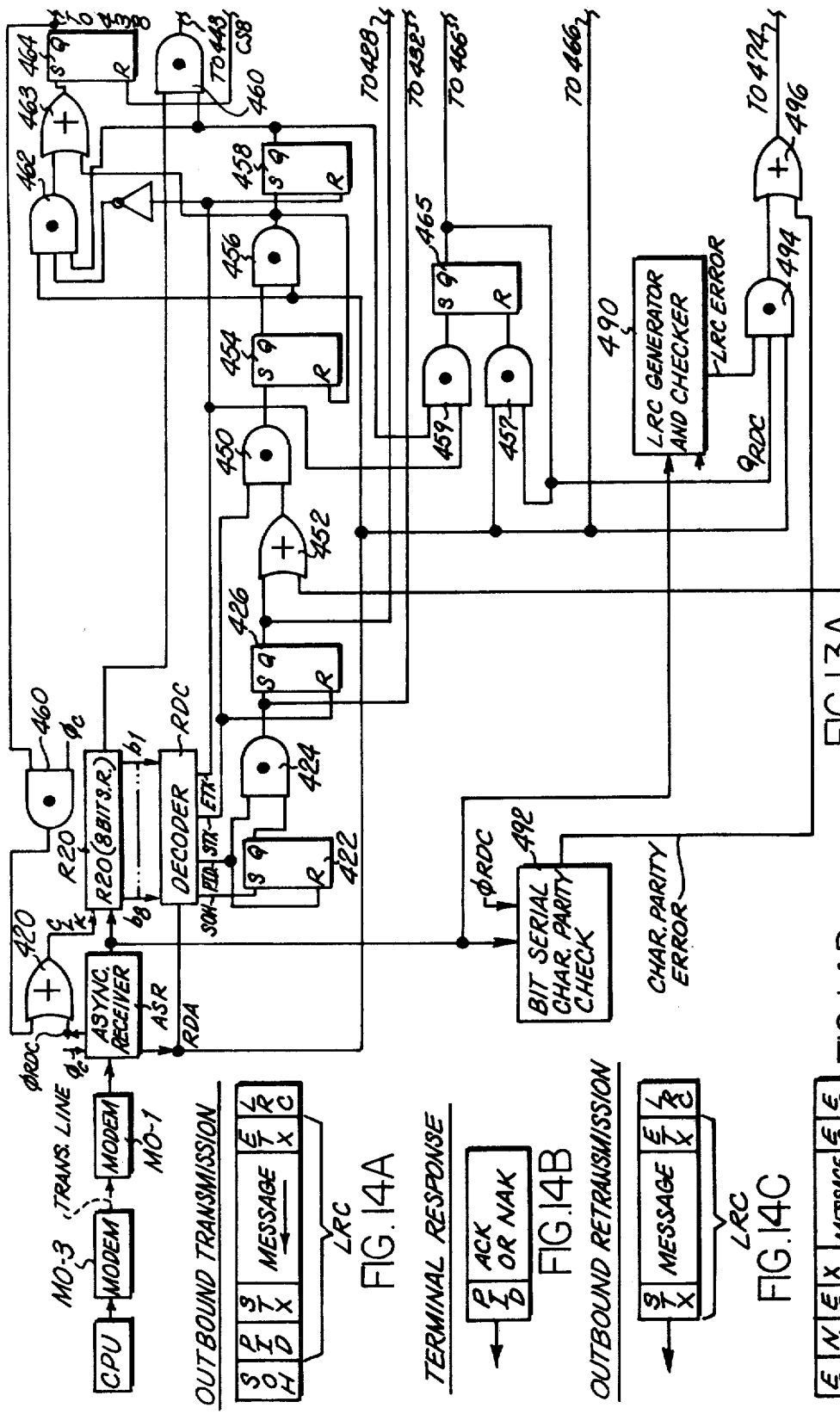

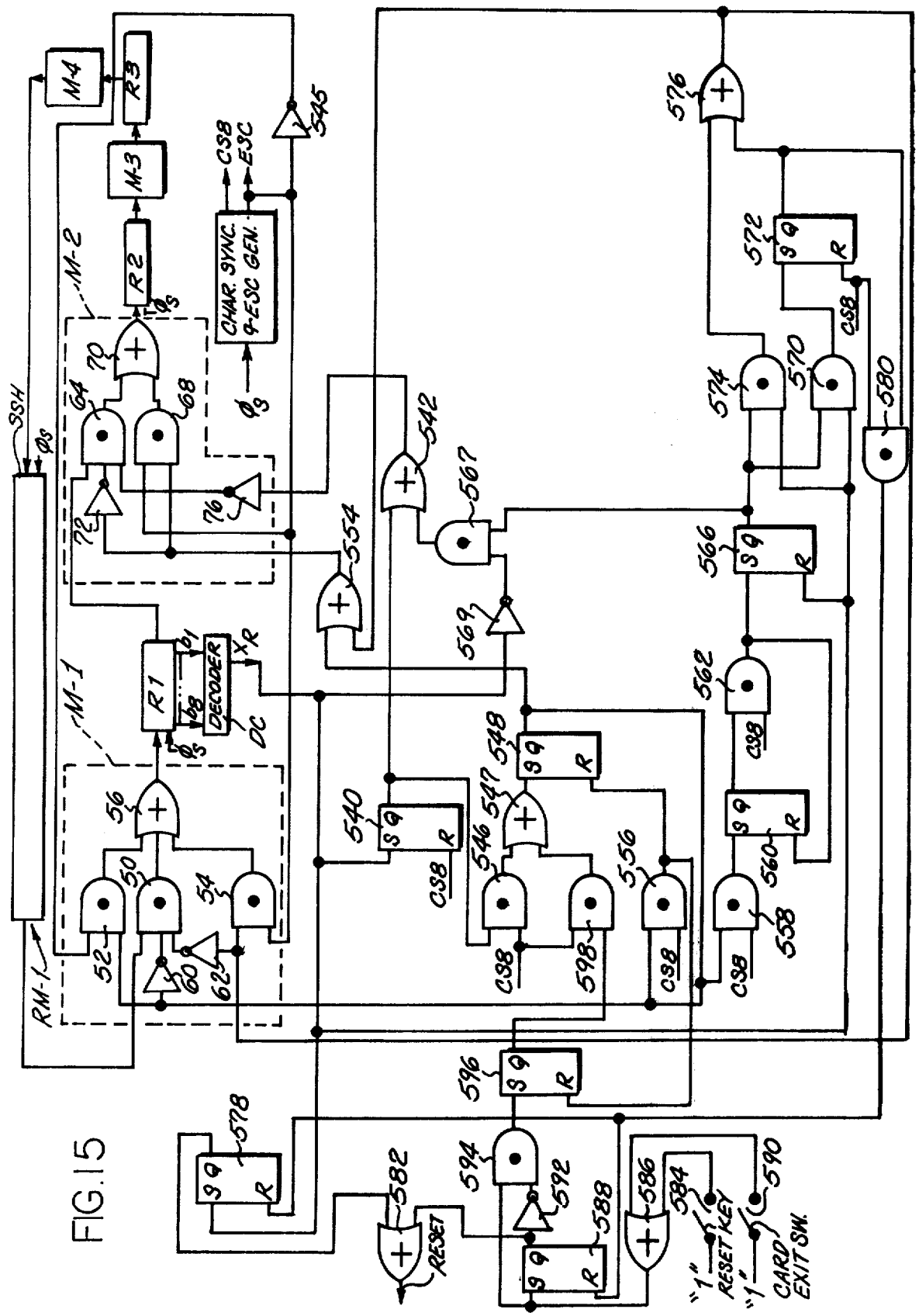

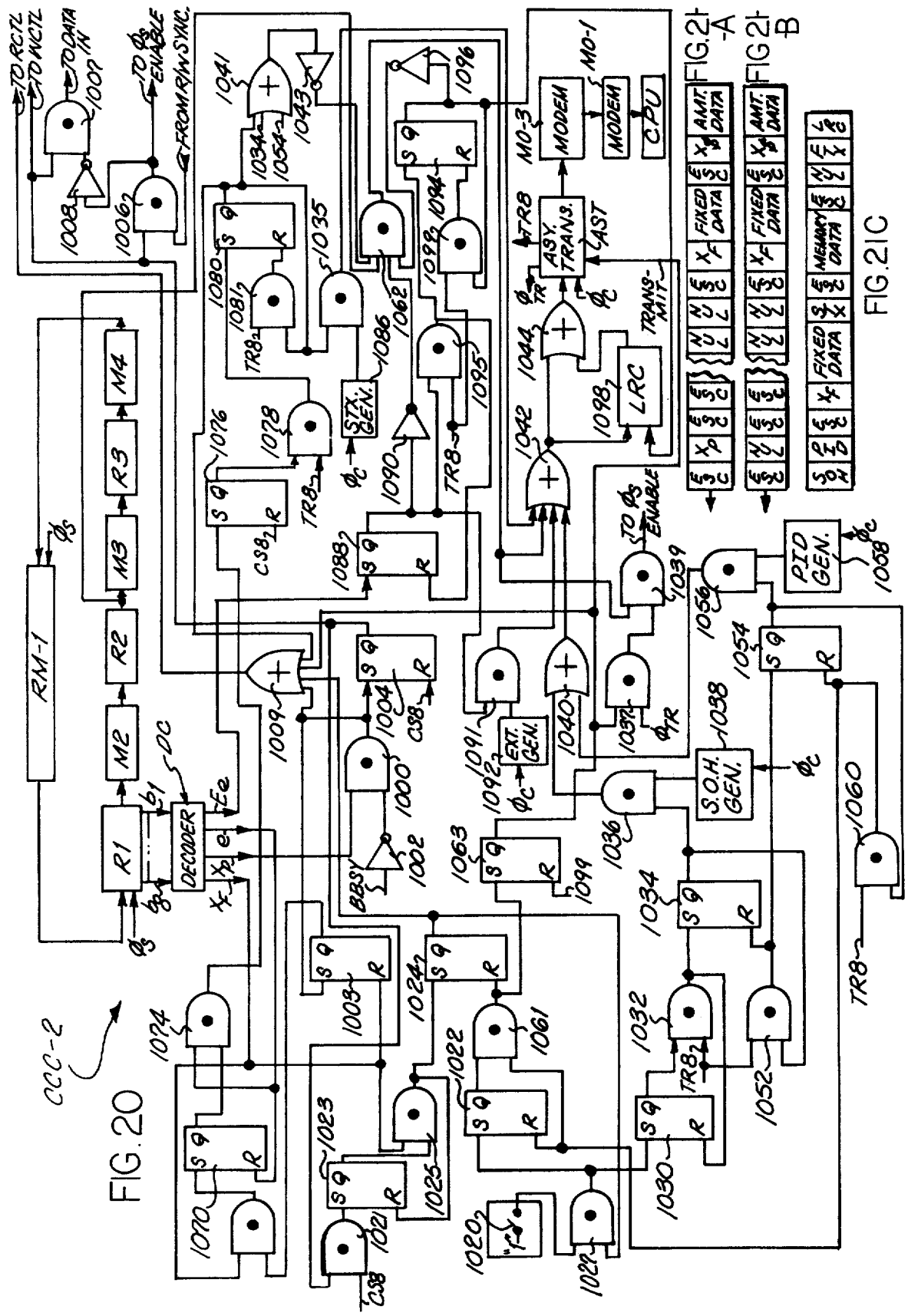

FIG. 23

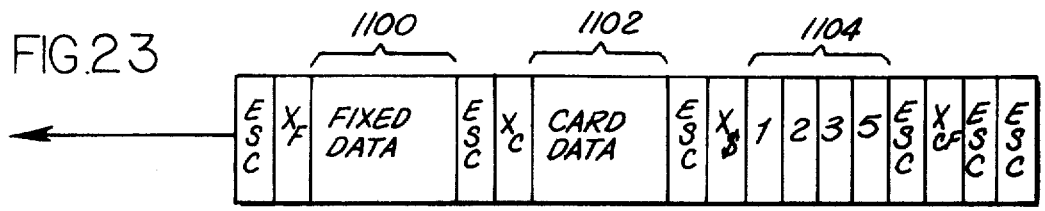

FIG. 24

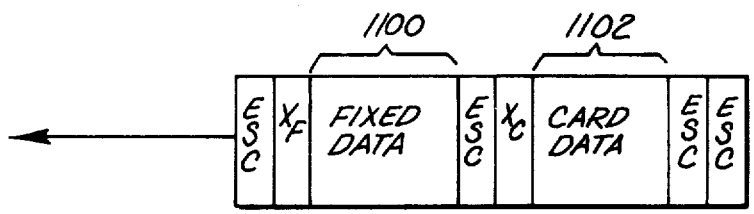

| | | R0 | R1 | R2 | R3 | R4 | R5 |
|---|---|---|---|---|---|---|---|
| | STATE | | | | | | |
| 1ST. | BEFORE | ESC | $X_{CF}$ | ESC | 5 | 3 | 2 |
| | AFTER | ESC | NUL | NUL | $X_{CF}$ | ESC | 3 |
| 2ND. | BEFORE | NUL | $X_{CF}$ | ESC | 3 | 2 | 1 |
| | AFTER | NUL | NUL | NUL | $X_{CF}$ | ESC | 2 |
| 3RD. | BEFORE | NUL | $X_{CF}$ | ESC | 2 | 1 | $X_\$$ |
| | AFTER | NUL | NUL | NUL | $X_{CF}$ | ESC | 1 |
| 4TH. | BEFORE | NUL | $X_{CF}$ | ESC | 1 | $X_\$$ | ESC |
| | AFTER | NUL | NUL | NUL | $X_{CF}$ | ESC | $X_\$$ |
| 5TH. | BEFORE | NUL | $X_{CF}$ | ESC | $X_\$$ | ESC | CARD DATA |
| | AFTER | NUL | NUL | NUL | $X_{CF}$ | ESC | ESC |
| 6TH. | BEFORE | $X_{CF}$ | ESC | ESC | CARD DATA | CARD DATA | CARD DATA |
| | AFTER | NUL | NUL | ESC | ESC | CARD DATA | CARD DATA |

DATA ENTRY TERMINAL HAVING DATA CORRECTION MEANS

This invention relates to a data entry terminal for use in a data communications system and more particularly to improvements in such a terminal whereby corrections or modifications may be made to messages entered into the terminal.

The invention is particularly applicable for use in modifying or correcting data entered into a terminal from a keyboard in a credit authorization and verification system and is described in conjunction therewith. However, it is to be appreciated that the invention may be employed in various applications wherein it is desirable to modify or correct data entered into a terminal from various means.

Data entry terminals typically employ a memory for storing data characters entered from a data source, such as a keyboard. A message may take the form of a plurality of data characters entered into the memory for subsequent use, such as for transmission to a data processor or for controlling an operation. It is of considerable concern that the message be comprised of data characters which present correct information. If the information requires correction, it is desirable to provide a means for modifying the memssage, as by deleting characters from the message so that a corrected message may be entered into the memory.

It has been known in the art to correct measages entered into a memory by a technique known as backspacing. In this operation, the message is presented for correction such that the data characters are presented in a series sequence in the order in which they were entered into the memory. Before the message is reinserted into the memory, the last data character in the message is removed by a delete control circuit. With each backspace operation, a data character is deleted from the message. Known techniques for backspacing have limited flexibility in that they delete only one data character with each actuation of a delete control or delete a fixed number of data characters. Such techniques, however, do not provide the capability of deleting data characters independent of the length of the data field involved.

It is therefore, an object of the present invention to provide a data entry terminal having means for deleting data characters from a data field independent of the length of the data field.

It is a still further object of the present invention to provide a data entry terminal employing a content addressable memory for storing at least one variable length data field and an associated field separator and wherein a message may be modified by deleting the last entered data field.

It is still further object of the present invention to provide a data entry terminal having circuitry for responding to a clear command stored in the terminal memory for deleting the data characters in the last entered data field.

SUMMARY OF THE INVENTION

In accordance with the present invention, the data terminal employs a content addressable memory for storing a memssage comprised of at least one variable length data field and an associated field separator. The data characters in the message are outputted from the memory in a series sequence in the order in which they were entered so that a field separator precedes the first entered character in its associated data field. The outputted message is normally re-entered into the memory by way of a controllable re-entry gate. A message modifier serves to shorten the outputted message by deleting the last entered data field, independent of the length of the data field. This is accomplished by controlling the re-entry gate to prevent re-entry of the last entered character in the last entered data field each time the message is being re-entered into the memory.

DESCRIPTION OF THE DRAWINGS

The foregoing and other objects and advantages of the invention will become more readily understood from the following description of the preferred embodiments of the invention when read in conjunction with the accompanying drawings, which are a part hereof, and wherein:

FIG. 1 is a general block diagram of a data communications system to which the present invention may be applied;

FIG. 2 is a general block diagram illustrating the manner in which a terminal may be structured in accordance with the present invention;

FIG. 3 is a perspective view illustrating the structure of a housing for the terminal;

FIG. 4 is a schematic illustration of a keyboard arrangement that may be employed;

FIGS. 5A–5D are schematic illustrations showing the manner in which data fields, field definers, and messages may be formatted in accordance with the invention;

FIG. 11 is a schematic-block diagram illustration of a read/write control circuit;

FIGS. 13A and 13B taken together present a schematic-block diagram illustration of the receiving portion of the communications control circuit;

FIGS. 14A–14D illustrate various message formats used in describing the operation of the communications control circuit;

FIG. 15 is a schematic-block diagram illustration of a memory reset control circuit;

3

Figure 22:
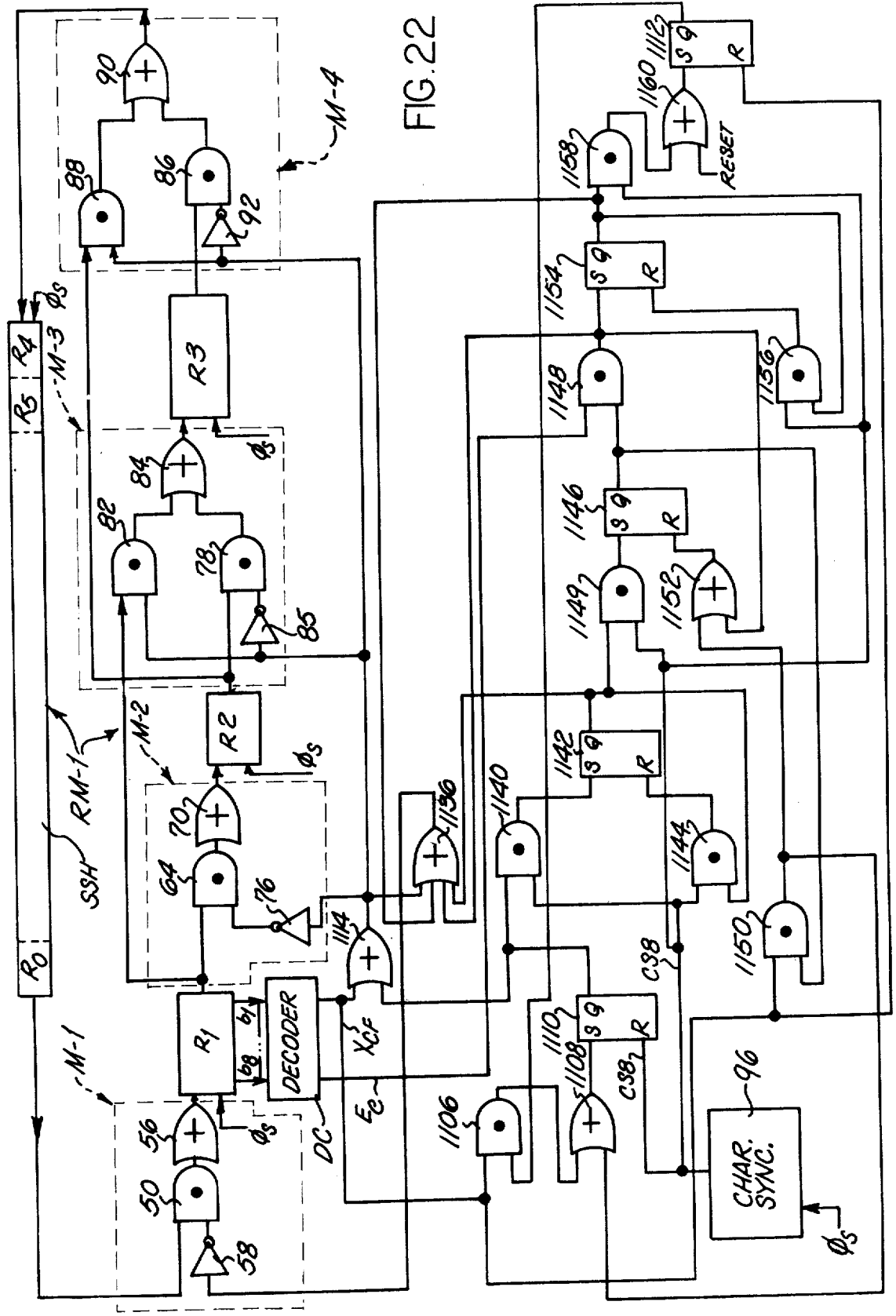

FIG. 20 is a schematic-block diagram illustration of the transmitting portion of a communications control circuit;

FIGS. 21A, 21B and 21C are schematic illustrations showing message formats used in describing the operation of the circuitry of FIG. 20;

FIG. 22 is a schematic-block diagram illustration of a clear last field control circuit;

FIG. 23 is a schematic illustration of a message format used in describing the operation of the circuitry of FIG. 22;

FIG. 24 is a schematic illustration of a message format used in conjunction with the description of operation of the circuitry in FIG. 22; and FIG. 25 is a table used in conjunction with describing the operation of the circuitry in FIG. 22.

GENERAL DESCRIPTION

Reference is now made to the drawings wherein the showings are for purposes of illustrating preferred embodiments of the invention only and not for purposes of limiting same. FIG. 1 illustrates one application of the present invention when applied to a data communication system. Here terminals $T_1$ and $T_2$, constructed in accordance with the invention, are incorporated in a system for two-way communication with a central data processing unit CPU. Data transmission is facilitated with conventional modems MO-1, MO-2, and MO-3.

The terminal structure is generally illustrated in FIG. 2 wherein an input/output control circuit IOC serves as a control for transferring information between input peripherals and output peripherals through a memory M. The output peripherals may include, for example, a visual display DP and an imprinter IP. Communication is also had with the CPU which serves as an input/output peripheral to the terminal. These peripherals communicate with each other through memory M by way of the input/output control IOC. Data may be entered into the memory M from an information reader such as the card reader CR, or may be entered from a manually operated keyboard KB or from another input peripheral. In addition, data may also be entered into the memory through the input/output control IOC from the CPU. Data entered into memory M from one of these peripherals may be communicated to an output peripheral such as the visual display DP or the imprinter IP. Also, data entered into the memory may be communicated to the CPU. The terminal structure and the operation of the various peripherals will be described in greater detail hereinafter.

Reference is now made to FIG. 3 which provides a schematic illustration of the terminal housing. The terminal illustrated herein is a data capture terminal and in the particular illustration, shown, serves as a credit authorization terminal. Thus, the terminal serves to receive a credit card C by way of an entrance chute CH. The card is transported through the terminal housing by suitable means, not shown, during which identification indicia on the card is read by a card reader and then the card is transported to an imprint station. At the imprint station, a printer mechanism serves to imprint data on a formset FS after which the card is exited from an exit EX. The data read from the card by the card reader is entered into the terminal's memory M. A readout display DP is provided on the front section of the terminal housing and includes an eight position display for displaying keyboard entries or, on command, displaying message characters written into the terminal memory from another peripheral, such as the CPU. In addition, a condition display is provided underneath the readout data display DP and this condition display includes an off line display OFL and a ready display RDY. It is contemplated that the terminal may be used in an off line mode when a breakdown occurs in the communications link with the CPU, and, in such status, the off line display OFL will be energized. The ready display RDY is energized whenever the terminal has been reset and a formset is not present in the formset port and a credit card is not present in the imprint station.

As shown in FIGS. 3 and 4, a keyboard KB is provided for use by an operator in manually entering data into the terminal memory. The keyboard KB is a 16 pad keyboard and includes 10 numeric keys 0–9, a definition key FCT and five function or control keys which are labeled card number, $ amount, process, reset, and delete. Numeric key 1 serves in combination with the function key FCT to provide an imprint command. Actuation of these keys enters data into the memory. As will be brought out in greater detail hereinafter, the keyboard may be used for entering numeric data into the memory, for clearing the last field entered into the memory, for initiating data transmission to the CPU, for defining fields and for resetting the terminal. All keyboard entries are entered into the terminal memory. All of these keyboard entries, except for reset and delete, are displayed with the visual display DP. The function of these keys will be described in greater detail hereinafter.

A typical operation of the terminal T, when used as a data capture terminal in a point of sales transaction, would be for the operator to insert a credit card C into the input chute CH. The card is then transported within the terminal housing and read by the card reader. If the card is not machine readable, the card number may be entered into the memory from the keyboard by actuating the card number key and the appropriate numeric keys. To enter the transaction amount, the operator actuates the amount key and appropriate numeric keys. These keyboard entries are all displayed on the read out display DP. When the operator has entered appropriate data into the terminal, he may then actuate the process key to cause the information in the memory to be communicated to the CPU. The sequence of data entry is not fixed, as will be described in detail hereinafter. It is contemplated that the CPU will be programmed to provide credit authorization and verification and to process the amount data, as by an automatic billing system. Data transfer from the terminal to the CPU may be accomplished in various ways, such as with burst or discrete polling or by string polling. In any event, once the terminal has been polled, the data will be transferred from the terminal to the CPU for central processing. It is also contemplated that the CPU will then acknowledge the message and transmit data and instructions to the terminal. This will be written into the terminal memory. For example, the CPU may instruct the terminal to perform an imprint function and to imprint on a formset FS the transaction amount together with an authorization number. This is all written into the terminal's memory, decoded and used to control the imprinter. Having now briefly described the general overall operation of the system, attention is now directed to specific detail of the message structure and circuitry employed.

MEMORY MESSAGE STRUCTURE

Data entered into the memory is stored as tagged, variable length, nonsequenced data fields such as the account number, transaction amount and so on. As shown in FIG. 5A, each data field is tagged or prefixed with a field definer code. The field definer code may take the form of single of multiple characters. In the embodiment illustrated, the designation $X_i$ will be hereinafter referred to as a field definer or command where the subscript $i$ identifies the type of field or command involved, i.e. $X_C$ defines that the data in the field is card data and $X_p$ is a process command. However, a character in the memory will serve as a field definer or command only when it is used in conjunction with a second character referred to herein as an escape character ESC. The ESC character precedes the field definer or command character and thereby serves to identify the character as an $X_i$ character. The ESC character also serves to separate fields.

One reason for utilizing an ESC character followed by an $X_i$ character is to minimize the number of characters in the vocabulary that must have a definition unique to the terminal. For example, in a seven bit binary system there are 128 different characters available for a vocabulary. If 50 of these characters are employed as field definers or commands, then only 78 characters would be left for data or information characters. By utilizing one character, referred to herein as an ESC character, any character in the 128 character vocabulary may be used in combination with the ESC character to define a field or command leaving 127 characters to be used as data characters.

Both field definers and commands will be entered into the memory and some will be transmitted to the CPU. They will both contain an (ESC) ($X_i$) sequence where ($X_i$) defines a command or defines the contents of the data in the field that follows the sequence. For purposes of definition, the following field definers will be used in the description of the terminal herein.

$X_C$ - defines that the data in the field is card data.
$X_F$ - defines that the data in the field is fixed data.
$X_S$ - defines that the data in the field is the $ amount.
$X_\#$ - defines that the data in the field is the account number.
$X_A$ - defines that the data in the field is the authorization number.

In addition to these field definers, commands for terminal control operation are also entered into the memory. These commands are:

$X_{CPU}$ - This command is inserted into the memory by the communications control circuit when the terminal accepts outbound data from a CPU. It defines the beginning of outboard data and is used as a memory reference by the communications control circuit.

$X_p$ - This command is inserted into the memory by depression of the PROCESS key on the keyboard, or presented into the memory from the CPU. It initiates the sending of inbound data to the CPU. When this command is in memory, it will be detected by circuitry in the communications control circuit which serves to transmit the data in the memory to the CPU, when polled.

$X_D$ - This command is entered into the memory by the CPU. It initiates a visual display of data following this command.

$X_I$ - This command is inserted into the memory from the keyboard for an off line transaction or by the CPU for an on line transaction. it will initiate the imprinting of the formset.

$X_{CF}$ - This command is entered into the memory by depression of the delete key. When detected in memory, this command serves to initiate deletion of the last field or command entered into the memory.

$X_R$ - This command in the memory will initiate action to reset the memory.

Reference is again made to the representations in FIGS. 5A through 5D which illustrate typical fields and messages as stored in memory and messages as transmitted to the CPU or received from the CPU. Referring again to FIG. 5A, it is seen that each data field is preceded by a two character sequence (ESC) ($X_i$), where ($X_i$) defined the nature of the following field data. The data illustrated in FIG. 5A has the most significant character being first in the data train and the least significant character being last. Each character is stored or entered into the memory with the least significant bit first. Since all fields are tagged, they may be entered into the memory without regard to constraints as to sequence. It is preferred, however, that the first field entered into the memory include the fixed data such as the data which identifies the terminal itself. Thus, for example, in the message shown in FIG. 5B, the first data field is the fixed data field which is preceded by an ESC character and a fixed data field definer $X_F$. Preferably, this fixed data field is entered into the memory immediately after clearing the memory so that this data is placed in the memory before other data is entered. Thereafter, however, there is no particular sequence in which data fields are entered into the memory. For example, as shown in FIG. 5B, the card data field is shown as being preceded by the card field definer $X_C$. This particular field and field definer are entered from a card reader. FIG. 5B also illustrates a transaction amount data field being preceded by a transaction amount field definer $X_S$. The order of these two fields could be reversed. If this is the last entry into the memory, the operator may atuate the process key to enter the process command $X_P$, which is also preceded by an ESC character. As shown in FIG. 5B, the process command is followed by two ESC characters in succession which defines the end of message.

Reference is now made to the inbound message illustrated in FIG. 5C. This is a typical message as transmitted from the terminal to the CPU. It will be noted that the message includes a start of header character SOH, and a poll identification character PID which precedes the fixed data field. In addition, a start of text character STX is inserted into the meassage after the fixed data field. It will also be noted that the process command $X_P$ is replaced by a NUL character to prevent the message from being reprocessed by the terminal. This NUL character is followed by an end of test character ETX and then by a longitudinal redundancy character LRC. This message is shown by way of illustration only and it is to be understood that other messages with varying formats may be provided.

Reference is now made to FIG. 5D which illustrates a typical outbound message for the type which might be received by the terminal. Again, this is a message shown for illustrative purposes only and is not indicative of the only type of message which can be received by the terminal. This message includes SOH and PID characters followed by a start of text character STX. The CPU has indicated verification of credit authorization by including an imprint command, $X_F$, in the message. The transaction amount to be imprinted is indicated in the message by a transaction field definer $X_S$ followed by the transaction amount data field. It should be noted that this particular transaction amount field need not be identical to the field originally transmitted to the CPU but may be a different transaction amount in dependence upon what the CPU determined should be sent to the terminal for imprinting. In this outbound message, the transaction amount field is followed by an authorization number field. This is an authorization number determined by the CPU and may, for example, help in providing an audit trail for each transaction. Also, the CPU may instruct the terminal to display data in the message and in doing so, would provide a display command $X_D$ followed by the display data field.

The messages discussed above, with respect to FIGS. 5B, 5C, and 5D, are illustrative only for facilitating an understanding of this invention. Specific message structure and the purpose of the structure will be described in greater detail hereinafter where appropriate. It is to be noted, however, that each data field is preceded by an (ESC) ($X_i$) character sequence which serves to identify the field. Also, an (ESC) ($X_i$) character sequence is used to define each command. The data fields may be of variable length with the exception of the fixed data field. Other than the fixed data field, these fields are entered into the terminal memory in a nonstructured sequence. In response to a process command being detected, the message will be read out in the order in which it was entered and will be transmitted to the CPU with transmission characters added, such as characters SOH, PID, STX, ETX, and LRC. The same type of characters are removed from the message received from the CPU before entering the message received from the CPU before entering the message into the terminal memory.

TERMINAL STRUCTURE IN GENERAL

Figure 6:
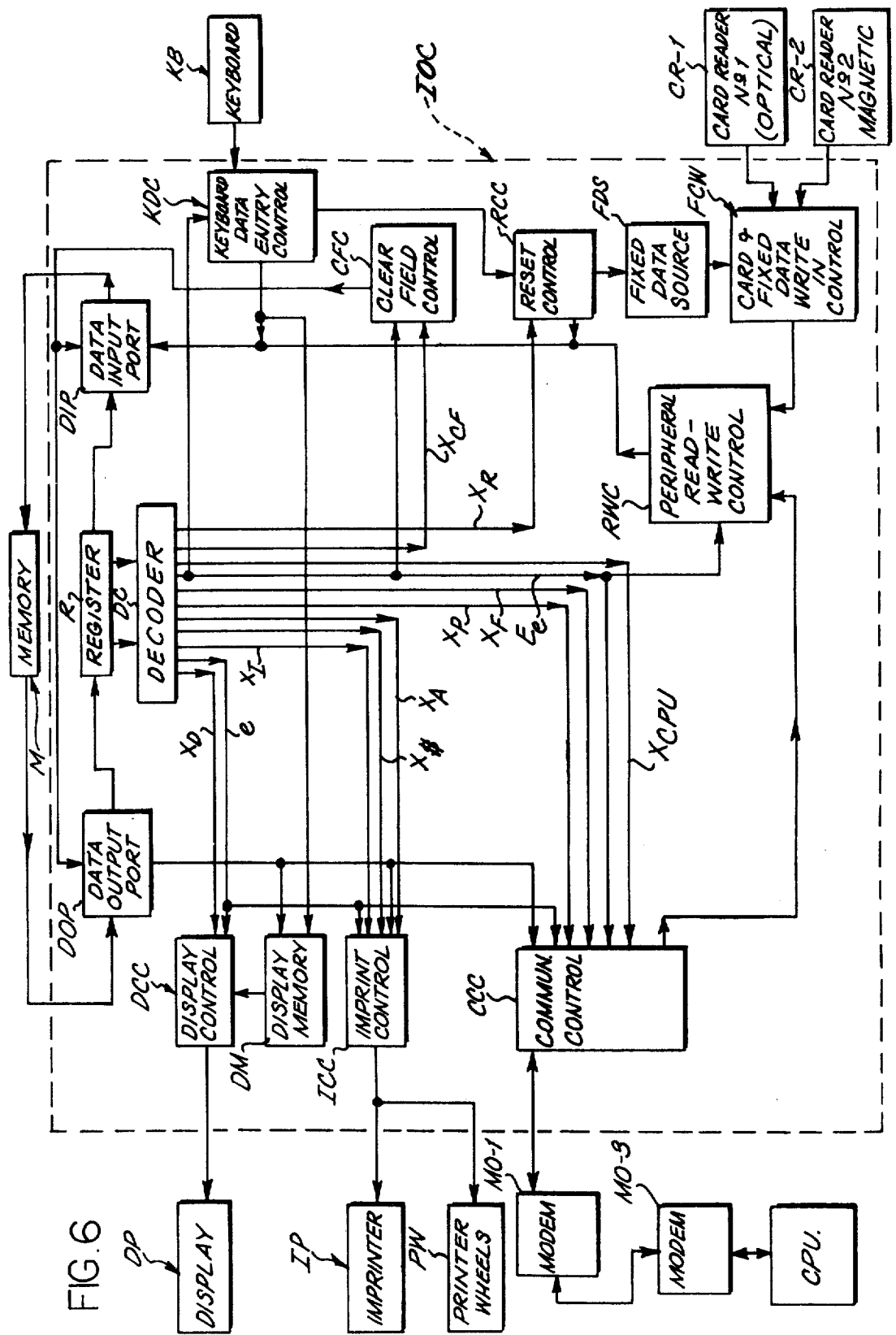
FIG. 6 is a general block diagram illustration of the terminal in somewhat greater detail than that illustrated in FIG. 2.

Reference is now made to FIG. 6 which provides a block diagram illustration of the terminal structure in greater detail than that set forth in FIG. 2. In accordance with this invention, the terminal serves as a data capture terminal to capture data from various locations and buffer the data for transmission to a CPU through a communications link. Data is entered into the terminal in a data capture environment from such input peripherals as a keyboard and a card reader, and buffered for transmission to a CPU. The terminal may accept responses transmitted from the CPU and output the messages with a visual display and an imprinter.

As shown in FIG. 6, the input peripherals may include a keyboard KB which, as shown in FIGS. 3 and 4, includes a 16 pad keyboard. Data input may also be obtained from card readers such as an optical card reader CR-1 and a magnetic card reader CR-2. It is contemplated that these card readers serve the function of optically or magnetically reading card data such as account number and other data useful by a CPU in a data capture environment, such as credit authorization or billing. Data obtained from these input peripherals is entered into the terminal memory M through control of the input/output control circuit IOC. This data may be transmitted to the CPU in response to actuation of the process key. Data may also be entered into the terminal memory M from the CPU through the input/output control IOC. Data to be outputted to an output peripheral from the memory may be applied to the terminal display DP and/or to an imprinter IP operating in conjunction with a suitable printing mechanism, including printer wheels PW.

Data entered into the terminal from one of the peripherals is routed to the memory M through a data input port DIP and data in memory is routed to one of the output peripherals or the CPU through a data output port DOP. Memory M is preferably a content addressable memory and in the embodiment to be described herein is preferably a recirculating memory with the data output port and a data input port being located in the recirculation path together with a decoder for decoding the characters in the recirculation path. This may be implemented by employing a register R in the recirculation path and providing a decoder DC which serves to decode the data in register R. The preferred form of the circuitry involved in this recirculation path will be described in greater detail hereinafter.

Memory M is cleared or reset in response to actuation of the reset key or to a reset command $X_R$ in the memory. When the reset command is located in register R, it is decoded by decoder DC which actuates a reset control circuit RCC which operates to reset the memory by writing NUL characters into the memory. The reset command may be entered into the memory from the CPU.

After the memory has been cleared or reset, the first field that is entered into the memory is the fixed data field. This fixed data field may include a fixed character word length field providing data identifying the specific terminal and follows the fixed data field definer character $X_F$. This data is entered into the memory when the reset control circuit RCC actuates a fixed data source FDS after the memory has been cleared. The fixed data source FDS enters the fixed data field definer and the fixed data field into the memory under the control of a card and fixed data write-in control circuit FCW and a peripheral read/write control circuit RWC. After the fixed data has been entered into memory, the remaining data fields may be entered without regard to sequence. For example, the next information to be read into the memory may be obtained from keyboard KB by the operator actuating a field definer key and then a variable length data field by actuating various data keys. This data is entered into the memory under the control of the keyboard data entry control circuit KDC and is also displayed on the terminal display DP. This is achieved by entering the keyboard actuated data into a display memory DM under the control of the keyboard data entry control circuit KDC. The information in the display memory DM is displayed on the terminal display DP under the control of a display control circuit DCC.

The optical card reader CR-1 or the magnetic card reader CR-2 will operate to read optical or magnetically encoded cards for such information as card number and will enter a card field definer $X_C$ into the memory followed by the card data field under the control of circuits FCW and RWC. If both readers CR-1 and CR-2 are provided, it is contemplated that the information written into the memory will include an optical card reader field definer $X_C$ and a magnetic card field definer $X_M$. In any event, after all of the data is entered into the memory, it is contemplated that the operator will actuate the process key so as to enter the process command $X_P$ into the memory. A typical message entered into the memory may take the form of that as shown in FIG. 5B.

The message stored in memory M will be transmitted to the CPU under the control of a communications control circuit CCC when decoder DC detects a process command $X_P$ in register R. The communications control circuit CCC serves to insert transmission characters into the message before it is transmitted to the CPU. As shown in the illustrative inbound message of FIG. 5C, these inserted characters include that the start of header character SOH, a poll identification character PID, a start of text character STX, an end of text character ETX and a longitudinal redundancy character LRC. This message is transmitted to the CPU through suitable modems MO-1 and MO-3.

The communications control circuit CCC also serves to receive messages from the CPU to be entered into the terminal memory. A typical message to be received may take the form of that shown in FIG. 5D. In such case, the communications control circuit removes from this message such characters as the start of header character SOH, the poll identification character PID, the start of text character STX, the end of text character ETX and the longitudinal redundancy character LRC. The remaining portions of the message shown are entered into the memory through the data input port DIP under the control of the communications control circuit CCC and the peripheral read/write control circuit RWC. Defined portions of this message in the memory are outputted for display by the terminal display DP and printed on a formset through the operation of the printing wheels PW and imprinter IP. When the decoder DC decodes an imprint command $X_I$, the control circuit ICC is activated to control the operation of the printing wheels PW and imprinter IP. The imprint control circuit ICC is operated in response to various control signals in addition to the imprint command and, for example, provides a printing wheel set up operation for the transaction amount in accordance with transaction amount data field and the authorization number. If the decoder DC decodes a display command $X_D$, then the terminal display DP is operated to display data under the control of the display control circuit DCC.

If the operator makes a mistake in entering data from the keyboard or otherwise desires to change the entered data, he can accomplish this by deleting only the last field entered by actuation of the delete key. This enters a delete or clear last field command $X_{CF}$ into the memory. When this is detected by decoder DC, it actuates a clear last field control circuit CFC which operates upon the recirculation path to clear the last entered field from the memory.

The foregoing description of the various control circuits in the input/output control IOC, has been presented in a general descriptive manner and not with respect to the details of the circuitry or the operation involved. Having presented this generalized description, attention is now directed to the following detailed description of these control circuits.

TERMINAL MEMORY

The terminal memory M is preferably implemented as a content addressable memory for storing both variable and fixed length data fields. This may be implemented in various ways such as with a recirculating shift register or a random access memory. As will be described below, the preferred implementation is in the form of a recirculating memory. However, implementation may have taken the form of a random access memory wherein data is outputted from the memory in the same order in which data was entered into the memory. It is not necessary that the data in the memory be restructured since the message format will preferably include tagged fields. If desired, however, the information in the memory may be restructured from the order in which it was entered so that the data output will always be provided in a fixed field sequence.

Figure 7:
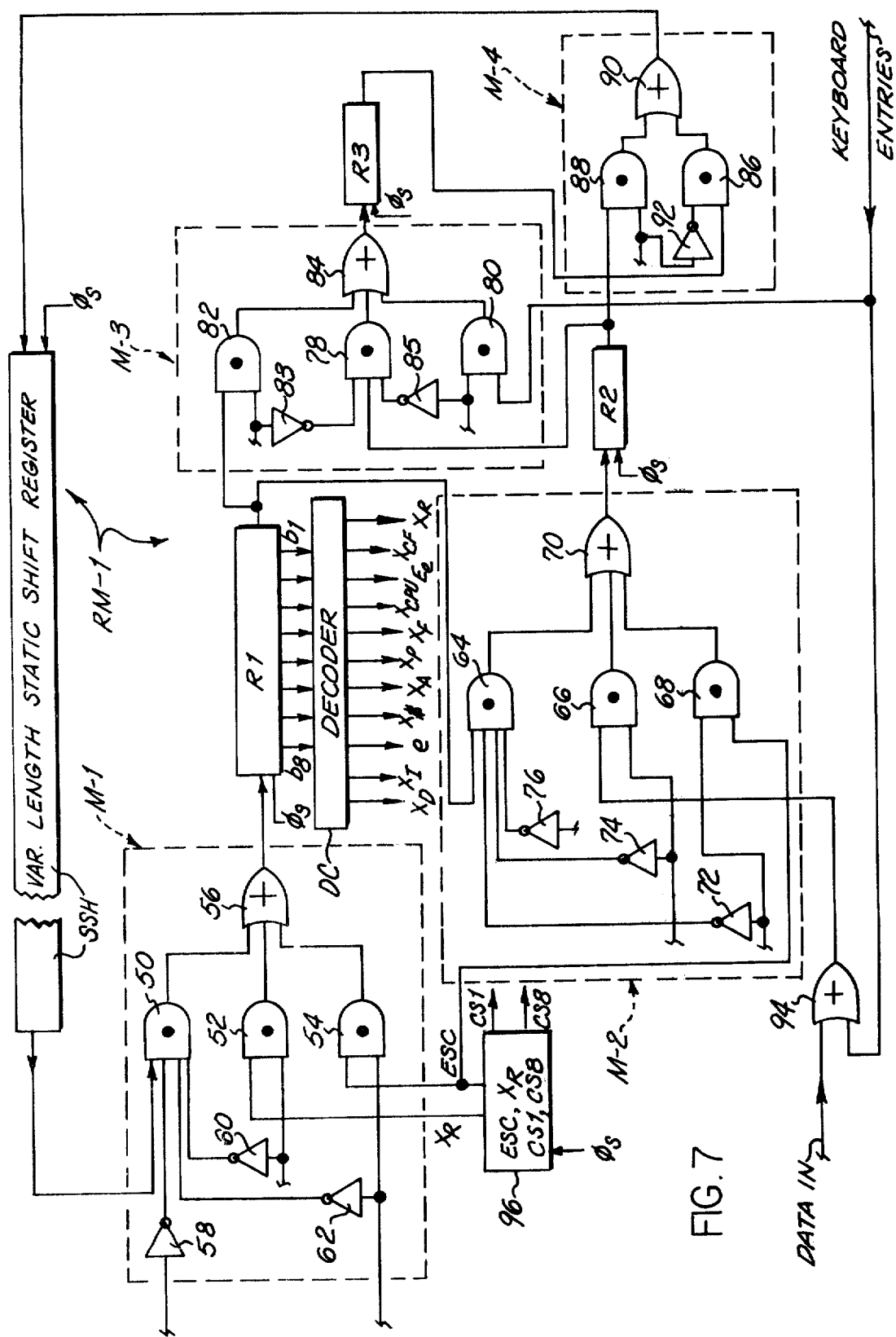
FIG. 7 is a schematic-block diagram illustration of a recirculating shift register.

The memory M is preferably implemented as shown in FIG. 7. The memory includes a variable length, static shift register SSH located in the recirculating path of a recirculating memory RM-1. The recircuating path also includes additional memory capacity provided by register R-1, R-2, and R-3. The length or capacity of the memory is selected to suit the intended application or use. For example, the shift register SSH may have a capacity of 1,024 bits. If the characters stored in the register are eight bits in length, then the capacity of this register will be 128 characters. If registers R-1, R-2, and R-3 are each eight bit registers, then the total memory capacity of the recirculating memory RM-1 would amount to 131 eight bit characters. In the implementation illustrated in the drawings, the static shift register SSH is located externally of the input/output control circuit IOC with the remaining portion of the recirculation path being located within that control circuit. Each of the registers receives shift pulses from clock source $\phi_S$ so that the data in the recirculating memory is shifted in bit serial fashion. If desired, the recirculating memory may be structured so that the bits are shifted in parallel and the characters shifted in series by providing eight parallel paths through the recirculating memory rather than the single path employed in the circuitry shown in FIG. 7. In the preferred embodiment, as shown in FIG. 7, the data is divided into eight bit characters with the most significant character being transferred first and the least significant character being transferred last. Also, in this embodiment, the bit sequence is such that within a character, the bit serial transfer requires the least significant bit ($b_1$) to be transferred first and the most significant bit ($b_8$) to be transferred last.

The recirculation path also includes multiplexers M-1, M-2, M-3, and M-4. Each multiplexer is comprised of a plurality of AND gates and an OR gate. Thus, for example, multiplexer M-1 includes a plurality of AND gates including AND gates 50, 52, and 54, having their outputs applied through an OR gate 56 to the input of register R-1. In the normal data recirculation mode of operation, AND gates 52 and 54 are disabled and AND gate 50 is enabled so that the data obtained from the output of shift register SSH is applied through AND gate 50 and OR gate 56 to register R-1. AND gate 50 is disabled upon applying a control signal thereto through one of the inverters 58, 60, and 62 connected to its input. The control for these functions will be described in greater detail hereinafter.

Multiplexer M-2 is similar to multiplexer M-1 in that it includes a normally enabled AND gate 64 together with normally disabled AND gates 66 and 68, all having their outputs applied through an OR gate 70 to the input of registers R-2. Inverters 72, 74, and 76 are all connected to the input of AND gate 64 for, on command, disabling this AND gate to prevent transfer of data from register R-1 to register R-2.

Multiplexer M-3 is constructed in a manner similar to that of multiplexers M-1 and M-2 in that it includes a normally enabled AND gate 78 and normally disabled AND gates 80 and 82, all having their outputs applied to register R-3 through an OR gate 84. Inverters 83 and 85 are connected to the input of AND gate 78 for selectively disabling this AND gate to prevent data transfer from register R-2 to register R-3.

Multiplexer M-4 is constructed similar to multiplexers M-1, M-2, and M-3 in that it includes a normally enabled AND gate 86 and a normally disabled AND gate 88, both having their outputs applied through an OR gate 90 to the input of the external shift register SSH. Inverter 92 serves, on command, to disable AND gate 86 to prevent data transfer from register R-3 to register SSH.

These multiplexers M-1, M-2, M-3, and M-4 include additional AND gates and OR gates for performing control functions. The additional gates will be described in conjunction with these control functions.

The data in the recirculation path is divided into groups of characters each being eight bits in length. Data is entered into the recirculating path through one of the multiplexers, depending on the nature of the data being entered. Thus, for example, data from the keyboard is entered into the memory through multiplexers M-2 or M-3 depending upon whether the data is obtained from the control keys or the data keys. Information obtained from the data keys is entered into the memory through multiplexer M-3 through AND gate 80 whereas control key data is entered into the recirculating memory through AND gate 66 in multiplexer M-2 by way of an OR gate 94. Another input to the OR gate 94 is the DATA IN line. This is the path for data entry from the fixed data source FDS or from the card readers CR-1, CR-2, or from the CPU. Also, data in the form of the ESC control character is written into the memory through AND gate 54 in multiplexer M-1 or through AND gate 68 in multiplexer M-2 depending on the type of control being employed. The reset command character $X_R$, for example, is also written into the recirculation path through multiplexer M-1 by way of AND gate 52. The ESC character and the reset command character $X_R$ are obtained from a character generator and clock synchronizing circuit 96. Circuit 96 receives clock pulses from the clock source $\phi_S$ and continuously outputs eight bit characters for ESC and $X_R$. If desired, a separate reset character generator could be provided, however, this is preferably implemented by inverting the output from the escape character generator to obtain the reset command character $X_R$. Circuit 96 also provides synchronizing pulses CS1 and CS8 at bit times synchronized with bits $b_1$ and $b_8$ respectively. These synchronizing pulses are used for various control functions in the circuitry employed in the terminal.

RECIRCULATION PATH DECODER

Figures 8, 9:
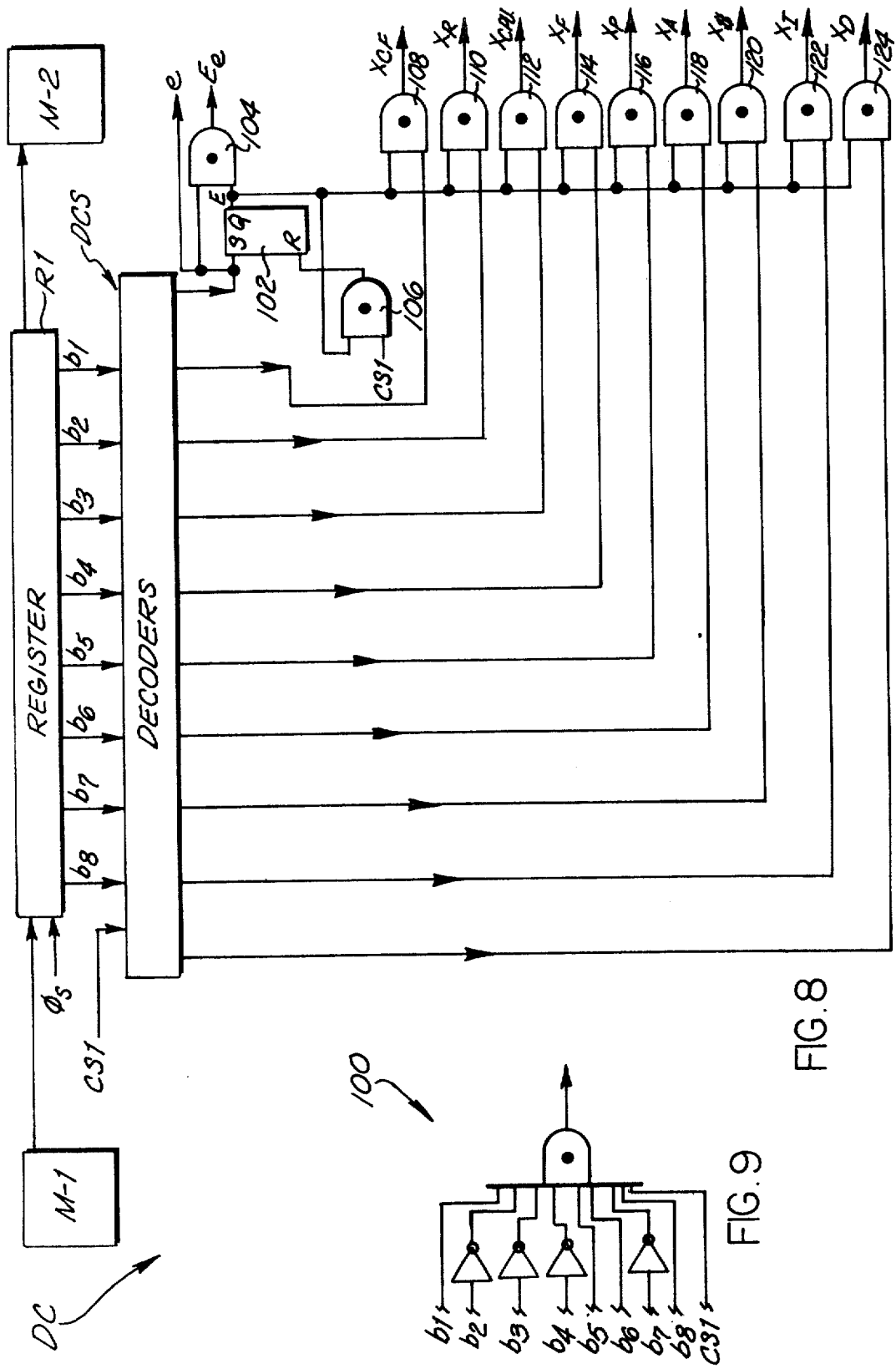
FIG. 8 is a schematic-block diagram illustration showing the decoder of FIG. 7 in greater detail.
FIG. 9 is a schematic-block diagram illustration showing a portion of the decoder of FIG. 8 in greater detail.

The recirculation path decoder DC illustrated in FIG. 7 serves to decode various function or control characters, command characters, and field defining characters in the recirculation path when the character of interest is located in register R1. This may be implemented with the circuitry illustrated in FIG. 8. Here, decoder DC is illustrated as including a plurality of eight bit, character synchronized decoders DCS each taking the form, for example, of decoder 100 illustrated in FIG. 9. As shown in FIG. 9, decoder 100 is essentially a multi input AND gate having eight inputs for receiving bits $b_1$ through $b_8$ together with a ninth input for receiving a character synchronizing pulse CS1. Whenever an eight bit character is properly located in register R1 with the most significant bit being located in bit position $b_1$, a decoding function is performed in synchronism with the character synchronizing pulse CS1. This synchronizing pulse enables the AND gate to decode the binary pattern of bits $b_1$ through $b_8$. Depending on the binary pattern of interest, one or more of the inputs to the AND gate will include an inverter as is shown in FIG. 9 for bits $b_2$, $b_3$, $b_4$, and $b_7$. With this example, the character synchronized AND gate 100 would provide an output when the received bit pattern is 1-0-0-0-1-1-0-1.

Each time an ESC character is located in register R1 decoder DSC will provide a binary 1 signal on its output line $e$, with the decoder taking the form of decoder 100 described with reference to FIG. 9. This, then, is one of the 11 outputs provided by decoder DC. However, each of the other outputs requires that the character to be decoded be preceded by an ESC character. For example, an end of message designation is provided by two ESC characters in succession. When detected, this provides an output $E_e$. The first detection of an ESC character provides a binary 1 on output line $e$ to set a flip-flop 102 as well as to provide an output representative that a single ESC character has been detected. If the very next character in the data stream is also an ESC character, then the output from decoder output line $e$ will be gated with the binary 1 output from flip-flop 102 through an AND gate 104 to provide a binary 1 signal on output line $E_e$ indicative that two ESC characters in succession have been detected. So that the flip-flop will remain in this condition for one character time only, the output from the flip-flop is anded with the clock synchronizing pulse CS1 through an AND gate 106 to reset the flip-flop.

Thus, whenever an ESC character is detected, flip-flop 102 will be set for one byte time to enable AND gates 104, 108, 110, 112, 114, 116, 118, 120, 122 and 124. With this circuitry then, a decoder output, except for the detection of a single ESC character, is provided only when the decoded character is immediately preceded by an ESC character.

Keyboard Entered Data

Figure 10A:
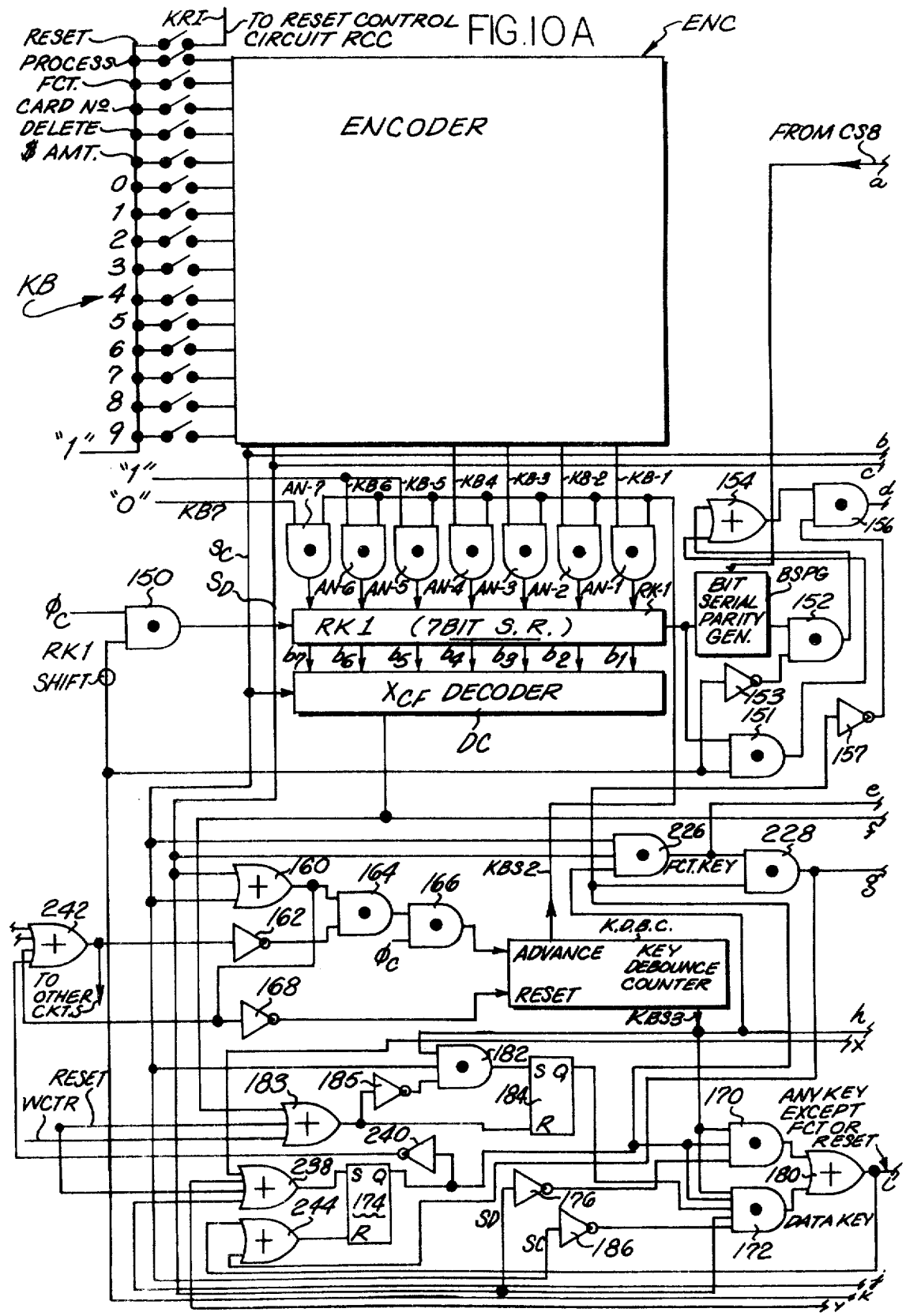
FIGS. 10A, 10B, and 10C taken together are a schematic-block diagram illustration of a keyboard data entry control circuit.
Figure 10B:
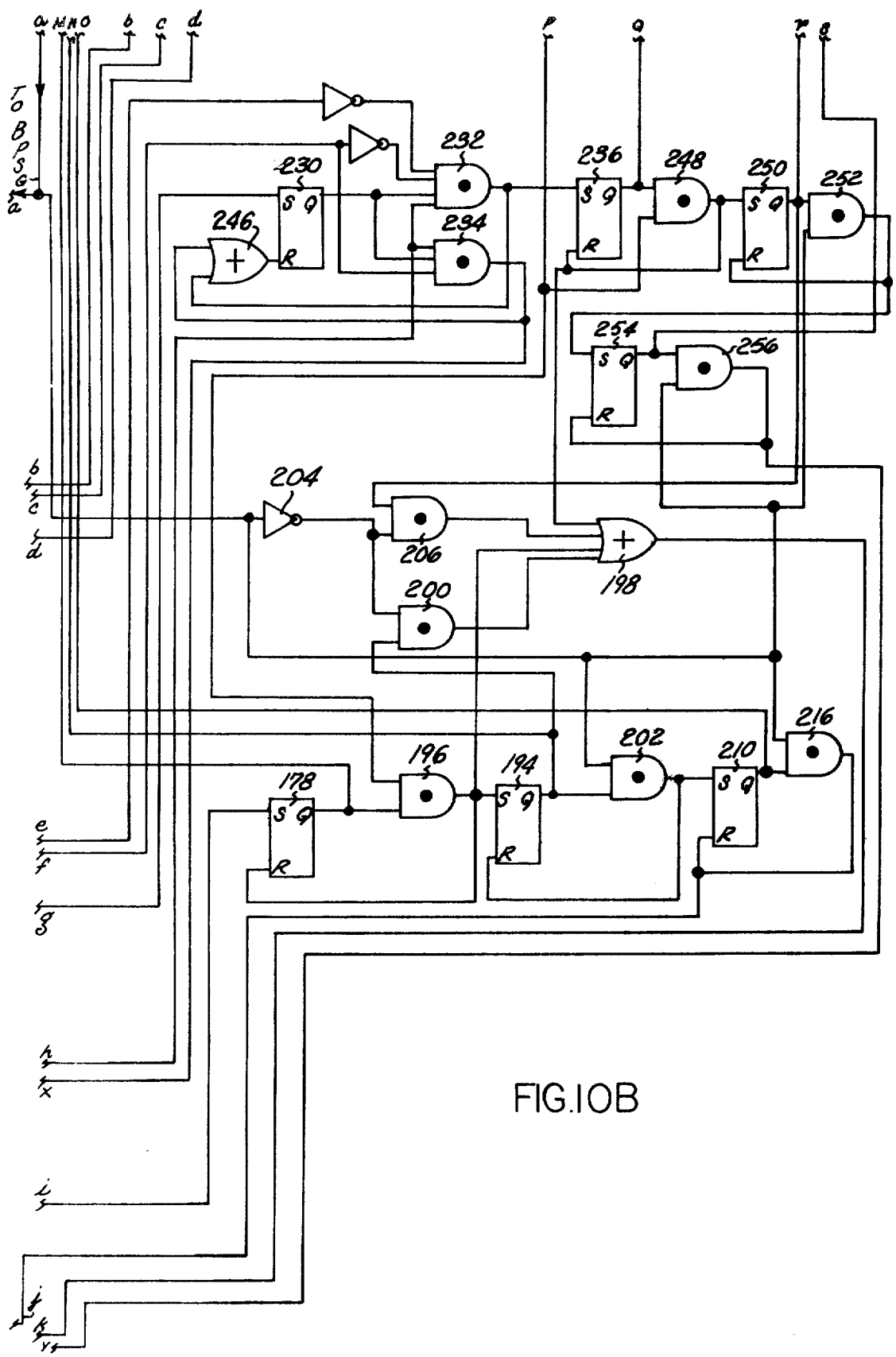
Figure 10C:
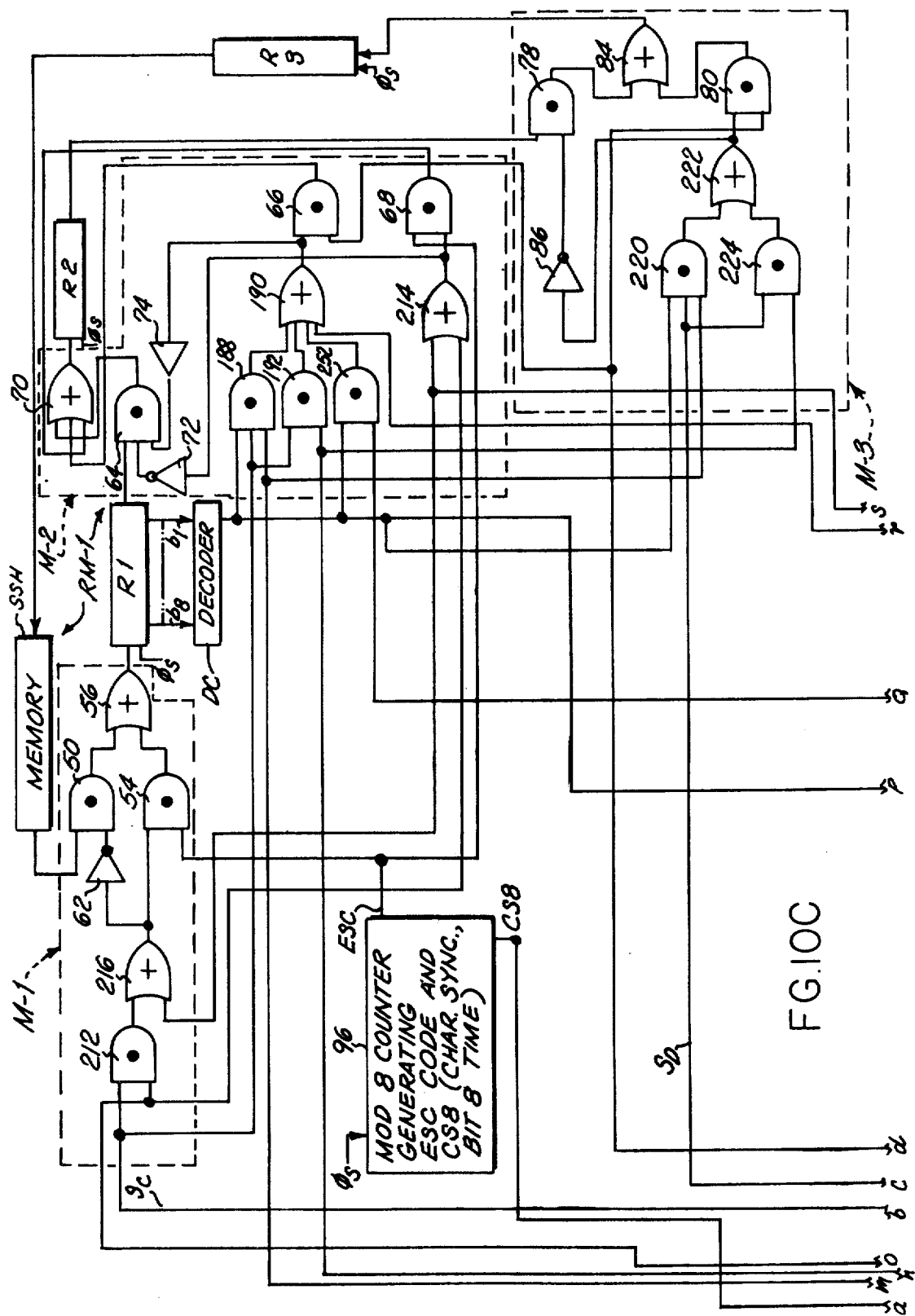

Data is entered from the keyboard KB into the memory M under the control of the keyboard data entry control circuit KDC. This control circuit is illustrated in FIG. 10. As to the memory, it is to be noted that only those portions of multiplexers M-1, M-2, and M-3 are illustrated that are used in writing data into the memory from the keyboard. To the extent possible, the AND and OR gates in the multiplexers will be labeled the same as that shown in FIG. 7 to facilitate the understanding of this invention.

As previously discussed, keyboard KB includes a 16 pad keyboard which includes numeric keys 0–9, a definition key FCT, a card number key, a $ amount key, a process key, a reset key, and a delete key. The definition key FCT, in conjunction with numeric key 1, serves to provide an imprint command $X_I$ for entry into the memory.

In general, actuation of a key causes one character of data in the form of an eight bit data train to be entered into the memory. For purposes of definition, the numeric keys will be referred to hereinafter as the data keys and the remaining keys will be referred to as function or control keys.

As shown in FIG. 10, the 16 keys are illustrated as being simple, normally open switches. Each of the switches is connected to a binary 1 signal source. The reset switch, when closed, applies a reset keyboard command KRI to the reset control circuit RCC. The remaining switches, when closed, respectively apply binary 1 signals to an encoder circuit ENC. The encoder circuit may take any suitable form such as a diode matrix or the like. The output from the encoder includes keyboard output lines KB1, KB2, KB3, and KB4 which respectively correspond with data bits $b_1$, $b_2$, $b_3$, and $b_4$. In addition, the encoder has two additional outputs for providing a control signal $S_C$ indicative that one of the function or control keys has been actuated. Another output from the encoder ENC is a control signal $S_D$ which is indicative that one of the data keys has been actuated. As a special case, actuation of the FCT key will produce a control signal from both $S_C$ and $S_D$.

Depending on which data or control key was actuated, there will result a particular pattern of binary level signals on output bit lines KB1 through KB4 corresponding with bits $b_1$ through $b_4$. These four bits are applied to the corresponding stages of a seven bit shift register RK1. In addition, bits $b_5$, $b_6$, and $b_7$ are provided by corresponding bit line KB5, KB6, and KB7. In the embodiment illustrated, the bit lines are always provided with fixed binary signals with binary 1 signals being applied to bit lines KB5 and KB6 from a binary 1 signal source and a binary 0 signal being applied to bit line KB7 from a binary 0 signal source. The seven bit lines KB1 through KB7 are respectively connected to one input each of respectively associated AND gates AN-1 through AN-7. The binary signal pattern on these bit lines will be loaded into register RK1 when these seven AND gates AN-1 through AN-7 are enabled from an output taken from a key debounce counter circuit KDBC, to be described in greater detail hereinafter. The seven bits loaded into the seven bit register RK1 will be shifted out in bit serial fashion by application of clock pulses to the shift input of the register from the system clock source $\phi_C$ when an associated AND gate 150 is enabled by an RK1 shift pulse. The manner in which this shift pulse is applied to the AND gate will be described at a later point in this description.

The pulse train consisting of bits $b_1$ through $b_7$ from register RK1 are shifted in bit serial fashion to a conventional bit serial parity generator BSPG. As is known, such a generator serves to examine the binary contents of bits $b_1$ through $b_7$ and depending upon that information, will add an eighth bit $b_8$ to the pulse train with the eighth bit having a binary 1 or 0 level depending on the nature of the seven bits which have been examined. In the instant example, an even parity system is used and if bits $b_1$ through $b_7$ include an even number of binary 1 signal pulses, then the eighth bit will be a binary 0 level signal. On the other hand, if bits $b_1$ through $b_7$ include an odd number of binary 1 bits, then the eighth bit will be a binary 1 level signal so that the total pulse train will exhibit even parity. The eighth bit provided by the bit serial parity generator is applied to the pulse train in synchronism with a synchronizing pulse CS8 obtained from the special character generator and character synchronizing circuit 96. As will be recalled, this circuit provides a synchronizing pulse CS8 at a point in time corresponding with bit $b_8$ in the clock train. Bits $b_1$ through $b_7$ are applied through a normally enabled AND gate 151 and thence, through an OR gate 154 and through a normally enabled AND gate 156 and from there to the memory through either multiplexer M-2 or M-3. The parity bit, bit $b_8$, is applied through AND gate 152, when enabled by inverter 153, and thence, through OR gate 154. If this eight bit character resulted from an actuation of one of the control keys, then the character bits $b_1$ through $b_8$ will be entered into the memory through multiplexer M-2. This is because AND gate 66 in multiplexer M-2 will be enabled when the control line $S_C$ provides a binary 1 signal representative that a control key was actuated. On the other hand, if the character bits resulted from actuation of a data key then the control line $S_D$ carries a binary 1 signal and this enables AND gate 80 in multiplexer M-3. When AND gate 80 is enabled, the eight bit character will be applied through AND gate 80 and OR gate 84 in multiplexer M-3 into the register R-3. The operation of these multiplexers is under the control of the keyboard data entry control circuit KDC which will now be described in detail relative to FIG. 10.

The keyboard data entry control circuit KDC illustrates a logic implementation including flip-flops, OR gates, and AND gates to control entry of data into the memory. It is to be appreciated, however, that in a commercial version of the invention it may be desirable to apply various minimization techniques in implementing the logic. In some cases read only memory structures can provide minimization and flexibility for change. Standard processor packages can also be programmed to perform these functions. However, to simplify an understanding of the invention, the description and illustrations are directed to such flip-flops and gates.

Key Debounce Circuit

When one of the keys on the keyboard KB is actuated, there may be a tendency for the key to bounce somewhat causing the signal to oscillate between binary 0 and binary 1 levels. It is desirable that operation in response to a keyboard actuation wait a sufficient time for this bouncing action to come to a rest condition before actuating AND gates AN-1 through AN-7 to load register RK1. This is accomplished with the use of the key debounce counter circuit KDBC. The encoder ENC provides a binary 1 output signal on its $S_D$ output line if the actuated key was a data key or a binary 1 signal on its output line $S_C$ if the actuated key was a control key. Whenever a binary 1 signal is provided on either of these output lines, a binary 1 signal is applied through OR gate 160. If the bus is not busy, then a binary 1 signal will be applied by an inverter 162 to enable AND gate 164 so that the key actuation signal will be applied through AND gate 164 to enable an AND gate 166. This permits system clock pulses $\phi_c$ to be applied to the advance input terminal of counter KDBC. This counter commences to count $\phi_c$ clock pulses each time control line $S_D$ or control $S_C$ carries a binary 1 signal. But, due to key bouncing, the control signal may oscillate between binary 1 and binary 0 levels. With each transition in binary levels, inverter amplifier 168 applies a reset pulse to the reset input of counter KDBC. Once the counter has had an opportunity to commence timing without being reset from inverter 168, it will time a given period of time and then provide a count pulse to enable AND gates AN-1 through AN-7 to load the register RK1. This count pulse is referred to herein as pulse KBS2. One bit time later, the counter will provide a second count pulse KBS3. This second pulse is applied to one input each of a control key detect AND gate 170 and a data key detect AND gate 172. A second input to each of these AND gates is taken from a normally set flip-flop 174. If, for example, the actuated key was a control key, then the control line $S_D$ carries a binary 0 signal and this is inverted by an inverter 176 and applied as the third input to AND gate 170. This will cause ANd gate 170 to set flip-flop 178 through an OR gate 180. When flip-flop 178 is set, this initiates an operation by which information is written into the memory through multiplexer M-2 if a control key was actuated or M-3 if a data key was actuated.

A memory protect circuit is provided for preventing keyboard data entry into the memory unless such data field entries have been preceded by a field definition type key. To accomplish this function, the KBS3 pulse is applied to one input of an AND gate 182. If a control key had been actuated to causue pulse KBS3, then the control signal line $S_C$ will carry a binary 1 signal so that the AND gate 182 will set a memory protect flip-flop 184, provided that the control key was not DELETE. When flip-flop 184 is set, it applies a binary 1 signal to one of the inputs of an AND gate 172. In this way, flip-flop 184 remembers the fact that a control key had been actuated. If the next key to be actuated is a data key, then the key debounce counter KDBC will provide a trigger pulse KBS3, resulting from actuation of this data key to one input of the data key detect ANd gate 172. The data control line $S_D$ also applies a binary 1 signal to AND gate 172 and an inverter 186 connected to the control signal line $S_C$ applies another binary 1 signal to AND gate 172. Since flip-flop 174 is in its set condition, the AND gate will then proprerly apply a binary 1 signal through OR gate 180 to set flip-flop 178. The memory protect flip-flop is reset through OR gate 183 by raising lines RESET or WCTL or by a detection of $KX_{CF}$ by decoder DC. By virtue of inverter 185, flip-flop 184 is reset - dominant.

Control Key

When a control key is actuated, AND gate 170 applies a binary signal through OR gate 180 to set flip-flop 178. Flip-flop 178 will, in turn, apply a binary 1 signal to AND gate 188 in multiplexer M-2. A second binary 1 signal is applied to this AND gate from the control key signal line $S_C$. The circuitry is now conditioned to commence entry of the control character into the memory when two ESC characters in succession are detected with one being located in register R2 and the other being located in register R1. When this condition is detected by decoder DC, it applies a binary 1 signal on its output line $E_e$. This binary 1 signal will then be applied for one bit time through enabled AND gate 188 and thence, through OR gate 190 to enable AND gate 66 in multiplexer M-2 thus writing bit $b_1$ from RK1 into R2. The output from OR gate 190 is also applied through an inverter 74 to disable AND gate 64 to prevent the ESC character in register R1 from being clocked into register R2 during the next byte time. Instead, the keyboard control character will be clocked into the register through AND gate 66.

The first bit of the control character is written into the register R2 through AND gate 66 under the control of AND gate 188. Bits $b_2$ through $b_8$ of the control character are written into register R2 through ANd gate 66 under the control of an AND gate 192. This AND gate is enabled by the binary 1 signal on the control key signal line $S_C$ and applies a binary 1 signal through OR gate 190 to enable AND gate 66 when flip-flop 194 is set.

Flip-flop 194 is set upon detection of the two ESC characters in succession by applying the binary 1 signal on output line $E_e$ to an AND gate 196 which is enabled from the output of flip-flop 178. As AND gate 196 applies a binary 1 signal to set flip-flop 194, it resets flip-flop 178. However, the output of flip-flop 194 does not change until one bit time elapses since all of the flip-flops described herein are synchronized with the system clock source $\phi_C$.

At the point in time that AND gate 196 applied a binary 1 signal pulse to set flip-flop 194, it also applied a binary 1 signal through an RK1 shift control OR gate 198 so that a shift pulse was applied to enable ANd gate 150 to permit a shift pulse corresponding with bit $b_1$ to be applied from the clock source $\phi_C$ to the shift input of the seven bit shift register RK1. This caused bit $b_1$ to be shifted from register RK1 and thence, through enabled AND gate 66 in multiplexer M-2 so as to be written into register R2.

During the write-in of the control character, bits $b_2$ through $b_8$ are written in under the control of AND gate 192 while flip-flop 194 is set. The shift pulses to shift bits $b_2$ through $b_7$ are obtained during this period from flip-flop 194 which applies a binary 1 signal through enabled AND gate 200 and thence, through OR gate 198 to enable AND gate 150 for a time duration corresponding with bits $b_2$ through $b_7$. The last bit in this control character is a parity bit and is obtained, at a point in time in synchronism with the character synchronizing pulse CS8, from the bit serial parity generator BSPG. This bit is also applied through AND gate 66 under the control of AND gate 192 which is enabled by flip-flop 194. Flip-flop 194 is reset by the clock synchronizing pulse CS8 at the end of the bit time through ANd gate 202. This synchronizing pulse is also applied through an inverter 204 to disable shift control AND gate 200 and to disable another shift control AND gate 206. This is done to disable AND gate 151 and enable AND gate 152 to allow the previously generated parity bit $b_8$ to be written into R2 from the bit serial parity generator BSPG.

The control character, resulting from actuation of the control key, has now been written into register R2. It is now necessary to ensure that the data train in the recirculating memory includes two ESC characters in succession immediately following the control character written into register R2. This is done after any keyboard character is written into the memory since it may be the last character entered, and if so, an end of message designation indicated by two ESC characters in succession is required to define the location for subsequent writing into the memory. When AND gate 202 applied a pulse to reset flip-flop 194, it also set a flip-flop 210 which controls the writing of two ESC characters into the memory during the next byte time. Thus, as the just entered control character is being shifted out of register R2 into register R3, an ESC character is entered into register R1 and a second ESC character is entered into register R2. This procedure is discussed below.

When flip-flop 210 is set, it enables an AND gate 212 in multiplexer M-1 and also enables AND gate 68 in multiplexer M-2 through an OR gate 214. With AND gate 68 being enabled, an eight bit ESC character is clocked into register R2 during the next byte time with the ESC character being obtained from the ESC character generator 96. Also, since AND gate 212 is enabled and the control key signal line $S_C$ carries a binary 1 signal, this AND gate applies a binary 1 signal to OR gate 216 to enable AND gate 54 in multiplexer M-1. With AND gate 54 being enabled, an eight bit ESC character will be clocked into register R1 through OR gate 56 coincident with the ESc entry into R2 above.

During the period that an ESC character is being written into register R1, OR gate 216 disabled AND gate 50 in multiplexer M-1 through inverter 62. In this way, an ESC character is written over whatever character would have been entered into register R1 from the external shift register SSH. Similarly, while the ESC character is being written into register R2, OR gate 214 disables AND gate 64 in multiplexer M-2 through an inverter 72 so that an ESC character is written into register R2 instead of whatever character might have been shifted into register R2 from register R1.

Data Key

In the preceding discussion, it is assumed that a control key was actuated and not a data key. This caused an eight bit control character to be written into register R2 and then be shifted from register R2 to register R3 with two succeeding ESC characters being written into two register R1 and R2. If no additional data keys are actuated, then this sequence of two ESC characters in succession will indicate end of message.

Assume now that a data key corresponding with one of the numeric keys 0-9 is actuated. As will be recalled, the character represented by the numeric key will not be entered into the memory unless a field had been previously defined from the keyboard. This is the purpose of the memory protect flip-flop 184 discussed hereinbefore. If flip-flop 184 is set and if a data key is actuated, then AND gate 172 will apply a binary 1 signal through OR gate 180 to set flip-flop 178. The circuitry will now wait for two ESC characters in succession to be detected by decoder DC. Once this is decoded, then decoder output line $E_r$ carries a binary 1 signal which is applied to AND gate 196 to set flip-flop 194 which, as discussed hereinbefore, controls the operation for writing bits $b_2$ through $b_K$ into the memory. Bit $b_1$ is written into the memory under the control of an AND gate 220 in multiplexer M-3. Since the data control line $S_D$ carries a binary 1 signal, this AND gate is enabled upon receipt of a binary 1 signal from decoder output line $E_r$, thus enabling AND gate 80 and disabling AND gate 78 through inverter 86. This permits bit $b_1$ of the data character to be entered into register R3 when a shift pulse is applied to register RK1. The bit $b_1$ shift pulse is obtained in the same manner discussed hereinbefore relative to the entry of the control character. Thus, once AND gate 196 applies a trigger signal to set flip-flop 194, it also applies a binary 1 signal through OR gate 198 to enable AND gate 150 to pass one clock pulse from clock source $\phi_C$ to the shift input terminal of register RK1. Bits $b_2$ through $b_8$ are transferred in the same manner as that discussed before with respect to the entry of bits $b_2$ through $b_8$ of the control character. However, bits $b_2$ through $b_8$ are entered under the control of AND gate 224 which is enabled by flip-flop 194. As in the previous discussion relating to shifting the eight bits of the control character into register R2, only seven shift pulses are applied to the shift register RK1 with the eighth bit being a parity bit obtained from the bit serial parity generator BSPG. Once all eight bits have been entered into register R3, an operation is instituted to ensure that this character is followed by two ESC characters.

Before the data character was written into register R3, an ESC character was located in register R2. During the byte time the data character was written into register R3, AND gate 78 was disabled. However, AND gate 64 in multiplexer M-2 was enabled and the ESC character that had been located in register R1 was shifted into register R2. During the next byte time then, the data character just entered is shifted from register R3 to the external shift register SSH and the ESC character in register R2 is shifted into register R3. During this byte time, flip-flop 210 is in a set condition and applies a binary 1 signal through OR gate 214 in multiplexer M-2 to enable AND gate 68. This permits an ESC character from the character generator 96 to be shifted through AND gate 68 and thence, through OR gate 70 into register R2. It is to be noted that another ESC character is not written into register R1 during this byte time since AND gate 212 is disabled because the control signal line $S_C$ carries a binary 0 signal.

Function Key

Various commands and field definers may be entered into the memory by actuating the function key and then one of the numeric keys. For example, when the function key is actuated and that actuation is followed by actuation of numeric key 1, an imprint command $X_I$ is written into the memory. The manner in which this is accomplished is described below. When the function key FCT is actuated, encoder ENC places a binary 1 signal on both of the output control lines $S_C$ and $S_D$. This then, enables an AND gate 226. When the key debounce counter circuit KDBC provides its trigger pulse KBS3, this pulse is applied to AND gate 226. With flip-flop 174 in a set condition, the output of AND gate 226 will be applied through a succeeding AND gate 228 to set a flip-flop 230. When flip-flop 230 is set, it is indicative of a condition that the circuitry has detected a function key actuation and is now waiting for the next key actuation. In the meantime, the alpha character F is displayed on the terminal display. While the circuitry is waiting for the next key actuation, flip-flop 230 applies a binary 1 signal to enable AND gates 232 and 234. AND gate 232 serves to detect whether the next key actuation resulted from actuating a key other than the function key or the delete key. If it is a data key that is actuated, then the KBS3 signal from the key debounce counter KDBC is gated through AND gate 232 to set a flip-flop 236. If, on the other hand, the next key actuation is a delete key actuation, then decoder DC applies a delete last field keyboard signal $KX_{CF}$ to disable AND gate 232 and enable AND gate 234. When counter KDBC provides its output trigger pulse KBS3, AND gate 234 will then apply a binary 1 signal through OR gate 238 to set flip-flop 174 and also to reset flip-flop 230 through OR gate 246. This will cause the circuitry to be recycled back to its starting condition, awaiting a new key actuation. Consistent with the delete key function, the character F is cleared from the display. Also, when flip-flop 174 is returned to its set condition, it applies a binary 0 signal through an inverter 240 to remove the bus busy output from the bus busy line through OR gate 242. It is to be noted that when the function detection took place and was detected at AND gate 228, this AND gate served to reset the flip-flop 174 through OR gate 244. Subsequent repeated actuations of the delete key will not change logic states.

If the next key actuated is a data key or any key other than a function key, delete key, or a reset key, then AND gate 232 will set flip-flop 236 and at the same time, apply a reset pulse through OR gate 246 to reset flip-flop 230.

When flip-flop 236 is in a set condition, the circuitry will wait for a detection of two ESC characters in succession at registers R1 and R2. When this takes place, the decoder DC applies a binary 1 signal on its output line $E_e$ with the signal being anded with the output from flip-flop 236 through an AND gate 248 to set flip-flop 250. The output from AND gate 248 also serves to reset flip-flop 236 and provides the shift pulse for bit $b_1$ through OR gate 198 and AND gate 150. Flip-flop 236, when set, enables AND gate 252 in multiplexer M-2. When the decoder DC places a binary 1 signal on its $E_e$ output line, AND gate 252 enables AND gate 66 through OR gate 190 in multiplexer M-2. Thus, when the first shift pulse is applied to register RK1, bit $b_1$ is shifted into the memory through AND gate 66 and OR gate 70 into register R2.

Bits $b_2$ through $b_8$ are written into register R2 under the control of flip-flop 250. Thus, as long as this flip-flop is set, it provides a binary 1 output signal through AND gate 206 and OR gate 198 to enable AND gate 150 so that clock pulses from clock source $\phi_C$ are applied to the shift input of register RK1. Also, when flip-flop 250 is set, it enables AND gate 66 in multiplexer M-2 through OR gate 190. Bits $b_2$ through $b_7$ are now shifted from register RK1 into register R2. The eighth bit is obtained from the bit serial parity generator BSPG in synchronism with the clock character synchronizing pulse CS8. CS8 is also ANDed with the output of flip-flop 250 by way of an AND gate 252 to set flip-flop 254 and reset flip-flop 250.

When flip-flop 254 is in its set condition, it serves to control circuitry by which ESC characters are written into registers R1 and R2. With flip-flop 254 being set, it applies a binary 1 signal through OR gate 214 to enable AND gate 68 in multiplexer M-2. This output from flip-flop 254 also enables AND gate 54 in multiplexer M-1. Consequently then, during the next byte time, an ESC character is written into register R1 through multiplexer AND gate 54 and another ESC character is written into register R2 through multiplexer AND gate 68.

The next synchronizing pulse CS8 is with the output from flip-flop 254 by way of an AND ate 256 to reset flip-flop 254 and to set flip-flop 174 through OR gate 238. As previously discussed, once flip-flop 174 is set, it removes the binary 1 signal previously applied to the bus busy line.

From the foregoing then, it is seen that the keyboard control circuitry shown in FIG. 10 enters data characters into the memory through multiplexer M-3 and enters control characters and field definers into the memory through multiplexer M-2. Special characters, such as the escape character ESC, are entered into the memory through multiplexers M-1 and M-2. Whenever a control or data character is entered into the memory, the circuitry ensures that the character is followed by two ESC characters in succession. This defines the location for entering the next character or provides an indication of end of message.

PERIPHERAL READ/WRITE CONTROL CIRCUIT

Referring back to FIG. 6, data is written into the terminal memory from the keyboard under the control of a keyboard data entry control circuit KDC. However, data may also be written into the memory from the fixed data source FDS or from an input peripheral such as one of the card readers CR-1 or CR-2. Also, data may be written into the memory from the CPU by way of a communications control circuit. Data written into the memory from the fixed data source or from one of the input peripherals CR-1 or CR-2 or from an input-/output peripheral such as the CPU, is written into the memory on the DATA IN line under the control of a peripheral read/write control circuit RWC.

The read/write control circuit RWC is illustrated in detail in FIG. 11 to which attention is now directed. Data from one of the peripherals, as well as from the fixed data source, is written into the memory by way of the DATA IN line through multiplexer M-2. There are three different write modes available to the peripherals, therefore before writing is initiated a peripheral must first define the desired mode, utilizing a combination of the read and write control lines as discussed below. After the accessory or peripheral defines the mode of operation to be employed the read/write control circuit will establish the necessary mode control and then raise the read/write sync line R/W-SYNC to indicate to the peripheral that it can begin. The peripheral then assumes control of the memory clock $\phi_S$. To select mode 1, the peripheral raises the write control line WCTL; to select mode 2, the peripheral raises the write control line WCTL and the read control line RCTL simultaneously; and to select mode 3, the peripheral raises the WCTL line. Each of these writing modes will be discussed in detail below.

Mode 1 - Write Operation

This is the normal mode of writing text into the memory at an end of memory location designated by two ESC characters located respectively in registers R1 and R2. Thus, in this mode data is normally written so that it follows data previously entered. When this mode is selected, the read/write control circuit will automatically precede the data from the peripheral with an ESC character.

To enter this mode, an accessory or peripheral raises the write control line WCTL. The read/write control circuit RWC will operate to locate the present end of text in the memory defined by (ESC) (ESC) and stop the memory clock $\phi_S$ so that the first character entered by the peripheral will be written over the second of the two ESC characters in registers R1 and R2 as an $X_i$ in the sequence (ESC) ($X_i$). The peripheral enables the memory clock $\phi_S$ by raising the $\phi_S$ ENABLE line. The clock control is switched to the peripheral when the read/write control circuit raises its read/write sync line R/W-SYNC to indicate to the peripheral that it can begin clocking $\phi_S$. After the data has been entered into the memory and the peripheral lowers the write control line WCTL, the bus busy line BBSY will remain busy for one byte time while the control circuitry inserts two ESC characters into the message to define the end of text in memory. The mode 1 writing operation will now be discussed in detail with reference to the circuitry shown in FIG. 11.

When the peripheral or accessory raises the write control line WCTL, a binary 1 signal is carried on this line and applied to a normally enabled AND gate 260. This AND gate sets a flip-flop 262 which serves to provide a hold function while the circuitry waits for detection of the two ESC characters in registers R1 and R2. The output from AND gate 260 is also employed to reset a normally set flip-flop 264 through an OR gate 266. This flip-flop is normally in a set condition and when reset, it provides an output which is applied through an inverter 268 to raise the bus busy line BBSY through an OR gate 270.

When the end of text in the memory has been detected, decoder DC applies a binary 1 signal on its output line $E_e$. This is added with the output from flip-flop 262 by way of an AND gate 272 in multiplexer M-2. AND gate 272, in turn, applies a binary 1 signal through an OR gate 274 and thence, through a normally enabled AND gate 276 to disable the clock source AND gate 278 through an inverter 280. AND gate 278 is normally enabled to pass clock pulses from the system clock source $\phi_C$ through an OR gate 282 to provide the shift clock pulses $\phi_S$ which serve to shift the data in the memory one bit at a time. When AND gate 278 is thus disabled, the memory is stopped with ESC characters located in registers R1 and R2. AND gate 276 also applied a binary 1 signal to set a D type flip-flop 284. This is the read/write sync flip-flop and, on the next bit time from the system clock $\phi_C$, provides a binary 1 signal on the read/write sync line R/W-SYNC to indicate to the peripheral that it has control of the memory clock $\phi_S$.

When the peripheral raises the $\phi_S$ ENABLE line, this will enable AND gate 286 to pass the system clock pulses $\phi_C$ through OR gate 282 with the output pulse train being referred to herein as clock source $\phi_S$, which is used as a source of shift pulses for the terminal memory. The ESC character in register R2 is shifted from register R2 to register R3 through multiplexer M-3. The ESC character in register R-1 is prevented from being shifted into register R-2 since AND gate 64 is disabled through inverter 74. Thus, while the write control line WCTL is raised, AND gate 288 applies a binary 1 signal to inverter 74 to disable AND gate 64. AND gate 288 also applies a binary 1 signal to enable AND gate 66 so that the data stream on the DATA IN line will be passed through AND gate 66 and thence, through OR gate 70 to be shifted into register R-2 under the control of the clock source $\phi_S$. This will continue until the last character to be written into the memory from the peripheral has been shifted into register R-2. The peripheral will then lower the write control line WCTL indicating that it has completed transferring data into the memory. When this occurs, the read/write control circuit RWC initiates an operation to place two ESC characters into the memory to designate end of message. This is described below.

When flip-flop 262 was actuated to its set condition, it provided a binary 1 output signal to enable AND gate 290. When the decoder DC provided a binary 1 signal on its output line $E_e$, this signal was applied to AND gate 290 to reset flip-flop 262 and set flip-flop 292 through an OR gate 294. Flip-flop 292 provided a binary 1 output signal through OR gate 274 so that ANd gate 66 would continue to be enabled to pass the data from the DATA IN line through OR gate 70 to register R-2. In addition, when flip-flop 292 is in its set condition, it applies a binary 1 signal to enable an AND gate 296. When the peripheral completes writing data into the terminal memory, it lowers its write control line WCTL. When the write control line WCTL is lowered to carry a binary 0 signal, the signal is inverted by an inverter 298 and is ANDed with the output from flip-flop 292 by way of AND gate 296 to set a flip-flop 299. When flip-flop 299 is set, it serves to control the writing of ESC characters into registers R1 and R2 so as to designate the end of message.

During the time that flip-flop 299 is in a set condition, it applies a binary 1 signal to enable AND gate 54 in multiplexer M-1 so that during the next byte time, an ESC character is clocked into register R1 from the ESC character generator 96 through AND gate 54 and OR gate 56. Also during this byte time, flip-flop 299 provides a binary 1 signal to enable AND gate 68 in multiplexer M-2. This permits an ESC character to be shifted into register R2 from the ESC character generator 96. At the end of this byte time, ESC characters have been loaded into registers R1 and R2. A clock synchronizing pulse CS8 is then ANDed with the output from flip-flop 299 by means of an AND gate 300 to reset flip-flop 299 and set the reset state flip-flop 264 through Or gates 302 and 304. This will then remove the bus busy signal.

Mode 2 - Write Operation

This mode of operation permits an accessory or peripheral to write a new data into the memory starting at any location in the memory and concluding as in mode 1, wherein the control circuitry serves to insert two ESC characters to follow the new data when the write control line WCTL is lowered. The purpose of this write mode is to permit an accessory or peripheral to modify data which it has just written into memory or data previously existing in memory and terminating at an end of message code, i.e. the sequence (ESC) (ESC). An example of this would be accessory writing into memory and then detecting the existence of a parity error necessitating a rewrite of the data.

To select this mode of operation, the peripheral raises both the read control line RCTL and the write control line WCTL simultaneously. This will generally be a prompt response to decoding a predefined field definer ($X_i$) in the sequence (ESC) ($X_i$). The first character clocked into the memory will be written over the decoded $X_i$. The response by the read/write control circuit RWC to this mode selection will be to stop the memory within the same bit time as the mode select.

Then, the read/write control circuit will switch control of the $\phi_S$ clock to the peripheral by raising the read/write sync line R/W-SYNC to indicate to the accessory that it can begin clocking $\phi_S$. The read/write sync line R/W-SYNC will go high within the bit time following the mode select. The read control line RCTL may be lowered any time after the bit time that the mode select is made. This mode of operation will now be described in detail with reference to the circuitry of FIG. 11.

When both the read control line RCTL and the write control line WCTL are raised, AND gate 306 will apply a binary 1 signal to set flip-flop 292 through OR gate 294 and will also reset the reset state flip-flop 264 to raise the bus busy line. When flip-flop 292 is set, it applies a binary 1 signal through OR gate 274 and through normally enabled AND gate 276 to disable AND gate 278. This stops the clock source $\phi_S$. In addition, AND gate 276 applies a binary 1 signal to set the read/write sync flip-flop 284 to place a binary 1 signal on the read/write sync line R/W-SYNC. This informs the peripheral that it now has control of the memory clock. The peripheral raises its $\phi_S$ ENABLE line so that the $\phi_C$ clock pulses will be gated through now enabled AND gate 286 and thence, through OR gate 282 to provide the $\phi$ shift clock pulses to the terminal memory. Data will now be written into the terminal memory through the DATA IN line in the same manner as described above relative to the mode 1 operation. When the peripheral has completed writing data into the memory, it lowers its write control line whereupon AND gate 296 applies a binary 1 signal to reset flip-flop 292 and set flip-flop 299. When flip-flop 299 is set, it initiates an operation to write two ESC characters into the memory in the same manner described hereinbefore relative to the mode 1 write operation. At the completion of writing the two ESC characters into registers R1 and R2, respectively, the clock synchronizing pulse CS8 is applied through enabled AND gate 300 to reset flip-flop 299 and OR gates 302 and 304 to set the slip-flop 264 and lower the bus busy line.

Mode 3 - Write Operation

This mode of operation may be considered as an editing mode in that it permits the accessory or peripheral to write over the selected data in memory without inserting a new end of text (two ESC characters) into the memory when the writing operation is terminated. This mode is entered into by raising the read control line RCTL to stop memory at the desired location. The read/write control circuit responds by raising its read/write sync line R/W-SYNC and the peripheral may now write data into the memory. To accomplish this, the accessory raises the write control line. If this mode was selected upon decoding a filed definer or command then the first character clocked in will be written over the decoded character ($X_i$) in the field sequence (ESC) ($X_i$). Once this mode is entered, the read control line RCTL can remain high or be lowered. However, to leave this mode of operation, both the read control line RCTL and the write control line WCTL must be lowered. This mode of operation will now be described with reference to FIG. 11.

When the read control line RCTL is raised, AND gate 310 applies a binary 1 signal to set flip-flop 312 and reset flip-flop 264 through OR gate 266. This will raise the busy busy line. When flip-flop 312 is in its set condition, it applies a binary 1 signal through OR gate 274 to the normally enabled AND gate 276. AND gate 276, in turn, applies a binary 1 signal to disable AND gate 278 and stop the memory clock $\phi_S$. In addition, AND gate 276 applies a binary 1 signal to set flip-flop 284 to thereby raise the read/write sync line R/W-SYNC.

The acccessory can now write into the memory by raising the write control line WCTL and write data into the memory in the same manner as described earlier with respect to the mode 1 write control operation. When the operation is completed and both the read control line RCTL and the write control line WCTL have been lowered, then these binary 0 signals are inverted by inverters 314 and 316 and ANDed with the output from flip-flop 312 by means of an AND gate 318 to reset flip-flop 312 and to set flip-flop 264 through OR gates 302 and 304.

In the preceding discussion of the three write modes all writing was performed synchronously with the system clock $\phi_C$. It is also possible to write into memory asynchronously with $\phi_C$. Once a peripheral has control of the memory clock $\phi_S$, defined by a binary 1 on the R/W-SYNC line, it can control $\phi_S$ with $\phi_S$ ENABLE as previously described or it can drive $\phi_S$ with clock input $\phi_X$, keeping $\phi_S$ ENABLE at a binary 0. $\phi_X$ thus controls $\phi_X$ through AND gate 320 and OR gate 322 independent of $\phi_C$.

Read Control

An accessory or peripheral can raise the read control line RCTL to stop the memory clock $\phi_S$. For example, this is done whenever the accessory is reading from the memory and detects a field definer of interest that it wants to hold for later use. This is done, for example, in the imprint control operation where the imprint control circuitry, raises RCTL to stop memory upon detection of the imprint command $X_I$, conincident with performing a printing wheel set up operation.

In addition, the accessory, after gaining control of the memory clock $\phi_S$, may find it desirable to read at a data rate which is equal to or less than the system clock $\phi_C$. Two controls are available for this. Selected $\phi$hd C pulses can be applied to $\phi_S$ through AND gate 286 by control of $\phi_S$ ENABLE. In such case then, instead of raising the $\phi_S$ ENABLE line, this line would remain low and thereby enable an AND gate 320 through an inverter 322. With AND gate 320 being enabled, an asynchronous clock source $\phi_X$ may be clocked through AND gate 320 and OR gate 282 to serve as the memory clock source $\phi_S$.

CARD AND FIXED DATA WRITE-IN CONTROL

Reference is again made to FIG. 6 from which it is seen that data is written into the memory from the card readers CR-1 and CR-2, and from the fixed data source FDS under the control of a card and fixed data write-in control circuit FCW. This control circuit operates in conjunction with the read/write control circuit RWC in entering data into the terminal memory.

Fixed Data Write-In

Figure 12:
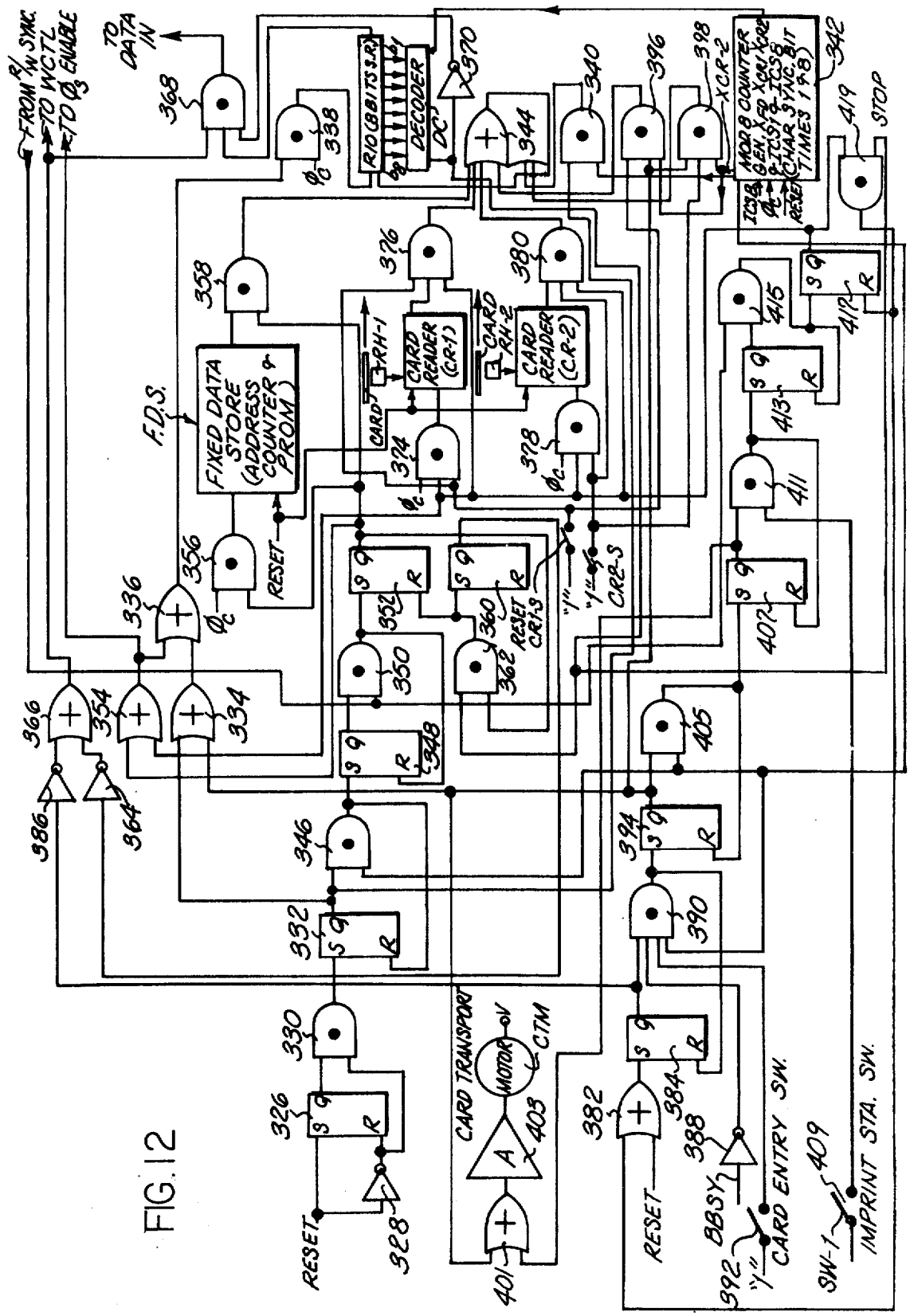
FIG. 12 is a schematic-block diagram illustration of a fixed data and card data write-in control circuit.

Reference is now made to FIG. 12 which illustrates the circuitry employed in the card and fixed data write-in control circuit FCW. While the terminal memory is being reset, the reset control circuit RCC provides a reset signal which serves to set a flip-flop 326 in the control circuit RCW. Once the reset function has been completed, this signal is lowered and inverted by an inverter amplifier 328 to reset flip-flop 326. However, before the flip-flop changes state, its binary 1 output signal and the binary 1 output signal obtained from inverter amplifier 328 are anded by means of an AND gate 330 to apply a binary 1 signal to set a flip-flop 332.

When flip-flop 332 is set, it sets up an operation by which the fixed data field definer $X_F$ in the sequence (ESC) ($X_F$) is loaded into register R-10. Thus, with flip-flop 332 in its set condition, it applies a binary 1 signal through an OR gate 334 and another OR gate 336 to enable an AND gate 338 so that clock pulses from the system clock source $\phi_C$ may be passed through the AND gate to the shift input of register R-10. Also, with flip-flop 332 in a set condition, it applies a binary 1 signal to enable an ANd gate 340 to pass the eight bit field definer character $X_F$ from a clock synchronizing and character generating circuit 342. This circuit serves to receive the $\phi_C$ clock train and provide synchronizing pulses ICS1 in synchronism with bit $b_1$ and ICS8 in synchronism with bit $b_8$. It also serves to continuously provide eight bit field definer characters $X_F$, $X_{CR1}$ and $X_{CR2}$. These field definer characters are loaded only when an associated AND gate is enabled. Thus, with AND gate 340 being enabled, the eight bit field definer character $X_F$ is passed through the AND gate and thence, through an OR gate 344 and clocked into register R10 by the shift pulses from the system clock $\phi_C$. At the end of the byte time that field definer $X_F$ was loaded, a synchronizing pulse ICS8 is applied to an AND gate 346 to reset flip-flop 332 which then disables AND gates 338 and 340 and the field definer character $X_F$ has all eight bits loaded into register R10.

When AND gate 346 receives the synchronizing pulse ICS8 it also applies a binary 1 signal to set a flip-flop 348. This flip-flop serves to enable an AND gate 350 so that it is conditoned to set a flip-flop 352 upon receipt of the read/write sync signal R/W-SYNC from the read/write control circuit RWC. When this occurs, AND gate 350 resets flip-flop 348 and sets flip-flop 352. Flop-flop 352 controls the operation of writing the fixed data field definer $X_F$ and the fixed data into the terminal memory through register R10. To accomplish this, flip-flop 352, when in its set condition, applies a binary 1 signal through an OR gate 354 to thereby raise the $\phi_S$ ENABLE line to take control of the clock source $\phi_S$ and apply shift pulses to the terminal memory. At the same time, the binary 1 output from flip-flop 352 enables AND gate 356 so that clock pulses from the system clock source $\phi_C$ may be passed to actuate the fixed data source FDS.

The fixed data source may take various forms and preferably includes an address counter together with a programmed read only memory (PROM). Each pulse passed by AND gate 356 serves to advance the counter by one increment. As the counter is incremented, it addresses the read only memory to obtain one bit of information. Thus, information in the form of a bit serial train of pulses is obtained from the fixed data source and is applied through an enabled AND gate 358 and thence, through OR gate 344 to register R10. The fixed data source provides a plurality of bits with every eight bits constituting a character with the number of characters involved being a fixed number in dependence upon the manner in which the ROM has been programmed. The last character obtained from the ROM is a stop character and this is decoded at register R10 by a decoder DEC. The decoder in response to decoding the stop character applies an output to set a flip-flop 360 through an enabled AND gate 362. This pulse also serves to reset flip-flop 352. When flip-flop 360 is set, it applies a binary 1 signal through an inverter 364 to lower the write control line WCTL through OR gate 366. Flip-flop 360 is reset by the reset line when the memory is being reset. The binary 0 signal provided during this condition is inverted by inverter 364 to raise the write control line WCTL. While the write control line WCTL carries a binary 1 signal, it enables an AND gate 368 so that the pulses being shifted through register R10 by the system clock source $\phi_C$ are applied through the AND gate to the DATA IN line and thence, through multiplexer M-2 into register R2 of the terminal memory. AND gate 368 is disabled by an inverter 370 when the decoder DEC detects the stop code in the fixed data field.

Writing Into Memory From Card Readers

It is contemplated that the terminal will be provided with a card reader for reading data such as a customer's identity number on a credit card. Depending upon the type of credit card employed, the card reader may be a conventional, optical card reader such as card reader CR-1 or a conventional, magnetic card reader such as card reader CR-2. Each card reader is provided with an associated read head. Thus, card reader CR-1 is provided with a card read head RH-1 and card reader CR-2 is provided with a read head RH-2. As is known, these read heads provide card data for entry into the card reader logic circuitry which conventionally includes a data store means such as a multibit buffer. Preferably, the card readers employ buffers for storing the data so that when clock pulses are applied thereto, the data will be clocked out in bit serial fashion. Card reader CR-1 is provided with shift or clock pulses from the system source $\phi_C$ by way of an AND gate 374. As the card reader receives these pulses, it shifts one data bit out of each clock pulse with the data bits being applied through an AND gate 376 and thence, through OR gate 344 into register R10. Similarly, card reader CR-2 receives clock pulses from the system clock $\phi_C$ through an AND gate 378 so that data bits are shifted out of the buffer in bit serial fashion through an AND gate 380 and thence, through OR gate 344 to the register R10. It is contemplated that suitable circuitry will be used to determine which of the two card readers is to be employed and this is illustrated herein by means of simple, normally open switches CR1-S and CR2-S which, when closed, serve to respectively enable one input of AND gates 374 and 378.

After the terminal has been reset, a trigger pulse is applied through an OR gate 382 to set a flip-flop 384 to await a card being placed into the terminal to commence the read operation. Flip-flop 384, when set, provides a binary 1 output signal which is inverted by an inverter amplifier 386 so that a binary 0 signal is carried by the write control line WCTL. If the bus is not busy, then an inverter amplifier 388 applies a binary 1 signal to AND gate 390. If a card is now entered into the terminal, a card entry switch of suitable design and illustrated herein as a simple, normally open switch 392, operates to apply another binary 1 signal to AND gate 390. With AND gate 390 being thus enabled then, upon receipt of a clock synchronizing pulse ICS8, the AND gate will apply a binary 1 signal to set a flip-flop 394 and to reset flip-flop 384. With flip-flop 384 being reset, its binary 0 output signal is inverted by inverter amplifier 386 and applied as a binary 1 signal through OR gate 366 to raise the write control line WCTL. The read/write control circuit RWC will now condition the writing circuitry and apply a return signal in the form of a read/write sync pulse R/W-SYNC so that the card data may be entered into the memory.

When flip-flop 394 is in a set condition, it controls the loading of the field definer $X_{CR1}$ or $X_{CR2}$, depending upon which card reader is in effect, into the terminal memory. Thus, with this flip-flop being set, it applies a binary 1 signal to both AND gates 396 and 398. These AND gates serve to respectively pass the field definer characters $X_{CR1}$ and $X_{CR2}$ depending upon which gate is enabled. This is obtained in dependence upon which reader is in effect, as represented by closure of switch CR1-S or CR2-S. Thus, depending upon the type of card employed, one of the switches will be closed to enable either AND gate 396 or 398. The enabled AND gate will then pass the eight bit field definer character $X_{CR1}$ or $X_{CR2}$ through OR gate 344 and then be clocked into the eight bit shift register R10 by enabled AND gate 338. AND gate 338 is enabled for one byte time when flip-flop 394 is in a set condition.

During the time that flip-flop 394 is in its set condition, it applies a binary 1 signal through an OR gate 401 to energize a card transport motor CTM through a suitable amplifier 403. The card transport motor serves to operate suitable means by which the card is driven through the terminal structure so that it may be read by the card reader in effect. Once the card field definer has been loaded into register R10, the system clock synchronizing pulse ICS8 applied to AND gate 405 to set flip-flop 407 and reset flip-flop 394. The card transport motor continues to run since flip-flop 407 will apply a binary 1 signal through OR gate 401 to run the transport motor through amlifier 403. While flip-flop 407 is set, the circuitry waits for an indication that the card being read has been transported to the card imprint station. This indicates to the circuitry that the card reading function has been completed. At that time, a suitable switch, indicated herein as a simple, normally open switch 409, applies a binary 1 signal to AND gate 411 which then applies a binary 1 signal to set a flip-flop 413 and reset flip-flop 407. The writing of data from the card reader, however, is not commenced unless the circuitry is provided with a read/write sync signal R/W-SYNC. The output from flip-flop 413 and the read/write sync signal R/W-SYNC are anded by means of an AND gate 415 to reset flip-flop 413 and set a flip-flop 417.

While flip-flop 417 is in its set condition, it serves to control the loading of the card data into the terminal memory through register R10. Thus, while this flip-flop is in its set condition, it applies a binary 1 signal to enable either AND gate 374 or AND gate 378 depending upon which card reader is activated by closure of switch CR1-S or switch CR2-S. The data in the selected card reader is shifted in bit serial fashion under the control of shift pulses obtained from the system clock source $\phi_c$ by way of either AND gate 374 or 378. The bit serial data from the selected card reader is outputted through either AND gate 376 or 380 and thence, through OR gate 344 and loaded into register R10. The data is continuously shifted through register R10 by clock pulses obtained from the system clock $\phi_c$ through enabled AND gate 338. AND gate 338 is enabled as long as flip-flop 417 is in its set condition. As in the case with the fixed data source, the last character in the card reader buffer stage is a stop character and when this eight bit character is decoded at register R-10 by means of decoder DEC, the decoder provides a stop pulse to reset flip-flop 417 through an AND gate 419. The decoder output also disables AND gate 368 through inverter amplifier 370 to prevent data bits from being shifted through the AND gate to the DATA IN line. When AND gate 419 resets flip-flop 417, it also applies a binary 1 signal through OR gate 382 to set flip-flop 384. This lowers the write control line WCTL through inverter amplifier 386 and OR gate 366.

COMMUNICATIONS CONTROL CIRCUIT

Reference is again made to FIG. 6, which illustrates the communications control circuit CCC which serves as the communications link for a two-way communication between the terminal and an input/output peripheral, such as the CPU. To facilitate an understanding of this invention, the communications control circuit CCC is described herein in two parts with one part being directed to the circuitry employed for entering data from the CPU into the terminal memory and the second part being directed to the circuitry employed for reading data from the memory and transmitting it to the CPU. The receiving portion of the communications control circuit will be referred to as circuit CCC-1 and the transmitting portion will be referred to as circuit CCC-2. The description which follows below is directed to the transmitting circuit CCC-1.

Data may be entered into the terminal memory from the CPU under the control of the communication control circuit in conjunction with the peripheral read/write control circuit RWC illustrated in detail in FIG. 11. The message received by the terminal may be of a message format such as that illustrated in FIG. 5D. As shown there, the message includes certain transmission characters, such as the start of header character SOH, the poll indentity character PID, the start of text character STX, the end of text character ETX, and the longitudinal redundancy character LRC. These five characters are removed from the message as it is entered into the terminal memory. This function is performed by the communications control circuit. In addition, the communications control circuit employs circuitry for checking the received message for character parity error or longitudinal redundancy character error and if either error occurs, a negative acknowledgement NAK is sent to the CPU. If there is no error, then the terminal transmits a positive acknowledgement ACK to the CPU. The message format of the outbound transmission from the CPU as received by the terminal may appear as illustrated in FIG. 14A. The terminal response may take the format as illustrated in FIG. 14B. If the terminal response is a negative acknowledgement NAK, then it is contemplated that the CPU will be programmed to retransmit its message to the terminal with the retransmitted outbound message format taking the form as illustrated in FIG. 14C. When the message is entered into the terminal memory, the communications control circuit inserts a field definer $X_{CPC}$ indicative that the message data that follows is message data obtained from the CPU. This format is shown, for example, in FIG. 14D. The manner in which these functions is attained by the communications control circuit will now be described with reference to the circuitry illustrated in FIG. 13.

Reference is now made to FIG. 13A which illustrates the circuitry in the communications control circuit that is employed for receiving an outbound transmission from a CPU or other remote facility for entering data into the terminal memory. As shown in FIG. 13A, the communications control circuit forms a communications link with the CPU through modems MO-1 and MO-3. The message received from the CPU is applied by modem MO-1 to an asynchronous receiver ASR which is clocked by the system clock source $\phi_C$. The asynchronous receiver ASR, as well as the asynchronous transmitter ATR, may be of conventional design. The asynchronous receiver serves to receive data from the CPU which may be at a relatively slow transmission rate, such as on the order of 300 to 1200 bits per second, and synchronize the received bit train with the terminal system clock $\phi_C$ which may be at a substantially higher bit rate, such as on the order of 76,800 bits per second. The asynchronous receiver ASR provides received data clock pulses $\phi_{RDC}$ which are synchronized with the system clock pulses $\phi_C$. These received data clock pulses $\phi_{RDC}$ are applied through an OR gate 420 and applied as shift pulses to the shift input of an input data register R-20. For purposes of simplicity, the stop and start bits typically employed in such a transmission scheme, will be ignored in this description. Register R-20 will be considered herein as being an eight bit shift register for storing received characters as eight bit characters with bit $b_8$ of each character being a parity bit.

A receiving decoder RDC serves to decode the characters when located in register R-20. To facilitate the decoding operation, the asynchronous receiver ASR provides a sync pulse RDA once during each byte time of the received data clock pulses $\phi_{RDC}$. This synchronizing pulse RDA is applied to the decoder RDC at a point in time that bits $b_1$ through $b_8$ of a character are located in register R-20. This decoder serves to decode the transmission characters SOH, PID, STX, ETX, and provide a binary 1 output signal on an associated decoder output line when the character of interest is located in register R-20. The poll indentification character PID will normally represent a unique address for a particular one of a plurality of terminals employed in the data capture system. Consequently then, the decoder RDC at each terminal will provide a binary 1 output signal on its PID output line only when it has decoded a unique eight bit PID character associated with the particular terminal.

When the decoder RDC decodes a start of header character SOH, it sets a flip-flop 422 to enable an AND gate 424. If the CPU is polling this terminal, decoder RDC will decode its PID character and provide a binary 1 output signal on its PID output line and this signal is anded with the output from flip-flop 422 to set a flip-flop 426. Detection of the poll identification character also causes flip-flop 422 to be reset. This takes place the same bit time that the PID output has caused AND gate 424 to set flip-flop 426. When flip-flop 426 is in its set condition, this is indicative that this terminal has been polled by the CPU. The communications circuitry will now operate to raise the write control line WCTL to signal the read/write control circuit RWC that data is to be entered into he terminal memory.

When flip-flop 426 is in its set condition, it applies a binary 1 signal through an OR gate 428 to set a slip-flop 430. When flip-flop 430 is in its set condition, it raises the write control line WCTL. The circuitry will now wait for the read/write sync line R/W-SYNC to be raised by the read/write control circuit RWC as discussed with reference to FIG. 11.

Figure 13B:
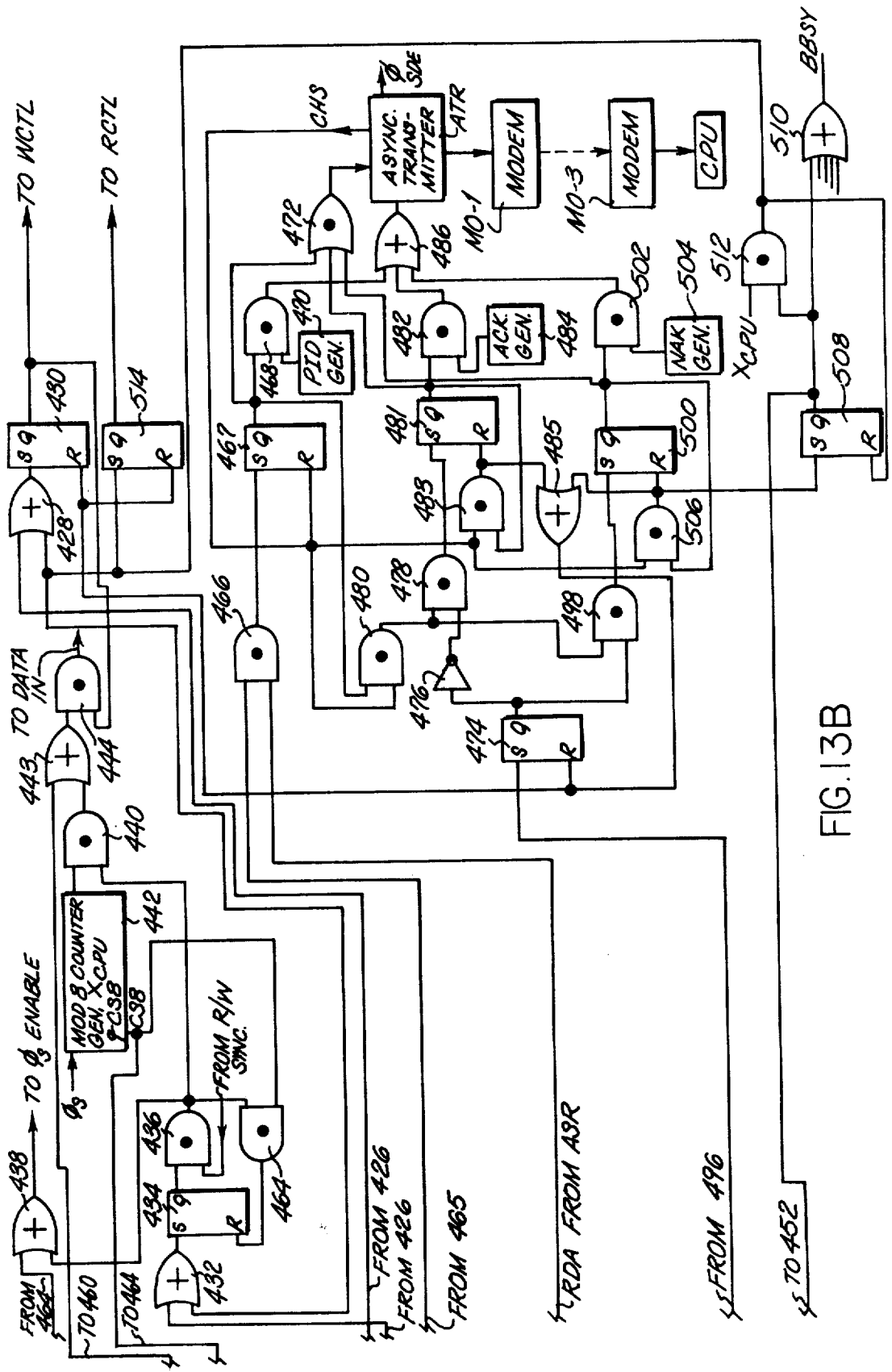

When AND gate 424 applied a binary 1 signal to set flip-flop 426, it also applied a binary 1 signal through an OR gate 432 to set a flip-flop 434, FIG. 13B. This enables an AND gate 436 while the circuitry waits for the read/write sync line R/W-SYNC to be raised. When this line is raised, AND gate 436 applies a binary 1 signal through an OR gate 438 to raise the $\phi_S$ ENABLE line to take control of the clock source $\phi_S$. In addition, AND gate 436 applies a binary 1 signal to enable AND gate 440 so that an eight bit CPU field defining character $X_{CPU}$ may be passed through the AND gate from an $X_{CPU}$ character generator and clock synchronizing circuit 442. This circuit is clocked by the memory clock $\phi_S$ and serves to provide a synchronizing pulse CS8 at bit time $b_8$ as well as to provide a continuous data train for defining the eight bit CPU field defining character $X_{CPU}$. The $X_{CPU}$ character is applied terminal memory through multiplexer M-2. At the end of this byte time, generator 442 provides a synchronizing pulse CS8 which resets flip-flop 434 through enabled AND gate 446. When flip-flop 434 is reset, it disables AND gate 440 to prevent further character bits from being passed through OR gate 443 and AND gate 444 to the DATA IN line.

While flip-flop 426 is in its set condition, it enables an AND gate 450 through an OR gate 452. When decoder RDC decodes the start of text character STX in register R-20, it sets a flip-flop 454 through enabled AND gate 450 and resets flip-flop 426. When flip-flop 454 is set, it is indicative that the start of text character STX is located in register R-20. Flip-flop 454, when in its set condition, serves to enable an AND gate 456. The circuitry now waits for the asynchronous receiver ASR to provide a synchronizing pulse RDA when the first data character in the message is loaded into register R-20. When this occurs, AND gate 456 applies a binary 1 signal to set flip-flop 458 and to reset flip-flop 454 and to set flip-flop 454 through OR gate 463.

When flip-flop 458 is in its set condition, it controls the clocking of a message character into the terminal memory through the DATA IN line. Thus, when this flip-flop is set, it enables an AND gate 460 and also enables an AND gate 462. When a synchronizing pulse RDA is applied to AND gate 462, this AND gate will set a flip-flop 464 which enables an AND gate 466. When AND gate 466 is enabled, it passes the $\phi_C$ clock pulses through OR gate 420 to apply shift pulses to register R-20 at the system clock rate whereupon the data in register R-20 is shifted in bit serial fashion through AND gate 460 and thence, through OR gate 443 and through enabled AND gate 444 to the DATA In line to be written into the terminal memory. One byte time later, the generator 442 applies a synchronizing pulse CS8 to reset flip-flop 464 to lower the $\phi_S$ ENABLE line to sb p the terminal memory clock and to disable AND gate 466 to prevent the system clock pulses $\phi_C$ from being applied to register R-20.

In the foregoing description, the first character in the message was written into the terminal memory by shifting data in bit serial fashion out of register R-20 at a rate corresponding with the system clock pulse source $\phi_C$. This data was written into the terminal memory at a rate in accordance with the terminal memory clock source $\phi_S$ while the $\phi_S$ ENABLE line was raised. Once the character has been lifted out of register R-20, the terminal memory was stopped and AND gate 466 was disabled. The asynchronous receiver will now load a second character in the message into register R-20. When this is completed, the asynchronous receiver will apply a synchronizing pulse RDA to again set flip-flop 464. This will again enable AND gate 466 and raise the $\phi_S$ ENABLE line. The second eight bit character will now be shifted in bit serial fashion at a rate corresponding with the system clock source $\phi_C$ until generator 442 provides a synchronizing pulse CS8 to again reset flip-flop 464. This operation will continue until all of the message characters have been written into the terminal memory. This will be detected when the end of text transmission character ETX is located in register R-20.

When the end of text character ETX is located in register R-20, the decoder RDC will apply a binary 1 signal to reset flip-flop 458. This will disable AND gates 460 and 462 to thereby prevent data transmission along the DATA IN line and to cause the $\phi_S$ ENABLE line to be lowered.

When the decoder RDC decodes the end of text character ETX, it sets a flip-flop 465 through AND gate 459 before flip-flop 458 changes state. When flip-flop 465 is in its set condition, it is indicative that the end of text character ETX is located in register R-20. On the next synchronizing pulse RDA, flip-flop 465 sets flip-flop 467 through AND gate 466. This causes the terminal to send a poll identification character PID as a part of the terminal response back to the CPU. Thus, when the flip-flop 467 is in its set condition, it enables an AND gate 468 to pass a poll indentification PID from a suitable PID character generator 470 through an OR gate 472 to be transmitted by the asynchronous transmitter ATR. Once the character has been sent, the transmitter ATR provides a reset pulse CHS indicative that the character has been sent and this reset pulse is utilized to reset flip-flop 467. As shown in FIG. 14B, the terminal response will also include a positive acknowledgement character ACK or a negative acknowledgement character NAK.

If there is an error in the CPU transmitted message, the terminal communications control circuit will respond with a negative acknowledgement NAK. If a negative acknowledgement is to be transmitted, a flip-flop 474 will be actuated to its set condition. If this flip-flop is not in its set condition, then a positive acknowledgement character ACK will be transmitted. If a positive acknowledgement character ACK is to be transmitted, then inverter amplifier 476 enables an AND gate 478. When the PID character was transmitted by transmitter ATR, the character sent signal CHS and the output from flip-flop 467 were anded by way of an AND gate 480. AND gate 478 applies a binary 1 signal to flip-flop 481 indicating that a positive acknowledged character ACK should be transmitted. With flip-flop 481 being in its set condition, it applies a binary 1 signal to enable an AND gate 482. This permits an acknowledgement character to be transmitted from an acknowledgement character generator 484 through AND gate 482 and thence, through OR gate 486 to be transmitted by the asynchronous transmitter ATR. Flip-flop 481 is reset by CHS through enabled AND gate 483. This same reset signal is applied through OR gate 485 to reset flip-flop 430 and to reset flip-flop 514 if it has been set.

If a negative acknowledgement character NAK is to be transmitted, then flip-flop 474 will be actuated to its set condition. The state of flip-flop 474 is controlled by a longitudinal redundancy character generator and checking circuit 490 and a bit serial character parity checking circuit 492. These circuits are conventional in the art. The longitudinal redundancy character checker is clocked by the asynchronous receiver pulse source $\phi_{RDC}$ and serves to examine the message structure for a longitudinal redundancy character error. If there is an error, the circuit will apply a binary 1 signal to one input of an AND gate 494. The bit serial character parity checking circuit 492 serves to check the parity of each character rather than the entire message and if an error is detected, applies a binary 1 signal through OR gate 496 to set flip-flop 474. Circuit 490 serves to provide an LRC error signal when the end of text character has been decoded and flip-flop 465 is in its set condition. The error signal is passed by AND gate 494 in synchronism with the synchronizing clock pulse RDA to set flip-flop 474. The synchronizing pulse RDA also resets flip-flop 465 through AND gate 457.

When an error has been detected, flip-flop 474 enables AND gate 498 and disables AND gate 478. Consequently, after the asynchronous transmitter has sent a poll indentification character PID, AND gate 480 applies a binary 1 signal through AND gate 498 to set flip-flop 500. When flip-flop 500 is in its set condition, this is representative that the terminal has been conditioned to send a negative acknowledgement character NAK from a character generator 504 through OR gate 486 to be transmitted to the CPU by the asynchronous transmitter ATR. After this character has been sent, the character send pulse CHS is applied through an AND gate 506 to reset flip-flop 500 and set a flip-flop 508. The output of AND gate 506 is also applied to the reset input of flip-flops 430, 474, and 514 through OR gate 485.

When flip-flop 508 is set, because a negative acknowledgement character has been sent to the CPU, it applies a binary 1 signal to raise the bus busy line through an OR gate 510. Flip-flop 508 also enables an AND gate 512 and circuitry now waits for the CPU field defining character $X_{CPU}$ to be detected at register R1 in the terminal memory recirculation path — see FIG. 7. This is the field definer written into the terminal memory by the communications control circuit to define that the data following this character is data written into the terminal memory from the CPU. It is desirable then, when asking the CPU to retransmit its message, that the terminal memory be stopped with the CPU field definer $X_{CPU}$ located in register R1 to facilitate immediate writing of a retransmitted message into the terminal memory over the message previously entered. When the field definer character $X_{CPU}$ is detected at register R1 by decoder DC, the decoder applies a binary 1 signal through enabled AND gate 512 to set flip-flops 434, 514, and 430. With both flip-flops 430 and 514 being set, both the write control line WCTL and the read control line RCTL are raised. This is communicated to the read/write control circuit RWC which stops the terminal memory.

Flip-flop 434 serves to enable AND gate 436. When the read/write control circuit RWC responds with a binary 1 on the R/W-SYNC line, AND gate 436 applies a binary 1 to the $\phi_S$ ENABLE line and allows AND gate 440 to write $X_{CPU}$ into memory RM.

The CPU retransmits its message to the terminal after receiving a negative acknowledgement character NAK, and it is contemplated that the CPU is programmed such that the first character in the retransmitted message format is the start of text character STX followed by the message characters as shown by the illustration of FIG. 14C. This start of text character is decoded by the decoder RDC to apply a binary 1 signal through enabled AND gate 450 to set flip-flop 454. On the next synchronizing pulse RDA, AND gate 456 served to set flip-flop 458 indicating that the first character in the message has been loaded into register R20. Thereafter, the message characters are entered into the terminal memory in the manner described above. If the received message is now proper, the terminal will respond with a positive acknowledgement character ACK or if there is still an error in the transmission, the terminal will respond with a negative acknowledgement character NAK in the same manner as described above.

RESET MAIN MEMORY

The main memory RM is reset in response to actuation of the keyboard reset key or when a card is exited from the terminal. The memory is also reset in response to a stored reset command $X_R$ written into the memory from a peripheral, preferably the CPU.

Whenever a reset command $X_R$ is in the recirculating memory, it will be detected by decoder DC when the command is located in register R1. This sets into operation a series of events by which the memory is cleared and then two ESC characters in succession are written into the memory to assist in writing new data into the memory. The memory is cleared by entering NUL characters, each in the form of an eight bit train of binary 0 pulses, into the memory.

The reset command $X_R$ is preceded by an ESC character. Thus, when the reset command is located at register R1, and ESC character is located at register R2. The first step in clearing the memory is to put a NUL character into register R2 as the ESC character in that register is shifted into register R3. In this manner, a NUL character is written over the detected reset command. This is achieved by setting a flip-flop 540 so that it applies a binary 1 signal through an OR gate 542 which is then inverted by an inverter 76 to disable AND gate 64 in multiplexer M-2. Consequently then, OR gate 70 in multiplexer M-2 applies a binary 0 signal to the input of register R2 so that a binary 0 signal is written into register R2 for each clock pulse from clock source $\phi_S$. This takes places for one byte time so that an eight bit NUL character is written into register R2 in place of the eight bit $X_R$ command. During the next byte time, the NUL character in register R2 is shifted into register R3 and an ESC character is written into register R2 while an $X_R$ command is written into register R1. This is implemented with the circuitry discussed below.

One byte time after setting flip-flop 540, it is reset by a clock synchronizing pulse CS8 from generator 96. As will be recalled from FIG. 7, generator 96 provides a synchronizing pulse CS8. Generator 96 also continuously provides ESC characters. An $X_R$ command may be obtained by inverting the ESC character, as with an inverter 545. Before flip-flop 540 is reset by pulse CS8, the output of the flip-flop applies a binary 1 signal to an AND gate 546. The CS8 pulse applied to flip-flop 540 is also applied through enabled AND gate 546 and an OR gate 547 to set a flip-flop 548.

When flip-flop 548 is set, it enables AND gate 52 in multiplexer M-1. Inverter 545 applies a reset command $X_R$ through enabled AND gate 52 and through OR gate 56 into register R1. When flip-flop 548 is set, it also enables AND gate 68 in multiplexer M-2 through an OR gate 554. During the next byte time, an ESC character is gated through AND gate 68 and OR gate 70 into register R2 while an $X_R$ command is gated into register R1, as was described hereinabove.

At the end of the byte time during which the ESC character was gated into register R2 and the $X_R$ character was gated into register R1, flip-flop 548 is reset by a clock synchronizing pulse CS8 through AND gate 556. The synchronizing clock pulse CS8 is also applied through an enabled AND gate 558 to set a flip-flop 560. It is to be recalled that flip-flop 548 does not change state until the next bit time and, hence, during the bit time that a synchronizing pulse CS8 is applied to AND gate 558, this AND gate is enabled. At the end of the next byte time, another clock synchronizing pulse CS8 will be anded with the output of flip-flop 560 through an AND gate 562 to reset flip-flop 560 and to set flip-flop 566. During this byte time, however, the ESC character in register R2 is shifted into the register R3 and the 8 bit reset command character $X_R$ is shifted from register R1 into register R2.

At this stage in the operation of resetting the memory, a reset command $X_R$ is in register R2. All of the following character positions will receive NUL characters until the reset command $X_R$ is again detected at regist R1. A continuous stream of NUL characters is written into the memory through multiplexer M-2. This is implemented by the circuitry discussed below.

Flip-flop 566 will remain in its set condition until the $X_R$ command is again detected at register R1. During the interim period, the output from flip-flop 566 is applied through an enabled AND gate 567 and an OR gate 542 and is inverted by inverter 76 to disable AND gate 64 in multiplexer M-2. So long as this AND gate is disabled, a binary 0 level is applied to the input of register R2 so that NUL characters are shifted into the register by clock source $\phi_S$. The reset command $X_R$ recirculates through the memory and is followed by a train of successive NUL characters. Once the reset command $X_R$ is detected at register R1, each of the following character positions is occupied by a NUL character. The next step in completing the reset command $X_R$ and to add a succeeding ESC character so that the memory will contain two successive ESC characters with the rest of the character positions being occupied by NUL characters. This is implemented by the circuitry discussed below.

When the reset command $X_R$ is detected at register R1, decoder DC applies a binary 1 signal to reset flip-flop 566 and disables AND gate 567 through an inverter 569. Before flip-flop 566 changes state, the reset command and the binary 1 output of the flip-flop are anded through an AND gate 570 to set flip-flop 572. These signals are also anded through an AND gate 570 to set flip-flop 572. These signals are also anded through an AND gate 574 to provide a binary 1 output which is applied through an OR gate 576 and thence, through OR gate 554 enable AND gate 68 in multiplexer M-2 and through OR gate 576 to enable AND gate 54 in multiplexer M-1 to write bit 1 of the ESC character into registers R1 and R2. During the next seven bit times flip-flop 572 provides the binary 1 to OR gate 576 to enable AND gate 68 and 54 to write in the remaining seven bits of the ESC character from generator 96 into registers R1 and R2. The ESC character written into R2 is effectively written over the $X_R$ character. At the end of the byte time, a clock synchronizing pulse CS8 resets flip-flop 572 to prevent further ESC characters from being written into registers R1 and R2. Consequently then, the pulse train now existing in the recirculating memory is comprised of two succeeding ESC characters with the remaining character positions occupied by NUL characters.

When the reset command $X_R$ was first detected at register R1, decoder DC set a flip-flop 578. This flip-flop remains set until the reset operation is completed and is reset by flip-flop 572 through an AND gate 580. While flip-flop 578 is set, it raises the terminal RESET line through an OR gate 582 to indicate to other circuits in the terminal that the memory is being reset.

The memory is also reset in response to actuation of a reset key on the keyboard or in response to a card being exited from the terminal. The reset key is simply illustrated in FIG. 15 as a normally open switch 584 which is closed upon a reset key actuation to apply a binary 1 signal through an OR gate 586 to set a flip-flop 588. Similarly, a normally open switch 590 is illustrated for representing a card exit actuated switch and is closed as a card exits from the terminal to apply a binary 1 signal through OR gate 586 to set flip-flop 588. So long as flip-flop 588 is set, it raises the RESET line through OR gate 582.

Before flip-flop 588 changes state, its output circuit carries a binary 0 signal which is inverted by an inverter 592 to enable an AND gate 594. Closure of either switch 584 or switch 590 causes a binary 1 signal to be applied through AND gate 594 to set a flip-flop 596.

When flip-flop 596 is set, it serves to set flip-flop 548 through an AND gate 598 to cause an ESC character to be written into register R2 and a reset command $X_R$ to be written into register R1, in the same manner as described before. The previously described operation by which the memory is cleared will continue until AND gate 580 applies a reset pulse to flip-flops 578 and 588. This will occur on the completion of the reset operation and the RESET line will be lowered.

VISUAL DISPLAY

Keyboard entered data is displayed on the terminal display as it is entered from the keyboard. Also, data stored in the memory is displayed on command. The description below deals with the manner in which the keyboard entered data is displayed. This followed by a description as to the manner in which stored data is displayed on command.

Keyboard Data Entry Display

Figure 16A:
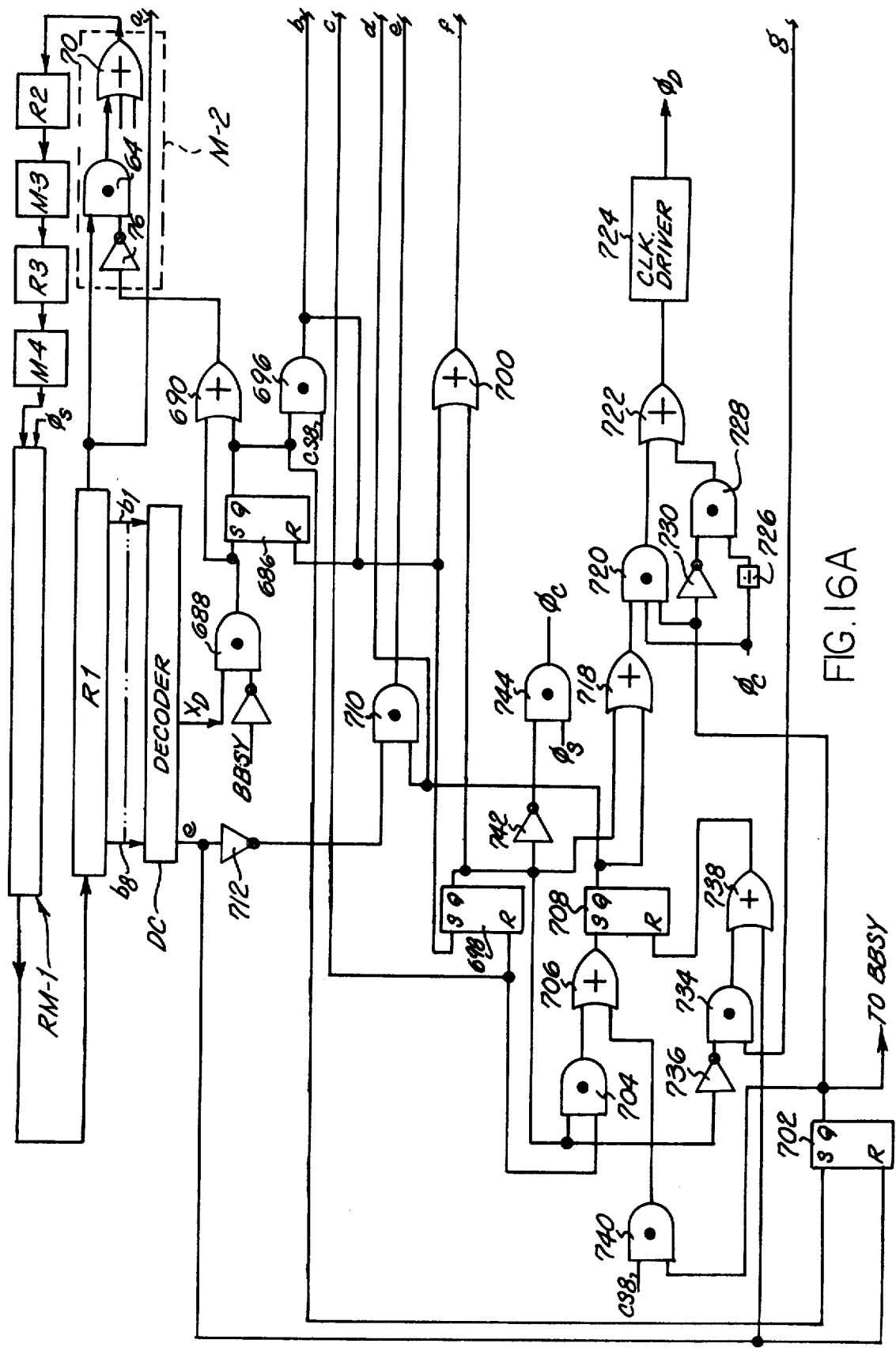
FIG. 16A and 16B taken together is a schematic-block diagram illustration of a visual display, auxiliary display memory, and a display control circuit.
Figure 16B:
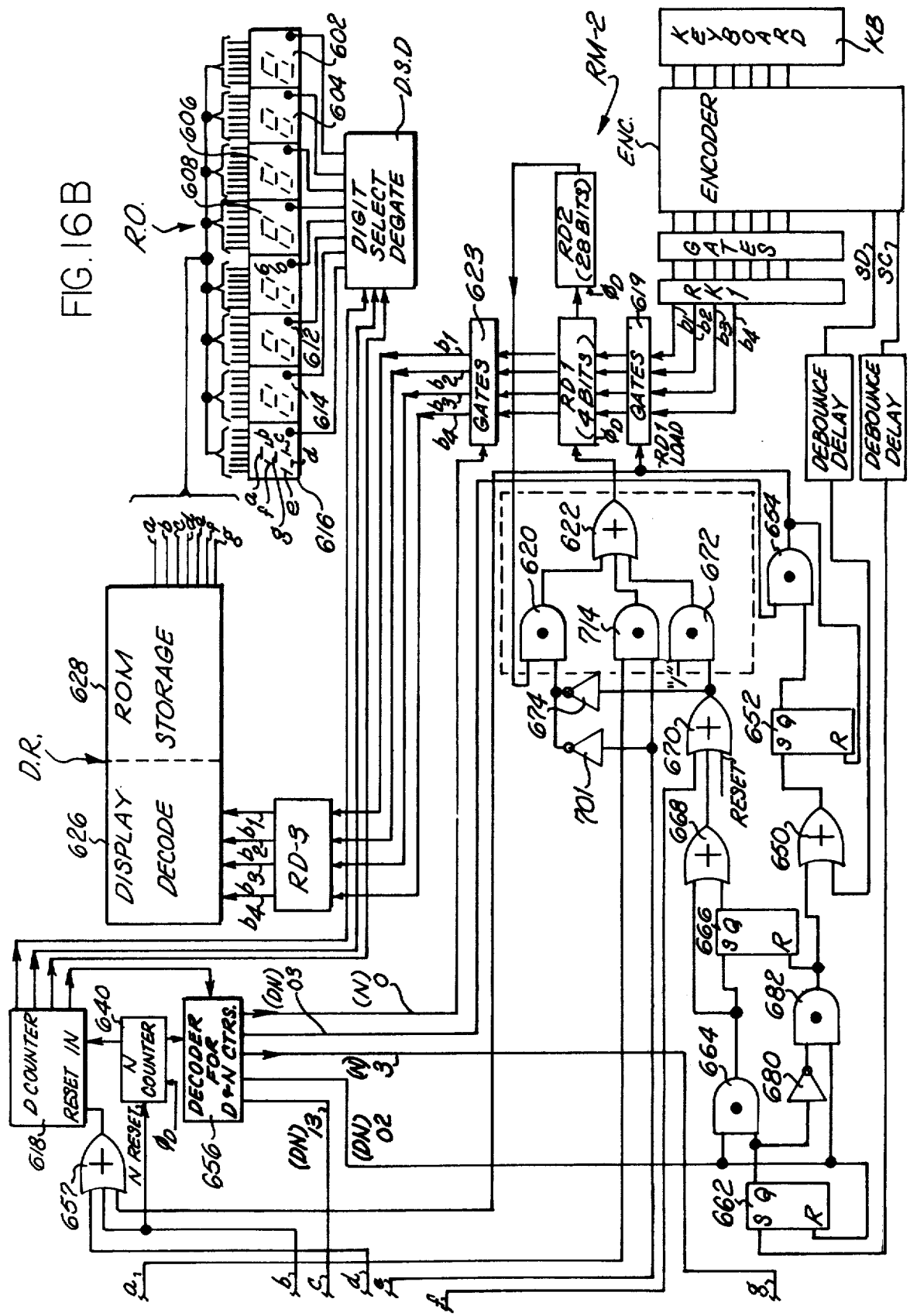

The keyboard entered data is displayed on a eight position readout RO, illustrated in FIG. 16. This is a visual display and may take any suitable form. In the embodiment illustrated, however, the visual readout RO takes the form of an eight digit display which incorporates seven segment units 602, 604, 606, 608, 610, 612, 614 and 616. Display units 602 through 616 may be considered as position 1 through 8 respectively with position 1 or unit 602 being the position of the least significant digit of character data being displayed. If all display units are being employed for displaying data, the most significant digit of character data is displayed by unit 616 in position 8. Data entered from the keyboard is in effect entered into the display from the right side at position 1 until the readout display is filled. If more than eight digits are entered, only the last eight digits entered will be displayed. Each of the display units is referred to as a seven segment display incorporating seven bars $a$, $b$, $c$, $d$, $e$, $f$ and $g$ with the seven bars being arranged as illustrated in position 8 at unit 616. For a given display position, each of the bars serves as an anode and is separately selected by one of the seven input lines to that display position. However, visual display is not achieved unless a circuit is completed to the cathode common to each of the seven bars per display position. In the embodiment illustrated, a digit select decoder DSD serves to complete the cathode circuit for a selected one of the units 602 through 616 at any given point in time. The units 602 through 616 are selected on a time shared basis with each unit having an equal duty cycle. The seven input lines to the eight bars $a$ through $g$ are obtained from a display read only memory (ROM) DR. Consequently then, when a selected pattern of output lines $a$ through $g$ of ROM DR are energized, the corresponding eight bars of each of the display units 602 through 616 are selected. However, the display unit that provides a visual display is that which has a completed circuit through its cathode as selected by the digit select decode circuit DSD.

As will be developed in greater detail hereinafter, the digit select decode circuit DSD is controlled by a D counter 618 to energize or complete the appropriate cathode circuit for display units 602 through 616. D counter 618 is a mod 8 counter and each state of counter 618 selects one of the eight display positions.

The data entered from the keyboard KB is initiated by closure of one of the keyboard keys. This is detected by encoder ENC which depending upon which one of the keys has been actuated, provides a unique four bit binary code represented by bits $b_1$ through $b_4$. This accounts for four bits of an eight bit serial train used in the main memory.

As each character is being entered from the keyboard, bits $b_1$ through $b_4$ which define the character, are temporarily stored in register RK1. These four bits are entered into an auxiliary recirculating memory RM-2 having a four bit register RD1. Each character is entered into memory RM-2 through register RD1 when gates 619 are actuated by an RD1 load signal. The memory RM-2 is capable of storing, in the example given herein, a total of 32 bits with four bits in register RD1 and 28 bits in a second register RD2, also located in the recirculating path of the memory. Since a character entered by the keyboard is represented by bits $b_1$ through $b_4$, the memory RM-2 is capable of storing a total of eight characters. These eight characters correspond with the eight positions or display units of the visual readout RO. The data in the recirculating memory RM-2 is shifted bit by bit through the 32 bit positions in accordance with the frequency of shift pulses applied to registers RD1 and RD2 from a display clock source $\phi_D$. This frequency may be in the order of, for example, 2.5 KHz and is sufficiently fast that, as will be appreciated in the following description, it provides information to the readout RO at a rate not discernible to the human eye and consequently, for any combination of character positions being energized, they will appear to the human eye as being continuously energized.

The output data train from register RD1 is shifted through register RD2 and thence, through a multiplexer M-5 into the input of register RD1. In the normal mode of operation, the data flow, through the multiplexer is through an enabled AND gate 620 and thence, through OR gate 622.

As the data is being recirculated in memory RM-2, it is sequentially read character by character into register RD3 when gates 623 are enabled by an RD3 load input signal. This takes place when a full character is located in register RD1 so that bits $b_1$ through $b_4$ of that character are parallel loaded into register RD3 and used to interrogate the display ROM DR. This display ROM serves as a four line input to seven line output converter. It preferably includes sections 626 and 628 which respectively serve to decode the bit pattern of character bits $b_1$ through $b_4$ to provide a single line output which then serves as an address line to interrogate a particular address of a storage section 628 which, in turn, then energizes selected ones of a seven line output having output lines $a$ through $g$ to energize associated anode bars of each display unit 602 through 616.

Each time a data key on the keyboard KB is actuated, a character is written into the recirculating memory RM-2 and placed in position 1 in the data stream and the numeric representation of that character is displayed in position 1 in the visual readout RO by energizing the light bars of display unit 602. Consequently, the last data character entered will always be considered as being in position 1 in the data stream and is visually displayed at position 1 in the visual readout RO. Control for this function is achieved by the D counter 618 which serves to keep track of the last keyboard data character entered into the recirculating memory RM-2 in terms of it being in position 1. Each time a new character is entered, the counter is reset and looks to the now entered character as being the last character entered in position 1 in the data stream and displayed at position 1 in the display readout RO.

Associated with D counter 618 is an N counter 640 which receives clock pulses from the display clock source $\phi_D$. This counter is a four bit counter and counts clock pulses corresponding with bits $b_1$ through $b_4$ and then provides a trigger pulse or count pulse to the IN terminal of D counter 618. Consequently then, for every four bits in the data stream, N counter 640 decrements D counter by one count. D counter 618 is a decimal to binary output counter and has a reset input responsive to a reset pulse for resetting to a count of 0 corresponding with position 1 in the recirculating memory RM-2 and in the readout display RO.

Each time the D counter is decremented by the N counter, its three line binary output changes in binary content. This is decoded by the digit select code decoder DSD to energize the appropriate cathode in the display unit 602 through 616 which corresponds in position number with the status of the counter. The position accorded a character entered from the keyboard will change if a succeeding character is entered, with the last character entered always being considered as the character in position 1 or a count of 0 at the D counter 618. The preceding character is shifted one position to the left to display unit 604.

Each time a data key is actuated to enter a new character to be displayed by display readout RO, a signal is provided on control line $S_D$ indicative that a data key has been actuated. This may be achieved by connecting the selected data keys to an OR gate within encoder ENC which provides an output to the control lines $S_D$. Whenever a data key is actuated, the control line $S_D$ is high, referred to hereinafter as a binary 1 signal. This signal is used to reset the D counter 618 to a binary count of 0 as the new character is entered into the recirculating memory in position 1. The binary 1 signal on control line $S_D$ is applied to an OR gate 650 which serves to set a flip-flop 652. The binary 1 signal obtained from the output of the flip-flop is applied to enable AND gate 654. The second input of this AND gate is raised when a decoder 656 detects a condition of the D counter 618 and the N counter 640 wherein the D counter has a count of 0 and the N counter has a count of 3. This count is referred to herein as $(DN)_{03}$. Decoder 656 may take any suitable form and serves to provide outputs for a DN count condition of $(DN)_{03}$ or an output when the count status of the N counter is at a 0 status referred to herein as a count condition $(N)_0$ or when the D and N counters have a count condition $(DN)_{02}$ or $(DN)_{13}$. AND gate 654 has both inputs satisfied once flip-flop 652 is set in response to control line $S_d$ being high and decoder 656 has provided an output indicative of a count status $(DN)_{03}$. Consequently, AND gate 654 now provides a trigger pulse which serves as the RD1 load input signal to cause register RD1 to be loaded from RK1 on the next clock pulse thereby loading bits $b_1$ and $b_4$. This is timed in such a manner that there is no bit time lost between bit $b_4$ of the previously entered character and bit $b_1$ of the character now being entered.

At the point in time of providing the RD1 load signal, the count status $(DN)_{03}$ is a condition wherein the last character entered is just leaving register RD1. On the next bit time of clock $\phi_D$, the previous character entered is totally in register RD2 and bit $b_1$ of the new character is placed into the data stream immediately behind bit $b_4$ of the previously entered character.

Since a new data character has now been entered into the data stream through register RD1, it is necessary to reset the D counter 618 for this counter to have a 0 count condition representative of the last character being entered to be in position 1 at register RD1. This is achieved by providing a pulse, at the same time that register RD1 is loaded, obtained from AND gate 654 applied through an OR gate 657 to the reset input of the D counter 618 to cause the counter to reset to its 0 count status. This succeeding character which is now the last character entered into the recirculating memory RM-2, is displayed at position 1 in the visual readout RO since the D counter was reset to zero when the last character was entered into register RD1.

Each time a control key on keyboard KB is actuated, the entire contents of recirculating memory RM-2 are cleared. For example, if the control key actuated is the $ amount key, then the character A is initially displayed in position 1, then shifted to the left as data keys are actuated to provide the operator with a visual display of the character A followed by a plurality of decimal numbers indicative of the transaction amount. Consequently, the first step upon detection of a control key actuation is to erase any data presently in the recirculating memory so that the first character in the newly entered field is that which corresponds to the actuated control key.

When a control key is actuated, a control line $S_C$ is raised. This may be accomplished by connecting the control keys to an OR gate within the encoder ENC which provides a high signal or a binary 1 signal on control line $S_C$ whenever a control key is actuated. Raising control line $S_C$ applies a binary 1 signal pulse to the set input of a flip-flop 662. When this flip-flop is set, it enables an AND gate 664 to set a flip-flop 666 when decoder 656 has detected a condition of the D counter and N counter corresponding with condition $(DN)_{02}$. Also, on this satisfying condition b r AND gate 664, a pulse is applied through OR gate 668 and thence, through a second OR gate 670 to one input of an AND gate 672, in multiplexer M-5. AND gate 620 is disabled from the output of OR gate 670 through an inverter 674 so that the pulse stream from the output of register RD2 does not pass through the multiplexer. Instead, a binary 1 signal is clocked into the register RD1 for each bit position as the pulse stream is shifted by clock pulses $\phi_n$. This is obtained by connecting the second input of AND gate 672 to a binary 1 level source. Consequently then, a binary 1 signal is always applied to the input of the register and each bit shifted through the register will be of binary 1 level. After register has been clocked for one cycle, all 32 bit positions will be of a binary 1 level.

When flip-flop 662 was set, it enabled AND gate 664. Thereafter, when the decoder 656 raised its output line representative of a count condition $(DN)_{02}$ both inputs to AND gate 664 were satisfied and this AND gate in turn set flip-flop 666. At the same time, however, a reset pulse was applied to reset flip-flop 662 so that its output is now lowered to a binary 0 level. This binary 0 signal is inverted by an inverter 680 to enable an AND gate 682. After the recirculating memory RM-2 has been cleared by writing binary 1 level signals in each bit position in the manner described above, decoder 656 will again provide a trigger pulse at a count condition $(DN)_{02}$. This satisfies the second input of AND gate 682 which then provides a reset pulse to reset flip-flop 666. This will now disable AND gate 672 in multiplexer M-5. Since the output of OR gate 670 is at a binary 0 level, AND gate 620 is enabled. The binary 1 level at the output of AND gate 682 is also applied through OR gate 650 to set flip-flop 652. Consequently then, when the decoder 656 has decoded a count condition of $(DN)_{03}$, AND gate 654 will apply an RD1 load trigger signal to register RD1 so that character bits $b_1$ to $b_4$ in RK1 will be loaded on the next bit time into register RD1. Succeeding data characters for the transaction amount are now entered in succession by actuating data keys and these data characters are entered into the recirculating memory RM-2 in the manner described hereinbefore.

Main Memory Data Entry Display

The previous description was directed to the operation wherein data is entered into the recirculating memory RM-2 from the keyboard. As will be recalled, whenever a control key was actuated, the memory was cleared by writing binary 1 signals into each bit position of the 32 bit recirculating memory. Once that operation was completed, the four bit data characters were entered into the memory in the order in which the data keys were actuated. In a similar fashion, when data is entered into the memory from the main memory RM-1, the first function is to clear the recirculating memory RM-2 by writing binary 1's into the 32 bit positions.

Reference is now made to FIG. 16 which illustrates the circuitry employed for transferring data from the main memory RM-1 into the recirculating display memory RM-2. When the main memory decoder DC decodes a display command $X_D$ in register R1, it provides a binary 1 output pulse on its $X_D$ output line to set a flip-flop 686 on the next clock pulse.

Decoder output line $X_D$ is applied through enabled AND gate 688 to also force a binary 0 into register R2 through OR gate 690, inverter 76 and AND gate 64 for the one bit time the $X_D$ is at a binary 1 level. This forces the output of AND gate 64 to a binary 0 level such that at the next clock pulse bit $b_1$ of command $X_D$ will be forced to a binary 0 level. On this same clock pulse, flip-flop 686 is set to continue forcing the bits of command $X_D$ to a binary 0 level through OR gate 690, inverter 76, and AND gate 64 until bit $b_8$ time when the synchronizing pulse CS8 enables AND gate 696, resetting flip-flop 686. At this point, command $X_D$ has been replaced by a NUL character. Also, at the same time, AND gate 696 resets N counter 640, through OR gate 657, and resets D counter 618 and also sets flip-flop 698.

The output of flip-flop 698 and the output taken from AND gate 696 are applied through an OR gate 700 to enable AND gate 672 in multiplexer M-5. The output from OR gate 700 is also applied through an inverter 701 to disable AND gate 620 and thereby prevent the pulse train from the output of register RD2 from passing through the multiplexer. Instead, a binary 1 signal is clocked into register RD1 through enabled AND gate 672 and OR gate 622. This will continue until flip-flop 698 is reset by decoder 656 at a count condition $(DN)_{13}$. This takes place after the memory has been clocked for one cycle so that all 32 bit positions are at a binary 1 level. While flip-flop 698 is set, it holds main memory RM-1 stationary until display memory RM-2 is cleared. One method of accomplishing this is to AND the inverted output of flip-flop 698 with clock $\phi_C$ to generate clock $\phi_S$, as shown by inverter 742 AND gate 744.

The D counter 618 is an eight position down counter and counts from a 0 condition and then downwardly through conditions 7, 6, 5, 4, 3, 2, 1 to another 0 condition. The N counter 640 is an up counter and counts upward from a 0 condition through conditions 1, 2, 3 and then to the 0 condition. As will be recalled, the N counter counts upward with each pulse from the $\phi_D$ clock source, and hence, provides an output each time four clock bits from clock source $\phi_D$ have been counted. The D counter is a position counter for the readout display RO and is decremented by 1 count each time the N counter 640 counts four bits of the $\phi_D$ clock source. Consequently then, after the recirculating memory RM-2 has been cleared, the count condition of the D counter and the N counter corresponds to condition $(DN)_{13}$. When this condition is satisfied, the decoder 656 provides an output to reset flip-flop 698 and which on the next bit time serves to disable AND gate 672 in multiplexer M-5 to prevent further clearing of the recirculating memory RM-2.

At the point in time that a reset pulse is applied to the reset input of the flip-flop 698, the output of this flip-flop is still carrying a binary 1 signal. The reset pulse and the binary 1 output from flip-flop 698 are anded through an AND gate 704 to apply a binary 1 pulse through an OR gate 706 to set a flip-flop 708. The flip-flop serves to control the loading of four bits corresponding to bits $b_1$ through $b_4$ of each eight bit data character, in the field to be displayed, in register R1 in the main memory RM-1. When flip-flop 708 is set, it enables AND gate 710. The second input to this AND gate is taken from the output of an inverter 712, having its input connected to decoder DC to receive a binary 1 signal only when the decoder has detected a single ESC character. This output is provided on output circuit $e$ of decoder DC. Consequently then, until a single ESc character is decoded, both inputs to AND gate 710 have a binary 1 signal level and AND gate 710 enables AND gate 714 in multiplexer M-5. The second input to AND gate 714 is the data path 716 taken from the output of register R1. The first four bits corresponding to bits $b_1$ through $b_4$ of the first character in the data stream will now be clocked into register RD1 by the first four clock pulses of clock source $\phi_D$.

This transfer of data from the main memory RM-1 into the display memory RM-2 takes place at a clock rate corresponding with clock source $\phi_C$. Thus, when flip-flop 708 is set, a binary 1 signal is applied through OR gate 718 to enable one input of an AND gate 720. A second input to this AND gate is taken from the $\phi_C$ clock source. The third input to this AND gate is taken from the output of a flip-flop 702 which has been set to provide a binary 1 output signal in response to flip-flop 686 having been set. Consequently then, the pulses from the clock source $\phi_C$ are gated through AND gate 720 and thence, through an OR gate 722. This pulse train is then applied to a suitable clock driver circuit 724 to provide the $\phi_D$ clock source. Thus, while data is being transferred from memory RM-1 into memory RM-2, the $\phi_D$ clock source provides shift pulses to the registers at a rate corresponding with that of the $\phi_C$ clock source. In normal operation, however, the $\phi_D$ clock source provides pulses which have a substantially lower frequency. Thus, the $\phi_C$ clock source is normally applied to a frequency dividing circuit 726 which divides the $\phi_C$ frequency by a factor on the order of 31 and these pulses are applied through a normally enabled AND gate 728. Gate 728 is disabled whenever the data is being transferred from the main memory to the display memory by virtue of an inverter 730 connecting the output of flip-flop 702 to the second input of AND gate 728.

After the first four bits, $b_1$–$b_4$, of the first character of the display field have been loaded into register RD1, the $\phi_D$ clock pulses are terminated for a period corresponding to the next four bits, $b_5$–$b_8$, of the data character in register R1. Thus, after the first four bits have been loaded, decoder 656 has decoded a count condition of the N counter 640 corresponding with condition $(N)_3$. Decoder 656 provides an output pulse which is applied to one input of an AND gate 734. At this point in time, the second input to the AND gate is enabled through an inverter 736 since the output of flip-flop 698 is at a binary 0 level. Consequently then, AND gate 734 provides a binary 1 signal which is applied through an OR gate 738 to reset flip-flop 708. This disables AND gate 720. Since AND gate 728 is also disabled, no pulses are available on the $\phi_D$ output line of the clock driver 724. This stops the shifting action of the recirculating memory RM-2. Four bit times later, in terms of the $\phi_s$ clock source, a synchronizing pulse CS8 is applied to enabled AND gate 740 making the output of AND gate 740 a binary 1 which is applied through OR gate 706 to set flip-flop 708. With flip-flop 708 being set, this will again enable AND gate 714 to commence passing the first four bits of the next data character into memory RM-2. The memory RM-2 will now be clocked from the $\phi_D$ output line of clock driver 724 and at the rate of the $\phi_C$ clock source since AND gate 720 will now be enabled by flip-flop 708. This operation will continue until decoder DC decodes the existence of an ESC character in register R1. The resultant binary 1 on decoder output $e$ applies a reset pulse through OR gate 738 to reset flip-flop 708 and reset flip-flop 702.

IMPRINT CONTROL

Referring now to FIG. 6, it should be noted that whenever decoder DC detects an imprint command $X_I$ in memory, it actuates the imprint control circuit ICC. This control circuit responds to this detection of the imprint command to initiate an operation wherein the printer wheels are properly positioned for printing the numeric characters provided in the transaction amount field and the authorization number data field received from the CPU. The imprinter and the printing wheels are also operated in an off line environment wherein the operator enters a transaction amount into the terminal memory and then actuates the function key and numerical 1 key which is encoded and written into the memory as an imprint command $X_I$. In this off line mode of operation, the imprint control circuit ICC operates the printer wheels to set up the printer wheels to print the transaction data field numeric characters and no authorization characters, since the latter characters are provided only in an on line mode of operation from the CPU.

Figure 17A:
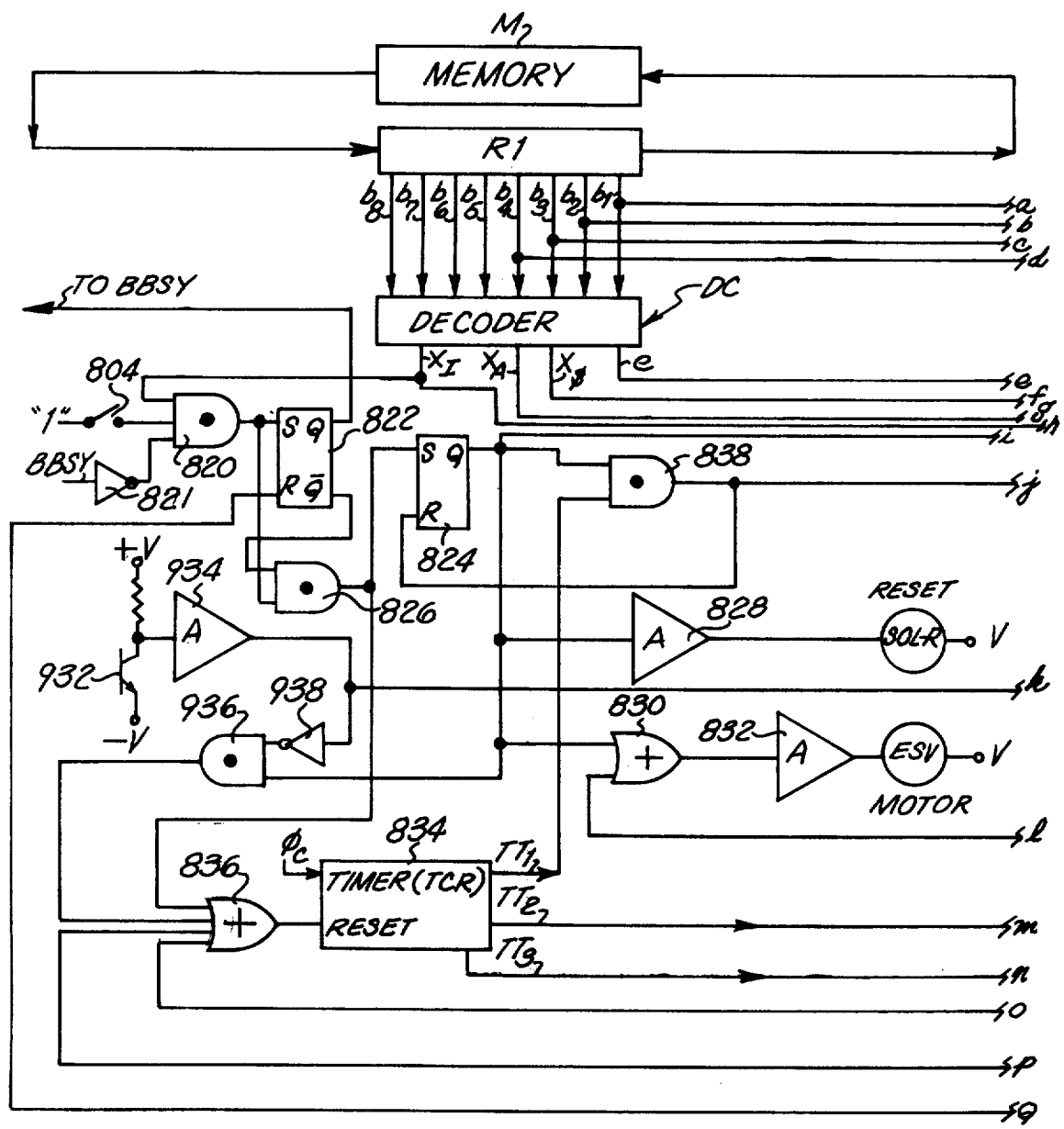
FIGS. 17A, 17B and 17C comprise a schematic-block diagram illustration of an imprint control circuit.
Figure 17B:
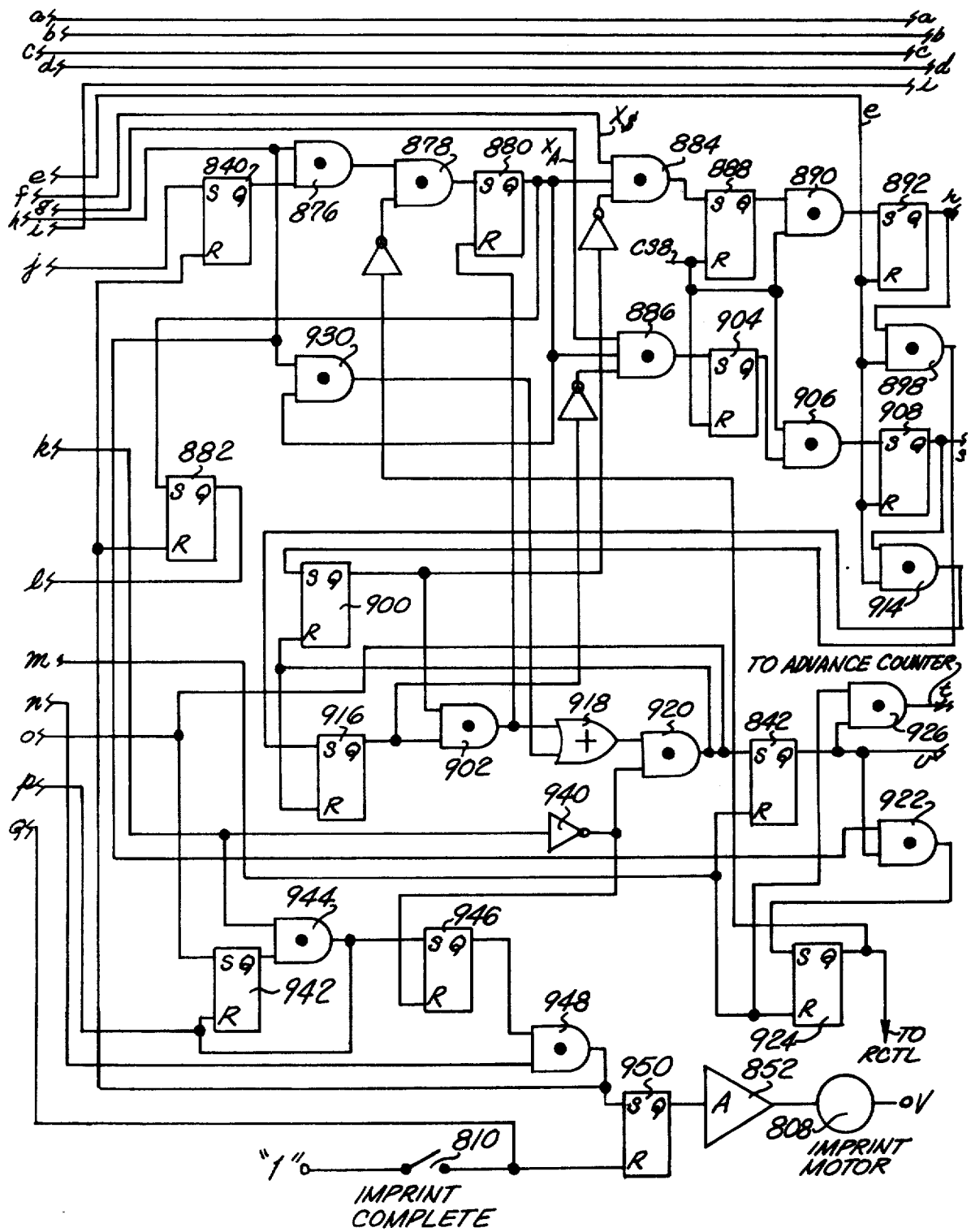
Figure 17C:
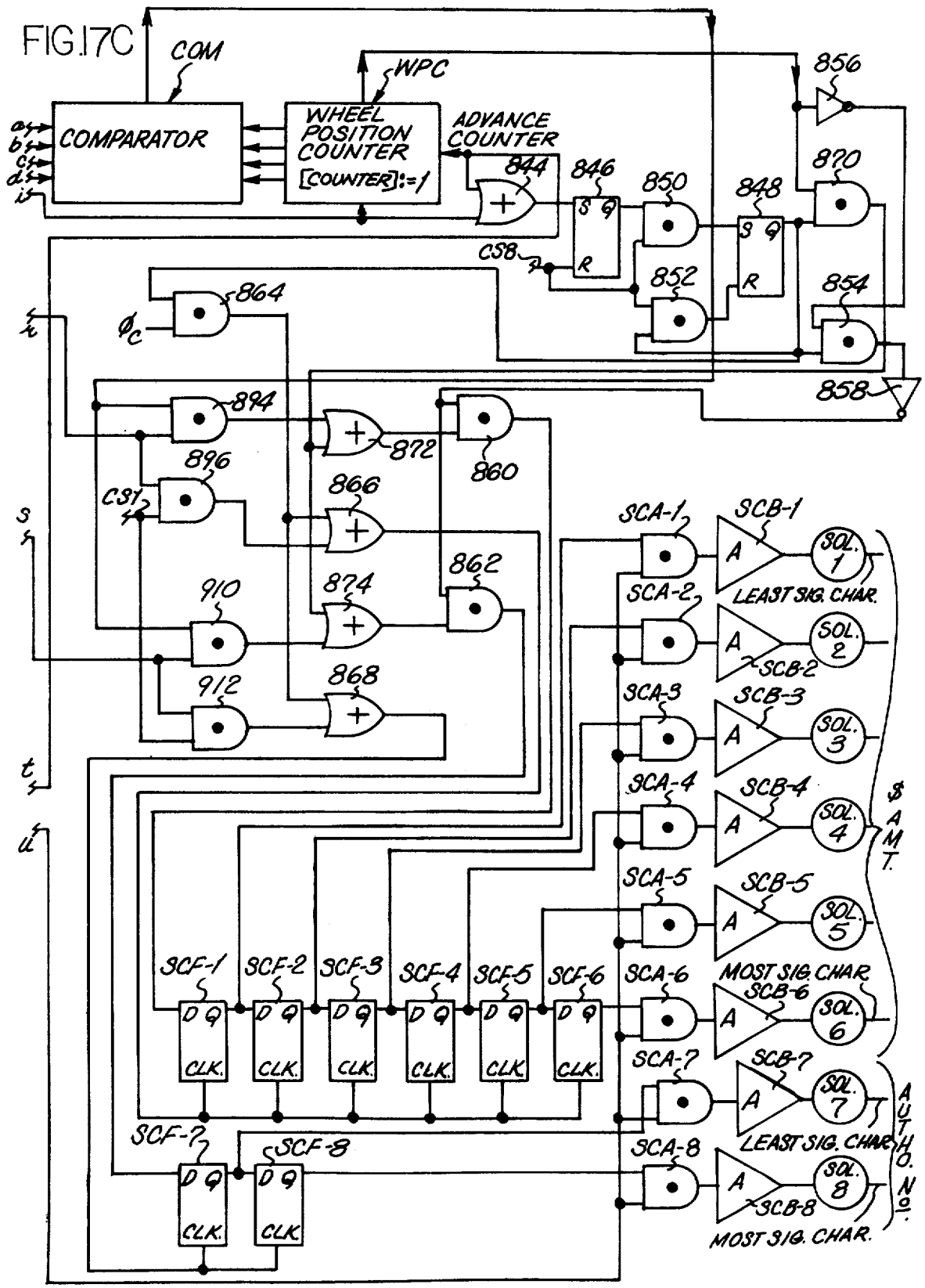
Figure 18:
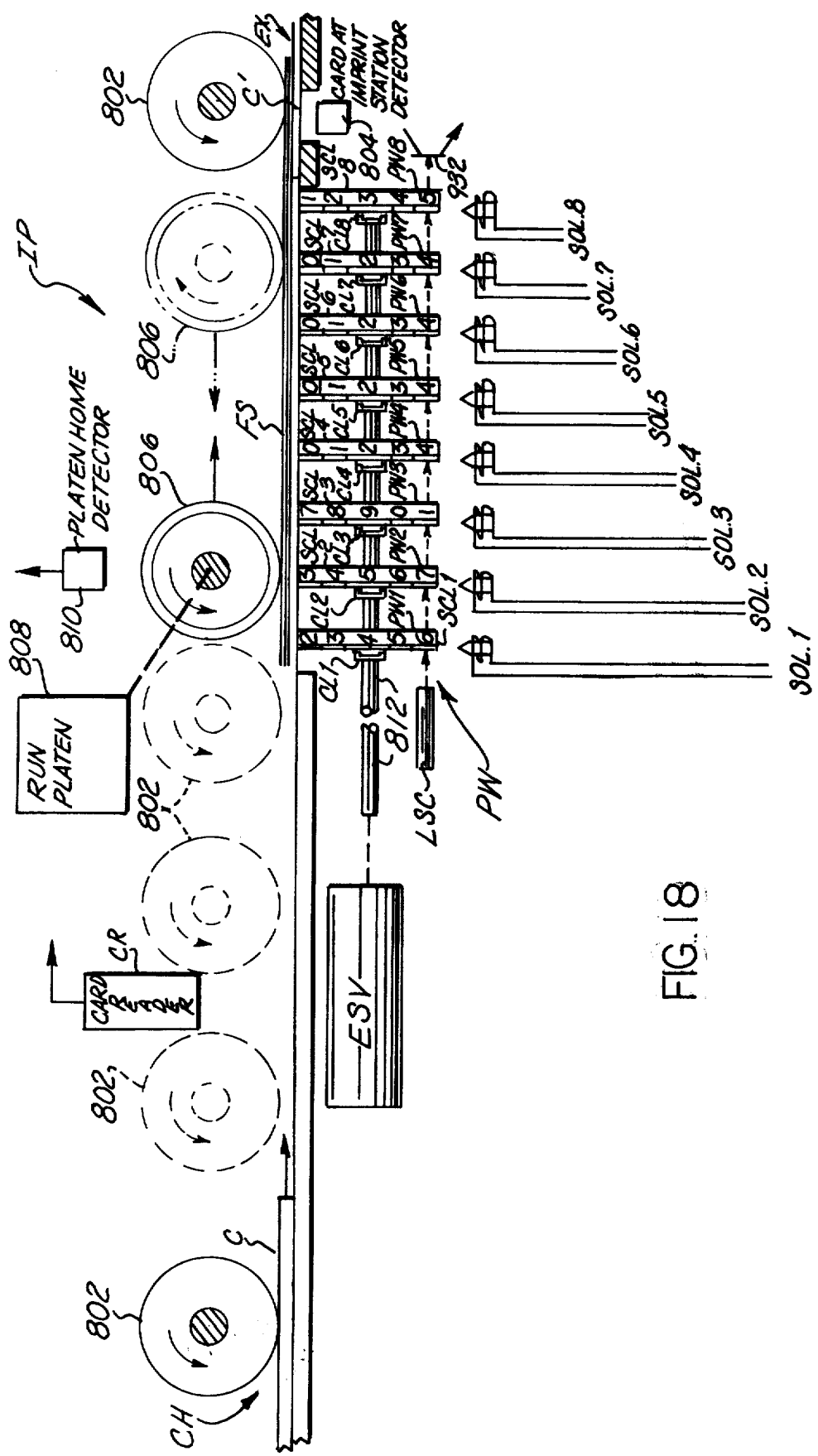
FIG. 18 is a schematic elevation of view showing an imprinter and a printing mechanism controlled by the imprint control circuit.
Figure 19:
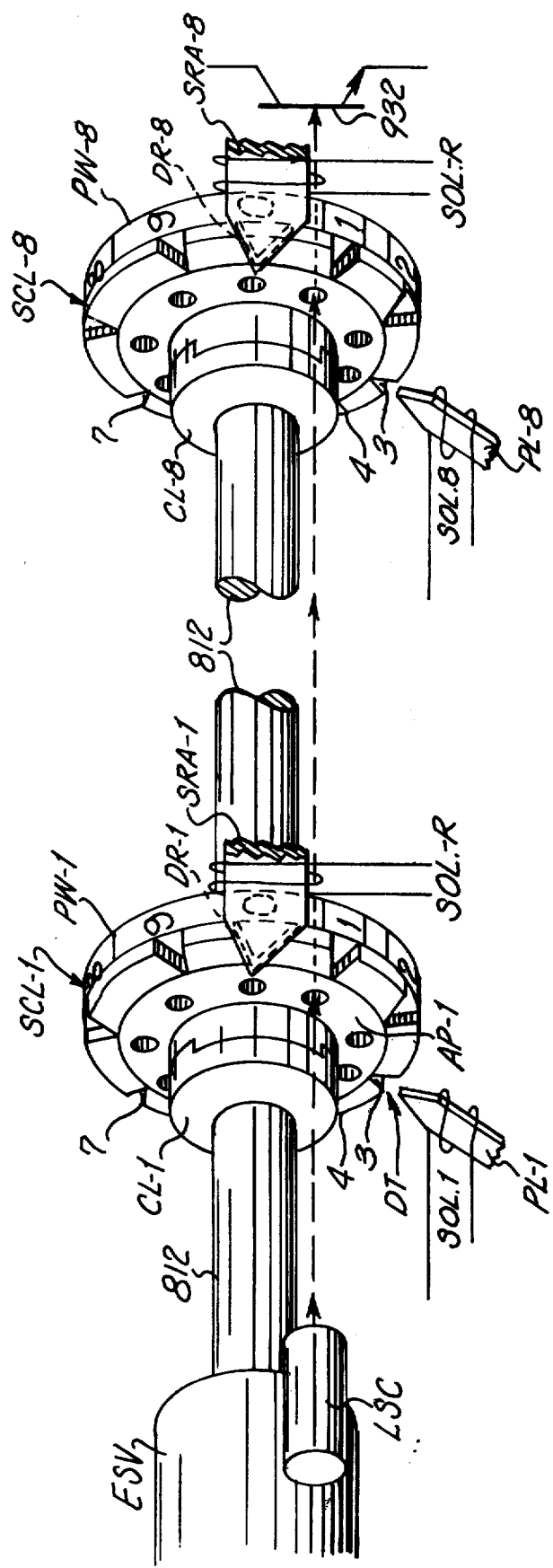
FIG. 19 is a perspective view, with parts broken away, showing a portion of the printing mechanism in greater detail than that of FIG. 18.

The imprint control circuit ICC is shown in detail in FIG. 17. The imprinter mechanism IP and the printer wheels PW are schematically illustrated in FIGS. 18 and 19. Before describing the specific operation and circuitry involved in the imprint control circuit ICC, attention is first directed to the schematic illustrations of FIGS. 18 and 19. As shown in FIG. 18, a card such as a credit card C is transported through the terminal housing T from the entrance chute CH to the exit chute EX with the card traversing along a suitable guide or table 800. The card is moved along table 800 by any suitable drive means such as a plurality of spaced apart rollers 802. As the card C is being transported from the entrance chute CH to the exit EX, it is read by a card reader CR so that the data may be extracted from the card and entered into the terminal memory. The card is eventually positioned in the location shown by card C' at which it is detected by a suitable proximity detector 804 indicating that the card is located in the imprint station. When in the imprint station, the card is located between the upper surface of table 800 and the inserted formset FS. When the printer wheels PW are properly positioned to imprint the correct numeric characters on the formset, a platen 806 is driven by a suitable platen drive motor 808 so that the platen traverses from its home position as shown in solid lines in FIG. 18 to the far right position and then brought back to the home position. During this traversing operation, the platen applies pressure to the formset FS to cause the printing indicia on printing wheels PW to imprint the selected numeric characters on the formset as well as to imprint information onto the formset from the card C' if the card be an embossed card to act as a printing plate. When the platen is in its home position, it is detected by a suitable proximity switch 810.

Before the platen is driven to imprint the indicia, the printing wheels are operated and positioned so that the correct raised numeric character on each printing wheel is in a printing position. Thus, each wheel includes a plurality of raised printing characters 0–9. There are eight printing wheels PW-1 through PW-8 mounted on a common shaft 812 and driven by a suitable motor ESV. Wheels PW-1 through PW-8 are respectively provided with clutch mechanisms CL-1 through CL-8 so that one of the wheels may be held in a stopped position while the remaining wheels are being driven from shaft 812 by motor ESV. When one or more wheels is properly positioned so the correct printing character is located in the printing position, an associated solenoid is energized to drive a pawl which makes engagement with a suitable detent provided on the wheel to lock the wheel in position. Thereafter, the ESV motor continues to drive shaft 812 until another wheel or wheels are properly positioned and locked in place. This continues until all eight wheels are properly positioned.

In the embodiment illustrated, this is implemented by providing solenoids SOL-1 through SOL-8 in respective association with printing wheels PW-1 through PW-8. As is shown in FIG. 19, with respect to wheel PW-1, the wheel is driven until the proper printing character is located in the printing position. The associated solenoid SOL-1, is then energized. This drives a solenoid pawl PL-1 into engagement with a detent DT-1 provided on one side of the printing wheel PW-1. It is to be understood that the printing wheel is provided with a plurality of detents, each associated with one of the printing characters on the peripheral of the wheel so that when a desired character is in the printing position, actuation of the solenoid will cause the pawl PL-1 to engage the proper detent DT-1 to properly lock the printing wheel in the desired printing position.

As will be described in greater detail hereinafter with respect to the imprint control circuitry ICC, the ESV motor is driven through one cycle from a starting condition during which all of the wheels are aligned with the numeric printing character zero being located in the printing position. As the shaft is driven from printing wheel positions 1 through 0, various ones of solenoids SOL-1 through SOL-8 will make locking engagement with the respectively associated printing wheels.

During the set up process, the printing wheels are all initially set so that the printing character for numeric number 0 of each wheel is in the printing position. This may be implemented by providing a reset solenoid SOL-R which, when actuated, drives a common solenoid arm SRA into a position so that its respective pawls SRA-1 through SRA-8 are positioned to engage specially positioned printing wheel detents DR-1 through DR-8 respectively. These detents are associated with the zero position of each wheel so that while the shaft is driven through one cycle, each wheel will be stopped at its zero printing position by its associated pawl SRA-1 through pawl SRA-8. After these wheels have been reset to the zero position, the reset pawl SOL-R is deenergized to release pawls SRA-1 through SRA-8 so that the individual wheels may be positioned to their correct printing positions.

Having now described the operation to be obtained with respect to the printing wheels PW and the imprinting mechanism IP, attention is directed to the following description of the imprint control circuit.

The imprint control circuit ICC is illustrated in FIG. 17. When decoder DC detects an imprint command $X_I$ in register R1 in the recirculating memory, it applies a binary 1 signal on its $X_I$ output line. This binary 1 signal is applied to one input of an AND gate 820. If the bus is not busy, then a secondary binary 1 signal is applied to another input of this AND gate through an inverter 821. This enables the AND gate to provide a binary 1 output signal, providing card C is located at the imprint station. This condition is detected by detector 804 which is illustrated in FIG. 17 as being a simple, normally open switch which, when closed, is indicative that the card is properly located at the imprint station. With all three of these inputs being at a binary 1 level, AND gate 820 applies a binary 1 output signal to set a flip-flop 822. Whenever flip-flop 822 is set, it raises the bus busy line BBSY by placing a binary 1 thereon. This is done to prevent other peripherals from attempting control of the memory during the imprint operation.

During the same bit time that AND gate 820 sets flip-flop 822, it also sets a flip-flop 824 through AND gate 826. This sets up a condition to reset the printing wheels PW-1 through PW-8 to their reset or zero printing position. Thus, when flip-flop 824 is set, it activates the reset solenoid SOL-R through an amplifier 828. At the same time, it also energizes the ESV motor through an OR gate 830 and amplifier 832 so that the shaft 812 is driven one cycle during the wheel reset operation. When flip-flop 824 was set from AND gate 826, a timer 834 was reset through an OR gate 836. This timer is clocked by the system clock source $\phi_C$ and provides output pulses at certain points in time. After sufficient time has lapsed for the printing wheel reset function to be completed, timer 834 provides a reset pulse $TT_1$ which is anded through an AND gate 838 to reset flip-flop 824 and to set a flip-flop 840. The timer 834, however, continues to provide its timing function and is reset to a zero count only when a binary 1 signal is applied through OR gate 836 to the reset input of the timer.

During the period that the printing wheels are being reset, flip-flop 824 is in its set condition and applies a binary 1 signal to a wheel position counter WPC to set this counter to a count condition of 1. This counter is a 10 position and is incremented by one count each time a pulse is applied to the advance counter input. The counter provides a binary pattern output having decimal value which is compared with the decimal value of bits $b_1$, $b_2$, $b_3$ and $b_4$ in register R1 by way of a numeric comparator circuit COM. Whenever the decimal value of these four bits is equal to the decimal value of the binary output from counter WPC, the comparator provides a binary 1 output signal on its output line.

When flip-flop 824 is in its set condition, it also serves to load binary zero signals in eight solenoid control flip-flops SCF-1 through SCF-8. These flip-flops are respectively associated with solenoids SOL-1 through SOL-8. The outputs of these flip-flops are respectively applied to one input each of associated AND gates SCA-1 through SCA-8. The outputs of these AND gates are applied to the respective solenoids through respective amplifiers SCB-1 through SCB-8.

AND gates SCA-1 through SCA-8 are all enabled once during each position of the wheel counter PWC when flip-flop 842 is set. As will be described in greater detail hereinafter, that flip-flop is set for a predetermined time interval for each wheel position count. When the AND gates SCA-1 through SCA-8 are enabled by flip-flop 842, the binary level of each of the flip-flops SCF-1 through SVF-8 is checked. Those flip-flops that are in a binary 1 state will cause energization of their associated solenoids to lock the associated printing wheels PW-1 through PW-8 in the position corresponding with the count in the wheel position counter WPC. This operation will be described in greater detail hereinafter.

When flip-flop 824 is in its set condition, all of the flip-flops SCF-1 through SVF-8 are loaded so as to be in a binary 0 level condition. With flip-flop 824 being in its set condition, it applies a binary 1 signal through an OR gate 844 to set a flip-flop 846. This flip-flop is actuated to its set condition each time the wheel position counter is advanced and sets up a condition wherein binary zeros are loaded into flip-flops SCF-1 through SCF-8 on position counts 1 through 9 and loads binary ones in these flip-flops on a count condition corresponding with the numeric zero position of the printing wheels.

When flip-flop 846 is in its set condition, it serves to set a succeeding flip-flop 848 through an AND gate 850 is synchronism with the clock synchronizing pulse CS8. This synchronizing pulse also resets flip-flop 846. Flip-flop 848 will be set for one byte time and then be reset on the next synchronizing pulse CS-8 through an AND gate 852. During the byte time that flip-flop 848 is set, it enables an AND gate 854. If the position counter is not at a count of 10, then a binary 1 signal is applied to the second input of AND gate 854 through an inverter 856. AND gate 854 provides a binary 1 output signal which is inverted by an inverter 858 to thereby disable AND gates 860 and 862. Consequently, the outputs of these two AND gates apply binary 0 level signals to the D input of flip-flops SCF-1 and SCF-7 respectively. As will be noted, flip-flops SCF-1 through SCF-6 are D type flip-flops and are interconnected to define a six stage shift register with the shift pulses being applied to the clock CLK input of each flip-flop. Similarly, flip-flops SCF-7 and SCF-8 are interconnected to define a two stage shift register. Since flip-flop 848 is in a set condition, it enables AND gate 864. This permits clock pulses from the system clock source $\phi_C$ to be gated through this AND gate and thence, through OR gate 866 to apply clock pulses to each of the clock CLK inputs of flip-flops SCF-1 through SCF-6. These clock pulses are also applied through an OR gate 868 to the clock CLK inputs of flip-flops SCF-7 and SCF-8. Flip-flop 848 is enabled for one byte time which corresponds with eight clock pulses from the clock source $\phi_C$. Consequently then, at the end of this byte time, the output condition of each flip-flop SCF-1 through SCF-8 is a binary zero level.

In the previous discussion, binary zero level signals were loaded into the flip-flops SCF-1 through SCF-8 during the wheel alignment operation. Binary 1 signal may be loaded into all of the flip-flops by enabling both inputs of AND gates 860 and 862 so that binary 1 signals are applied to the D inputs of flip-flops SCF-1 and SCF-7 for eight clock pulses applied to the clock inputs of these flip-flops. This is done in the case wherein it is desired to set all of the wheels so that the numeric printing character 1 of each wheel is in the printing position. This is required when the wheel position counter has been incremented to a count of 10 and provides a binary 1 output to enable AND gate 870. AND gate 870, in turn, applies binary 1 signals through OR gates 872 and 874 to respective inputs of AND gates 860 and 862. In this condition, inverter 856 will apply a binary 0 signal to AND gate 854 and hence, inverter 858 will apply binary 1 signals to the other inputs of AND gates 860 and 862. This, then, will apply binary 1 signals to the D inputs of flip-flops SCF-1 and SCF-7. Since flip-flop 848 is set for one byte time, corresponding with eight clock pulses from the system clock source $\phi_C$, all of the flip-flops SCF-1 through SCF-8 will be loaded with binary 1 signals.

When the printer wheels have been reset, timer 834 provides a time out pulse $TT_1$ which is applied to enabled AND gate 838 to set flip-flop 840. The setting of this flip-flop indicates that the wheels have been reset and the circuitry is conditioned to commence operation, once the imprint command $X_I$ is again detected at register R1. When this occurs, AND gate 876 applies a binary 1 signal through a normally enabled AND gate 878 to set flip-flop 880. When flip-flop 880 is set, it indicates that the circuitry has detected the imprint command $X_I$ and is now searching for the $ amount field definer $X_S$ and/or the authorization field definer $X_A$. When flip-flop 880 is in its set condition, it sets flip-flop 882 which energizes the ESV motor to commence operation and drive the imprinting wheels until all the wheels have been properly positioned. Flip-flop 880 also enables a $ amount field definer AND gate 884 and a transaction amount field definer AND gate 886.

When the $ amount field definer $X_S$ is detected at register R1, AND gate 884 sets flip-flop 888. When this flip-flop is set, it indicates that the $ amount field definer $X_S$ is located in register R1. The first character in the transaction amount field is immediately behind this field definer and one byte time later will be located in register R1. One byte time after the transaction amount filed definer $X_S$ is detected at register R1, flip-flop 888 is reset by the clock synchronizing pulse CS8. However, before the status of the flip-flop changes, its output is anded with the clock synchronizing pulse CS8 by way of an AND gate 890 to set a flip-flop 892.

When flip-flop 892 is set, it indicates that the first character in the transaction amount data field is located in the register R1. This flip-flop will remain set until this transaction data filed is terminated with an ESC character. During the interim period, however, flip-flop 892 enables AND gates 894 and 896.

When AND gates 894 and 896 are enabled by flip-flop 892, they serve to respectively pass data and clock pulses to the six flip-flops SCF-1 through SCF-6. If the transaction amount data field includes more than six characters, then only the last six characters entered, i.e., the six least significant characters, are used. The binary status of flip-flop SCF-1 is associated with the least significant character in this data field whereas the binary status of flip-flop SCF-6 is associated with the most significant character of the six least significant characters in this data field.

During each wheel position count, each of the characters in the transaction amount data field will be examined to determine whether it has a numeric value equal to that of the wheel position count. If so, then the flip-flop SCF-1 through SCF-6 associated with that character will be conditioned to a binary 1 level and the associated solenoid will be energized to lock the associated printing wheel so that its numeric printing character of the same numeric value will be in the printing position.

With the wheel position counter being in position 1, a comparison is made of the decimal value of the wheel position count with the decimal value of bits $b_1$ through $b_4$ of the first character in the transaction amount data field. If the numeric character in the data field is of a value equal to decimal number 1, then comparator COM applies a binary 1 signal to AND gate 894. This binary 1 signal is applied from the output of AND gate 894 through OR gate 872 and normally enabled AND gate 860 to the D input of flip-flop SCF-1. This binary 1 signal will now be loaded into flip-flop SCF-1 by the synchronizing pulse CS1 applied to AND gate 896. This synchronizing pulse will be applied from the AND gate 896 through OR gate 866 and then to each clock CLK input of each of the flip-flops SCF-1 through SCF-6. For example, if the first character in the transaction $ field is not of a decimal 1 value, then the comparator COM would have applied a binary 0 signal to AND gate 894. In such case then, the clock synchronizing pulse CS1 would have loaded a binary 0 level signal into flip-flop SCF-1. The remaining data characters in this field will be similarly compared one at a time with the decimal value of the wheel position counter to determine whether any of the other characters in the field are of a decimal 1 value. The results of the comparison is either a binary 1 of a binary 0 level which is shifted successively from flip-flop SCF-1 to flip-flop SCF-6 with succeeding synchronizing pulses CS1 until the six least significant characters in this data field have been compared with wheel position count of decimal value 1. An ESC character is located at the end of this data field and when it is detected at register R1, the decoder DC will provide a binary 1 signal on its output circuit e. This will reset flip-flop 892.

Before flip-flop 892 changes its state, its output is anded with the binary 1 signal on decoder output line e by means of an AND gate 898 to set a flip-flop 900. When flip-flop 900 is set, it disables the $ amount field difiner AND gate 884 and enables an AND gate 902. AND gate 902 serves as a detector to provide an output indication when both the $ amount and authorization number field definers have been detected and the data wheel position compare COM results have been stored in their respective flip-flops SCF-1 through SCF-8.

The circuitry will now operate to detect an authorization number field definer $X_A$. When this field definer is detected at register R1, AND gate 886 will set a flip-flop 904. Flip-flop 904 serves a function similar to that of the transaction amount flip-flop 888 in that it provides an indication that the authorization number field definer $X_A$ is located in register R1. One byte time later, when the first authorization number data character is in register R1, flip-flop 904 will be reset by the clock synchronizing pulse CS8. However, before the output of the flip-flop changes, an AND gate 906 serves to set flip-flop 908.

When flip-flop 908 is set, it is indicative that the data field for the authorization number is being shifted character by character through register R1. Flip-flop 908 is set when the first of these characters is in that register. This flip-flop will remain set until detection of an ESC character. While it is set, it enables an AND gate 910 to receive the results of the comparisons from comparator COM. Flip-flop 908, when in its set condition, also enables AND gate 912 for passing shift pulses from pulse synchronizing source CS1 through OR gate 868 to the clock CLK inputs of flip-flops SCF-7 and SCF-8. Flip-flops SCF-7 and SCF-8 will now be loaded with binary 1 or binary 0 signals in the same manner as described earlier relative to flip-flops SCF-1 through SCF-6. Thus, if the two least significant characters in the authorization number data field are of decimal values corresponding with the wheel position count, in this case a count of 1, then a binary 1 signal will be loaded into the associated flip-flop SCF-7 on the first compare. On the second compare a binary one is again loaded into SCF-7 and the prior binary 1 is shifted to SCF-8.

The operation for loading the authorization data field flip-flops SCF-7 and SCF-8 continues until an ESC character is detected at register R1. At that point, a binary 1 signal is applied to the reset input of flip-flop 908. However, before the flip-flop changes its state, its binary 1 signal is anded with this reset input by means of an AND gate 914 to set a flip-flop 916. When flip-flop 916 is set, it is indicative of a condition that the authorization field has been detected and the compare results have been loaded into the authorization field flip-flops.

With both flip-flops 900 and 916 being set, the authorization field definer detector AND gate 886 and the $ amount field definer detector AND aget 884 are disabled. Also, AND gate 902 resets flip-flop 880 which, as will be recalled, serves to indicate that the imprint command $X_I$ has been detected and that the circuitry is searching for a $ amount field definer $X_S$ and/or an authorization number field definer $X_A$. AND gate 902 also applies a binary 1 signal through an OR gate 918 to enable one input of an AND gate 920. This AND gate is normally enabled to apply a binary 1 signal to set flip-flop 842. This flip-flop controls energization of the solenoids SOL-1 through SOL-8 for a fixed time period, on the order of 50 milliseconds. This is accomplished by applying the output pulse from AND gate 920 through the OR gate 836 to reset timer 834. The timer will now time a period and then provide a reset pulse on its output line $TT_2$ which is applied to the reset input of flip-flop 842. During the interim period, flip-flop 842 enables all of the AND gates SCA-1 through SCA-8. Binary 1 output signals will be applied from those flip-flops SCF-1 through SCF-8 which have been set to a binary 1 condition to thereby apply an energizing signal to the associated solenoids SOL-1 through SOL-8. The time duration of energizing the solenoids is on the order of 50 milliseconds and this is sufficient for the association solenoid pawls make locking engagement with the associated printing wheels PW-1 through PW-8.

During the time the wheels are being locked in place, the recirculating memory M is stopped. Thus, with flip-flop 842 being set, it enables an AND gate 922. If an imprint command is now detected in register R1, the imprint command output line $X_I$ will carry a binary 1 signal which is applied through AND gate 922 to set a stop memory flip-flop 924. When this flip-flop is set, it applies a binary 1 signal on the read control line RCTL which serves to prevent clock pulses from being applied to the shift input terminals of the registers in the recirculating memory. By doing this, the memory is conditioned so that once the wheels have been locked in place, at the termination of energizing the solenoids, the circuitry will not have to wait to again detect the imprint command $X_I$ in the recirculating memory. Instead, the circuitry is conditioned to immediately begin processing the transaction amount data field and the authorization number data field in the manner discussed above.

The reset pulse $TT_2$ also serves to increment the wheel position counter WPC through AND gate 926 and reset flip-flops 842 and 924. The circuitry is thereby conditioned for making comparisons of the data characters in the transaction amount data field and the authorization number data field for comparison with the next wheel position count.

The energized solenoid flip-flop 842 may also be set even though either or both of the $ amount and authorization number field definers have not been detected to set flip-flops 900 and/or 916. Thus, so long as flip-flop 880 is set in response to detection of an imprint command $X_I$, the circuitry is searching for the $ amount field definer $X_S$ and/or the authorization number field definer $X_A$. When flip-flop 880 is set, it enables an AND gate 930. Upon detection of an imprint command $X_I$ at register R1, AND gate 930 applies a binary 1 signal through OR gate 918 and thence, through the normally enabled AND gate 920 to set flip-flop 842. This function is performed since it is conceivable that the imprinter may be used in an off line environment during which an imprint function is performed in response to the operator actuating the definition key FCT plus the numerical 1 key to write an imprint command into the memory. Since this command is from the keyboard and not from the CPU, there would be no authorization data field in the memory but only a transaction $ field to be used to set up the printing wheels to their correct positions.

During the period that the ESV motor is driving shaft 812, the positioning of the wheels is monitored. This may be accomplished in various ways. In the embodiment illustrated in FIG. 19, each wheel is provided with an annular array of ten apertures AP-0 through AP-9 respectively associated with the 10 numeric printing characters on the wheel. These apertures extend axially through the wheel and are aligned so that when each wheel is located in a printing position, a light beam may be transmitted through aligned apertures in the eight wheels. A light source LSC serves to project a beam through the apertures with the beam being received by a suitable photo transistor 932. As one or more of the wheels is being driven from one printing position to the next, this light beam is broken. Consequently then, if at least one of the printing wheels is driven for a full cycle, the beam will be broken 10 times.

Referring again to FIG. 17, each time light is received by photo transistor 932, it applies a binary 1 signal through an amplifier 934 to disable an AND gate 936 through an inverter 938. During the period that the wheels are being reset, when flip-flop 824 is in its set condition, timer 834 will be reset each time the light beam is broken.

While the light beam is broken, amplifier 934 provides a binary 0 signal which is inverted by an inverted 940 to enable AND gate 920. As will be recalled, AND gate 920 will be enabled after it has detected whether both the $ amount and transaction amount fields have been detected or whether an imprint command has been detected. Each time AND gate 920 is satisfied, it sets the flip-flop 842 to energize the solenoids for a time period on the order of 50 milliseconds. In addition, AND gate 920 also sets a flip-flop 942 which sets up a condition by which the circuitry determines whether all of the printing wheels PW-1 through PW-8 have been locked in a printing position. If so, then the light beam from light source LSC will be transmitted through aligned apertures in the printing wheels and be received by the photo transistor 932 for a time duration indicative that all the wheels have been locked in a printing position. This time duration in the embodiment illustrated is considered to be in the order of 200 milliseconds.

When AND gate 920 sets flip-flop 842, it also resets timer 834. The timer 834 initially times a time duration on the order of 50 milliseconds so that the solenoids may be energized and then resets flip-flop 842. If a light beam is received by photo transistor 932, then amplifier 934 will apply a binary 1 signal to AND gate 944 and this is anded with the output from flip-flop 942. AND gate 944 will now set a flip-flop 946, reset flip-flop 942 and reset timer 834.

With flip-flop 946 being set, the circuitry will now search to determine whether or not all of the wheels are locked in their printing positions. If so, then a time duration on the order of 200 milliseconds as timed by timer 834 will be indicative of this condition. At the end of that time, the timer 834 applies a trigger pulse TT-3 to AND gate 948. Since flip-flop 946 is set, AND gate 948 will now set flip-flop 950. When this flip-flop becomes set, it is indicative that all of the wheels have been locked in their printing positions. This checking circuitry performs this wheel check each time flip-flop 842 is actuated to a set condition to cause energization of the solenoids. If all of the wheels are not locked in place, then at least one of the printing wheels PW-1 through PW-8 will continue to be driven by the ESV motor which will cause flip-flop 946 to be reset before timer 834 can time a sufficient period of time to provide the trigger pulse TT-3. That is, if at least one wheel is still being driven, light from the light source LSC will be broken and amplifier 934 will provide a binary signal which is inverted by inverter 940 to apply a reset pulse to flip-flop 946. This is indicative that all of the wheels are not locked in a printing position and the foregoing operation of indexing the wheels and comparing the wheel count with the decimal value of bits $b_1$ through $b_4$ at register R1 will be continued. If, on the other hand, all of the wheels are locked in position, then AND gate 948 sets flip-flop 950. In addition, AND gate 948 applies trigger pulses to reset flip-flops 840 and 882. When flip-flop 882 is reset, it deenergizes the ESV motor. Also, when flip-flop 840 is reset, it disables AND gate 876 which serves to detect the imprint command $X_I$.

With flip-flop 950 being in its set condition, it energizes the imprint motor 808 to be driven to perform the imprinting function. When this is complete and the platen returns to its home position, the platen home detector 810 provides a trigger pulse to reset flip-flop 950. Proximity detector 810 is schematically illustrated in FIG. 17 as being a simple normally open switch which is closed whenever the platen is in its home position to reset flip-flop 950 and prevent energization of the imprint motor 808. Switch 810 provides a signal only on the return to home position of the platen. The proximity detector provides a pulse to reset flip-flop 822 to lower the bus busy line BBSY.

READING FROM MAIN MEMORY TO EXECUTE PROCESS COMMAND

After the operator has entered a message into the recirculating memory, the process key may be actuated in order to commence transmission of the message to the CPU. In response to actuation of the process key, a process command character $X_P$ is written into the recirculating memory and is preceded by an ESC escape character. If this is the last action performed by the operator, the process command $X_P$ will be followed by two ESC characters in succession. This message format is shown in FIG. 21A. A process command $X_P$ may be written into the memory from another peripheral, preferably the CPU. For example, if the CPU wants the terminal to retransmit a message, then it enters a process command $X_P$ into the terminal memory. The transmitting portion of the communications control circuit CCC2, illustrated in detail in FIG. 20, serves to detect a process command $X_P$ and transmit the message in the memory to the CPU.

Referring now to FIG. 20, it will be noted that the recirculating path for memory RM1 extends through register R1 and R2 previously shown in FIG. 7. The decoder DC serves as a window decoder to decode various characters when shifted through register R1. This decoder serves to provide a binary 1 signal on output line $X_P$ in response to detection of the process command in register R1. Similarly, the decoder has output lines $X_F$, $E_e$, and $e$ which carry binary 1 signals when register R1 is respectively occupied by the field definer command $X_F$ or when two ESCs are respectively located and register R1 and R2 or when one ESC character is located in register R1.

After the decoder DC has detected the process command $X_P$, it institutes an operation which serves to remove the command from the data stream and replace it with a NUL character. The rewritten message is illustrated in FIG. 21B. This is done so that the message will not be retransmitted unless a new process command is received.

When a process command is detected by the decoder DC, a binary 1 signal is applied to an input of an AND gate 1000. If the bus is not busy, an inverter 1002 connected to the bus busy line BBSY applies a binary 1 signal to the other input of this AND gate. The AND gate then applies a binary 1 signal to set flip-flops 1003 and 1004. The output of AND gate 1000 is connected to the read control RCTL input of the peripheral read/write control circuit RWC, illustrated in detail in FIG. 11, to stop memory RM and gain $\phi_S$ clock control. One bit time after the signal to the RCTL line, flip-flop 1004 applies a binary 1 signal to the write control line WCTL, thus selecting write mode 3 as described with reference to FIG. 11. When the read/write control circuit RWC responds with a binary 1 on the R/W-SYNC line, a binary 1 output is obtained from AND gate 1006 which then applies a binary 0 to the DATA IN line through inverter 1008 and AND gate 1007 for the one byte time flip-flop 1004 is set thus replacing the process command $X_P$ with a NUL character. The required $\phi_S$ ENABLE signal is obtained from the output of AND gate 1006. Flip-flop 1004 is reset at the end of this byte time from synchronizing pulse CS8. As will be recalled, a pulse is applied to the synchronizing line CS8 in synchronism with the bit $b_8$ of each eight bit pulse train. By this operation then, the process command $X_P$ has been replaced by an eight bit NUL character.

With the process command $X_P$ being replaced by a NUL character, this portion of the message now appears as shown in FIG. 21B wherein the message characters include an ESC character followed in sequence by a NUL character and two ESC characters. Thereafter, the message may include a plurality of NUL characters prior to the beginning of the actual message information.

In processing this message, the transmission portion of communications control circuit CCC2 will insert a start of header character SOH and a poll identification character PID, in succession, just prior to the ESC character which immediately precedes the fixed data field definer $X_F$. This message format is shown in FIG. 21C. In addition, the communications control circuit also serves to insert a start of text character STX between the end of the fixed data field and the ESC character which immediately precedes the message data. The message data will end with an ESC character followed by a NUL character and two characters added by the communications control. These additional characters include an end of text character ETX followed by a longitudinal redundancy character LRC. Characters ETX and LRC are inserted into the message and used in the communication system for communicating with the CPU. The message format as shown in FIG. 21C is representative of a typical transmission block.

It is contemplated that the terminal will be employed in a system made up of a plurality of terminals all communicating with the CPU and wherein the CPU is provided with means for polling the various terminals. Before the terminal is allowed to transmit its message to the CPU, it must have detected a process command $X_P$ and be polled by the CPU. For purposes of simplicity, the fact that the terminal has been polled is indicated herein by closure of a simple, normally open switch 1020. Closure of this switch, representative that the terminal has been polled, indicates that the terminal may transmit to the CPU and a binary 1 signal is applied to set a flip-flop 1022. However, before the terminal responds to polling, the process command $X_P$ must have been detected and replaced with a NUL character as discussed above followed by detection of the fixed data field definer which will be defined by setting flip-flop 1024. Completion of writing a NUL character over $X_P$ is detected by AND gate 1021 which then sets flip-flop 1023 thus enabling AND gate 1025 to respond to decoding of the fixed data field definer $X_F$. The resultant binary 1 output from AND gate 1025 sets flip-flop 1024 which applies a binary 1 to the read control line RCTL of FIG. 11 to stop memory RM. AND gate 1025 also enables AND gate 1027 to respond to the polling signal as designated by switch 1020. In the illustration given, this stoppage of the memory takes place in response to detection of the fixed data field definer $X_F$ being present in the register R1. Since the fixed data field definer $X_F$ is preceded by an escape character ESC, the escape character is located in register R2. The terminal will now remain in this condition until it receives a polling command from the CPU, illustrated herein by closure of switch 1020.

Flip-flop 1022 is set when the terminal is polled. In addition, this binary 1 signal from switch 1020 through enabled AND gate 1027 is also applied to set a flip-flop 1030 which sets up an operation to insert a start of header character SOH and a poll identification character PID into the data stream immediately ahead of the escape character in register R2. During the period, which amounts to two byte times that these two characters are being inserted in the data stream, shift pulses are not applied to the memory RM1.

When flip-flop 1030 is set, it enables an AND gate 1032. The second input to this AND gate is taken from a transmit clock source in the transmitter AST at transmit bit time $b_8$ and this is represented herein as TR8. Thus, on this synchronizing pulse, the two inputs to AND gate 1032 will be satisfied and this gate will set a flip-flop 1034 and reset flip-flop 1030. When flip-flop 1034 is set, it enables an AND gate 1036 to pass an SOH character generated by an SOH character generator 1038. This generator is clocked by the $\phi_C$ clock source and serves to continuously provide SOH characters although they are not gated through AND gate 1036 until flip-flop 1034 is set. The SOH character is gated through AND gate 1036 and thence, through OR gate 1040, 1042, and 1044. From there, the SOH character together with the data stream following it is applied through conventional asynchronous transmitter AST, which provides the synchronizing pulses TR8, and through modems MO-3 and MO-1 to the CPU. Flip-flop 1034 is reset after one byte time by the synchronizing pulse TR8 through AND gate 1052. AND gate 1052 also sets a flip-flop 1054 which serves to provide a one byte time delay during which the PID character is placed into the data stream immediately behind the SOH character.

When flip-flop 1054 is set, it enables an AND gate 1056 connected to the output of a PID character generator 1058 which, like the SOH character generator 1038, is connected to the $\phi_C$ clock source and serves to continuously provide PID characters. With AND gate 1056 being enabled by flip-flop 1054, a PID character is now gated through OR gates 1040 and 1042 to enter the transmitted data stream immediately behind the SOH character. Flip-flop 1054 is reset after one byte time by a synchronizing pulse TR8 through AND gate 1060. AND gate 1060 also resets flip-flops 1022 and 1024, through AND gate 1061.

When flip-flop 1024 is reset, after insertion of a PID character into the data stream, the signal applied to the read control line RCTL becomes a binary 0 and the memory clock source $\phi_S$ is again applied to the memory by the read/write control circuit RWC as described in FIG. 11. The data in the memory will now be shifted until the ESC character which immediately follows the last fixed data character is located in register R1. The memory is then stopped and a start of text character STX is inserted ahead of the ESC character. This operation is described below.

The memory data, including the ESC character preceding the fixed data field definer character $X_F$, is shifted out of register R2 and thence, through a normally enabled AND gate 1062 and through OR gate 1042 and 1044 to follow the SOH and PID characters in the data stream.

As the fixed data field definer $X_F$ passes through register R1, it is detected by decoder DC which sets a flip-flop 1070 through enabled AND gate 1072, $X_F$ also resets flip-flop 1003.

Decoder DC will now search for the first ESC character following the just detected $X_F$ character. When this happens, decoder DC provides a binary 1 signal on its $e$ line to reset flip-flop 1070. However, before the flip-flop is reset, its binary 1 output and the binary 1 output from line $e$ of decoder DC are anded through an AND gate 1074 to set a flip-flop 1076. This flip-flop serves to provide a one byte time delay to permit the last character in the fixed data field to be transmitted before stopping memory to insert STX into the message as illustrated in FIG. 21C.

During the byte time flip-flop is set, the ESC character in register R1 is shifted to register R2. At that point, flip-flop 1076 is reset by a synchronizing pulse CS8. Before flip-flop 1076 changes state, its output and the synchronizing pulse CS8 and synchronizing pulse TR8 are anded through an AND gate 1078 to set a flip-flop 1080.

When flip-flop 1080 is set, a binary 1 is applied to the RCTL line through OR gate 1009 to stop the memory clock $\phi_S$. This stops the memory. When flip-flop 1080 is set, it enables an AND gate 1085 connected to the output of a start of text generator 1086. This generator operates in a manner similar to that of generators 1038 and 1058 discussed hereinbefore in that it is connected to the $\phi_C$ clock source and serves to continuously provide an STX character pulse train, although the character is not available until AND gate 1085 is enabled. With AND gate 1085 being enabled, the start text character STX is applied through the AND gate and thence, through OR gates 1042 and 1044 so that the character is inserted into the pulse train immediately behind the last data character in the fixed data pulse train. Flip-flop 1080 is reset by a synchronizing pulse TR8 to disable AND gate 1085 and remove the binary 1 from the RCTL line shift pulses from clock source $\phi_S$ are again applied to the recirculating memory.

The data in the recirculating memory is again shifted bit by bit and the remaining portion of the message which follows the fixed data is outputted from register R2 through normally enabled AND gate 1062 and thence, through OR gates 1042 and 1044. This outputted data will include all of the message through the ESC character and the NUL character which replaced the $X_P$ process command. Two ESC characters in succession follow the NUL character. These two ESC characters are not transmitted to the CPU. Instead, they are replaced in succession by an end of text character ETX and a longitudinal redundancy character LRC. This is implemented by the circuitry described below.

When two ESC characters are respectively located in registers R1 and R2, decoder DC provides a binary 1 signal on its output circuit $E_e$. This binary 1 signal is applied to said flip-flop 1088 which then disables AND gate 1062 through an inverter 1090. When flip-flop 1088 is set, it enables a normally disabled AND gate 1091 connected to the output of an end of text character generator 1092. This generator operates in the same fashion as generators 1038, 1058, and 1086 described hereinbefore. Thus, this generator is connected to the $\phi_C$ clock source and serves to continuously provide ETX characters, although the characters are not available unless AND gate 1091 is enabled. When AND gate 1091 is enabled, an ETX character is applied through OR gates 1042 and 1044. This takes place for one byte time and at the end of that period, flip-flop 1088 is reset by a synchronizing pulse TR8. This also causes flip-flop 1094 to be set through an AND gate 1095. When flip-flop 1094 is set, it disables AND gate 1062 through inverter 1096 to prevent data from being outputted from register R2 through AND gate 1062. Instead, a longitudinal redundancy character LRC is sent. The LRC character is obtained from a conventional LRC checking and character generating circuit 1098. This circuit serves to continuously monitor the data stream as it is outputted through OR gate 1042 and then generates the proper LRC character when flip-flop 1094 is set. This LRC character is then outputted through OR gate 1044 following the ETX character. At the end of this byte time, flip-flop 1094 is reset from a synchronizing pulse TR8 through an AND gate 1099.

When AND gate 1061 resets flip-flop 1024 as previously discussed, it also sets flip-flop 1063 to provide the transmit signal to the asynchronous transmitter AST. Flip-flop 1063 is then reset from AND gate 1099 after the LRC character has been transmitted.

When the communications control is transmitting data as defined by flip-flop 1024, data that is to be transmitted from main memory RM-1 is clocked out at the transmit rate $\phi_{TR}$ obtained from transmitter AST. AND gate 1037 is enabled by flip-flop 1063 to pass transmit clock pulses $\phi_{TR}$ to the $\phi_S$ ENABLE line through normally enabled AND gate 1039. AND gate 1039 is disabled whenever one of the communications control characters SOH, PID, STX, ETX or LRC is being transmitted. The output of AND gate 1062 is a binary 0 whenever one of these characters is being transmitted thus it is applied to disable AND gate 1039.

CLEAR LAST FIELD

A clear last field command $X_{CF}$ is entered into the memory from the keyboard by activating the delete key. This command may also be entered into the memory from a peripheral, such as the CPU. When this command is detected in memory, an operation is initiated by which the data characters in the last field entered as well as the associated field definer are deleted from memory. As will be developed below, the last field entered is deleted character by character in the inverse order in which the characters were entered into the memory. By this operation, only the last field and its field definer are deleted from the memory and not the entire message. It is contemplated that this function may be used when operator notes, from the visual display readout, that a mistake was made in the data entered from the keyboard. in such case, the operator will simply depress the delet key and thereby cause the last entered data field and its field definer to be cleared from the memory so that he may enter the correct data.

The circuitry by which the clear last field function is accomplished is shown in detail in FIG. 22. Before examining the circuitry employed, attention is now directed to a hypothetical example of a message which has been entered into the memory. This message may take the format as shown in FIG. 23 and include data fields 1100, 1102 and 1104. The first data field is the fixed data field and is preceded by an ESC character and fixed data field definer $X_F$. The second data field shown is entered from a card reader. The third data field 1104 represents the keyboard entered data and includes an ESC character, a dollar amount character $X_S$ followed by numeric characters in the order 1, 2, 3, 5. It is contemplated that data entered from the keyboard will be displayed for the operator to check its accuracy. Assume then, that the operator had intended to enter a dollar amount of numeric characters of 1-2-4-5, and upon looking at the visual display readout, he notes that he has mistakenly entered the dollar amount 1-2-3-5. At this point then, the operator actuates the delete key. By doing so, an ESC character followed by a delete command character $X_{CF}$ are entered into the memory and then, since no additional data is entered, the $X_{CF}$ command character is followed by two ESC characters, indicating end of message. The circuitry of FIG. 22 performs a delete function by which the last entered field is deleted from memory so that when the operation is completed, the message in memory will appear as shown in FIG. 24. As shown there, the message would include data fields 1100 and 1102 followed by two ESC characters, indicating end of message. The operator may now enter a new dollar amount from the keyboard by entering a field definer $X_S$ and the correct numeric characters 1- 2-4-5.

Reference is now made to FIG. 22. When the decoder DC decodes the clear last field command $X_{CF}$ in register R1, it provides a binary 1 output signal on its output line $X_{CF}$. This signal is applied through a normally enabled AND gate 1106 and thence, through an OR gate 1108 to set a flip-flop 1110. AND gate 1106 is normally enabled by a flip-flop 1112 which is normally in a set condition. The binary 1 signal which was passed through AND gate 1106 upon detection of the clear last field command is also applied to reset flip-flop 1112. However, this requires one bit time to be effected and before the flip-flop changes state, its binary 1 output signal is anded with the binary 1 signal from output line $X_{CF}$ through AND gate 1106 to set flip-flop 1110.

When flip-flop 1110 is set, it applies a binary 1 signal through OR gate 1114 to disable multiplexer AND gates 64, 78 and 86 through respectively associated inverters 76, 85 and 92. As shown in FIG. 22, AND gate 64 serves as the normal data transfer path with data being transferred from register R1 to register R2. Similarly, AND gate 78 serves as the normal data transmission path from register R2 to register R3. Similarly, AND gate 86 serves as the normal transmission path for data being transferred from register R3 to the first input register state R4 of the static shift register SSH.

The output of OR gate 1114 which disables AND gates 64, 78, and 86, also enables AND gates 82 and 88. Flip-flop 1110 will keep these gates enabled or disabled as just described for one byte time. During the interim byte time, the data character in register R1 is bypassed around register R2 through AND gate 82 and to register R3. Similarly, the data character in register R2 is bypassed around register R3 through AND gate 88 and OR gate 930 into the first stage R4 of the static shift register SSH. Since AND gate 64 is disabled, a NUL character is clocked into register R2 during this byte time. In addition, the output from OR gate 1114 is also applied through another OR gate 1136 which disables AND gate 50, in multiplexer M-1, through an inverter 58. AND gate 50 is the normal transmission path for data characters from the last output register stage $R_0$ of the static shift register SSH to the register R1. Consequently, when AND gate 50 is disabled a NUL character is clocked into register R1.

From the foregoing, it is seen that during the first byte time that flip-flop 1110 is in its set condition, the data character in register R1 is transferred to register R3 and the data character in register R2 is transferred to the first stage R4 in the static shift register SSH. Also, a NUL character is written into each of registers R1 and R2.

Reference is now made to FIG. 25 which presents a table illustrating this operation. The status at the time the clear last field command $X_{CF}$ was detected in register R1 is shown for the data characters stored in registers R0, R1, R2, R3, R4 and R5. The clear last field command $X_{CF}$ is detected at register R1 and is preceded by an ESC character in register R2, a numeric character 5 in register R3, a numeric character 3 in register R4, and a numeric character 2 in register R5. During the byte time that flip-flop 1110 is in a set condition, the bypassing operation just described is operative. At the end of that byte time, NUL characters have been written into registers R1 and R2 and the $X_{CF}$ character is register R1 has been transferred to register R3. The ESC character in register R2 has been transferred to register R4. It is important to note here that numeric character 5 in register R3 has been deleted from the memory. Consequently then, during this first pass of the message including the clear last field command $X_F$, the last data character, i.e., numeric character 5, in the last data field entered, i.e., data field 1104, has been deleted from the memory and the message length has now been shortened by one data character.

As shown in FIG. 25, during a second recirculation of the data through the recirculation path, the clear last field command $X_{CF}$ is detected when located in register R1 and the characters in registers R2, R3, R4, and R5 are respectively the ESC character, the numeric 3 character, the numeric 2 character and the numeric 1 character. Since the command character $X_{CF}$ has been detected and decoded by decoder DC, flip-flop 1110 will again be set for one byte time. This controls the gates in the multiplexers associated with the recirculation path registers so that the data characters are again shifted and bypassed or are replaced with NUL characters in the manner described before. Consequently, after the second recirculation of the data, registers R0 through R5 will be occupied by the characters as shown in FIG. 25. It will be noted that the message has been shortened by deletion of the last numeric character i.e., numeric character 3. This same operation continues as shown in FIG. 25 during the third pass of data, the fourth pass of data, and the fifth pass of data. On the completion of the fifth pass or recirculation of data, the amount transaction field definer $X_s$ is deleted from the message. Also, it will be noted that the message has closed up to the point that the ESC character at the beginning of data field 1104 and the ESC character just prior to the clear last field command $X_{CF}$ have been brought together to form two successive ESC characters. The message still contains the clear last field command $X_{CF}$. During the next recirculation of data, the clear last field command $X_{CF}$ will be replaced by a NUL character and the operation for deleting the last entered field will have been completed.

Referring again to FIG. 22, it is seen that when flip-flop 1110 is set in response to detection of the clear last field command $X_{CF}$, it serves to enable an AND gate 1140. The inputs of this AND gate are satisfied at the end of the byte time by a synchronizing pulse CS8 to set flip-flop 1142 before flip-flop 1110 changes state. Flip-flop 1142 will be in a set condition for one byte time and then be reset through AND gate 1144 by the next synchronizing pulse which is anded with the output from flip-flop 1142. During the byte time that flip-flop 1142 is set, it applies a binary 1 signal through OR gate 1136 to disable AND gate 50. During the byte time that AND gate 50 is disabled, a NUL character is clocked into register R1 with the shift pulses from clock source $\phi_S$. When the synchronizing pulse CS8 is applied to reset flip-flop 1142, it also sets a flip-flop 1146 through AND gate 1149. Flip-flop 1146 serves to condition or enable AND gate 1148 to provide a binary 1 output signal upon detection of an end of message designation in the form of two ESC characters in succession by decoder DC. When this condition is detected, decoder DC provides a binary 1 signal on its $E_e$ output line.

Flip-flop 1146 serves to check whether the clear last field command $X_{CF}$ is still in memory. Thus, while flip-flop 1146 is set, it enables an AND gate 1150. Each time decoder DC detects a clear last field command $X_{CF}$, it applies a binary 1 signal through AND gate 1150 to set flip-flop 1110 as well as to reset flip-flop 1146 through an OR gate 1152. Consequently then, as long as a clear last field command $X_{CF}$ is in memory and an end of message designation (ESC) (ESC) has not been detected, the circuitry will recycle to continuously delete the last character in the last field entered.

Reference is now made to the example provided in FIG. 25. After the fifth recirculation of data, only the clear last field command $X_{CF}$ is in memory and is preceded by two ESC characters. On the sixth pass or recirculation of data, decoder DC will provide a binary 1 signal on its output line $E_e$ indicative that ESC characters are located in register R1 and R2. Since flip-flop 1146 was set, AND gate 1148 has both inputs satisfied and produces a binary 1 signal which sets a flip-flop 1154. This binary 1 signal is also applied through OR gate 1136 to disable AND gate 50 in multiplexer M1. During the next byte time, while flip-flop 1154 is in its set condition, a NUL character is clocked into register R1 instead of the $X_{CF}$ command. At the end of this byte time, a synchronizing pulse CS8 is anded with the output from flip-flop 1154 through an AND gate 1156 to reset flip-flop 1154. Before flip-flop 1154 changes state, the synchronizing pulse CS8 is anded with the output of flip-flop 1154 through an AND gate 1158 to set flip-flop 1112 through OR gate 1160. It will be recalled that flip-flop 1112 is normally in a set condition to enable AND gate 1106 to commence the clear last field operation upon detection of a clear last field command $X_{CF}$.

From the above description, it is seen that detection of the clear last field command $X_{CF}$ institutes an operation by which the last data field and associated field definer is deleted from the memory by successively deleting the last character in the data field with each recirculation of the data. It is to be noted that this operation continues regardless of the length of the data field being deleted until the circuitry detects that the field definer for that data field has also been deleted. This is the last step and then the circuitry deletes the $X_{CF}$ command.

We claim:
1. A data entry terminal comprising:
content addressable memory means for storing a variable length message comprised of data characters entered therein and including at least one variable character length data field and a field separator;

data entry means for entering a said message into said memory means so that said message includes at least one said variable character length data field and a said field separator;

means for outputting a said message from said memory means in such a manner that the data characters are outputted in a series sequence in the order in which they were entered into said memory means and such that a said field separator precedes the first entered character in an associated variable character length data field;

means for re-entering a said outputted message into said memory means and including controllable gating means for passing data characters to be re-entered into said memory means in a said series sequence;

message modifying means for deleting from a said outputted message the data characters in the last entered data field in repsonse to a clear command signal and including gate control means for controlling said controllable gating means to prevent re-entry of the last entered character in the last entered data field each time a said outputted message is re-entered into said memory means and independently of the character length of said data field until all of said data characters in said data field have been deleted from said message.

2. A data entry terminal as set forth in claim 1 wherein said terminal includes circuit means defining a series transmission path with said outputting means and said re-entering means, said transmission path normally having a first character length for storing at any one point in time a fixed number of said outputted data characters, said message modifying means including means for selectively shortening the length of said transmission path by at least one character length.

3. A data entry terminal as set forth in claim 2, wherein said data transmission path includes a plurality of character storage registers connected in series for sequentially storing said outputted data characters, a plurality of said controllable gating means each being interposed between two successive character storage registers, said gate control means including means for controlling selected ones of said controllable gating means to prevent a data character in a first of said registers from being transferred to a second of said registers through a said controllable gating means.

4. A data entry terminal as set forth in claim 3, including register bypassing means for connecting the output of one of said registers with the input of another of said registers while bypassing an intermediate one of said registers so that data stored in said one register is transferred to said second register while bypassing said intermediate register.

5. A terminal as set forth in claim 4, wherein said bypassing circuit means includes a normally disabled data entry gating means and wherein said gate control means includes means for selectively enabling a said normally disabled gating means for passing the said data character in said one register to said another register.

6. A data entry terminal as set forth in claim 2, wherein said data transmission path includes a plurality of shift registers for sequentially storing a like plurality of said outputted data characters in said series sequence with said registers being interposed between said outputting means and said re-entering means, at least one controllable intermediate gating means interposed between successive ones of said plurality of shift registers for normally passing a data character from the immediately preceding shift register into the immediately succeeding shift register;

register bypassing circuit means for bypassing at least one of said shift registers and including gating means for connecting the output of a preceding shift register means with the input of a succeeding shift register means while bypassing at least one intermediate shift register means;

said gate control means including circuit means for controlling said plurality of intermediate gating means and said bypass circuit gating means for effectively varying the length of said data transmission path.

7. A data entry terminal as set forth in claim 6, including a second register bypass path, said gate control means including means for selectively controlling said gating means in each of said register bypassing circuits.

8. A data entry terminal as set forth in claim 7, including circuit means for connecting the second register bypassing circuit means with the output of a said shift register bypassed by said first register bypassing circuit means.

9. A data entry terminal as set forth in claim 2, wherein said transmission path interconnects said outputting means and said re-entering means to define a recirculating path between the input of said memory means and the output thereof to thereby define a recirculating memory means, said recirculating memory means being comprised of static shift registers for sequentially shifting said characters in said series sequence from register to register in synchronism with shift pulses applied to said registers.

10. A data entry terminal as set forth in claim 9, wherein said recirculating memory means is comprised of a plurality of bit serial shift register means for shifting said data characters in said series sequence, each said data character being comprised of a plurality of bits with the bits of each charcter being shifted in series sequence with the most significant bit being shifted first.

11. A data entry terminal comprising;

content addressable memory means for storing a variable length message comprised of data characters entered therein and including at least one variable character length data field and a field separator;

data entry means for entering a said message into said memory means so that said message includes at least one said variable character length data field and a said field separator;

means for outputting a said message from said memory means in such a manner that the data characters are outputted in a series sequence in the order in which they were entered into said memory means and such that a said field separator precedes the first entered character in an associated variable character length data field;

means for re-entering a said outputted message into said memory means and including controllable gating means for passing data characters to be re-entered into said memory means in a said series sequence;

message modifying means for deleting from a said outputted message the data characters in the last entered data field in response to a clear command signal and including gate control means for selectively controlling said re-entry gating means to prevent re-entry of the last entered character in the last entered data field each time a said outputted message is re-entered into said memory means and independently of the character length of said data field until all of said data characters in said data field have been deleted from said message; said terminal includes circuit means defining a series transmission path with said outputting means and said re-entering means, said transmission path normally having a first character length for storing at any one point in time a fixed number of said outputted data characters, said message modifying means including means for selectively shortening the length of said transmission path by at least one character length, said transmission path interconnects said outputting means and said re-entering means to define a recirculating path between the input of said memory means and the output thereof to thereby define a recirculating memory means, said recirculating memory means being comprised of static shift registers for sequentially shifting said characters in said series sequence from register to register in synchronism with shift pulses applied to said registers, decoding means for decoding specific data characters shifted through a specific one of said registers, said specific data characters being respectively representative of an end of message indicator and a said clear command, each said indicator and each said command being defined by at least one coded multibit data character, said decoding means providing an output clear command signal in response to decoding a said clear command and a said end of message signal in response to decoding a said end of message indicator, said message modifying means including circuit means responsive to a said clear command signal for instituting operation to clear the data characters from the last entered data field and its associated field definer, and circuit means responsive to a said end of message signal indicative that said clearing operation has been completed.

12. A data entry terminal as set forth in claim 11, wherein said circuit means responsive to a said end of message signal includes circuit means deleting said clear command from said message.

13. A data entry terminal as set forth in claim 11, wherein said terminal includes circuit means for automatically entering a said end of message indicator into said memory means after each data character is entered into said memory means and circuit means for entering data characters into said memory means so as to effectively be written over the end of message indicator entered after the preceding data characters.

14. A data entry terminal comprising:
content addressable memory means for storing a variable length message comprised of data characters entered therein and including at least one variable character length data field and a field separator;
data entry means for entering a said message into said memory means so that said message includes at least one said variable character length data field and a said field separator;
means for outputting a said message from said memory means in such a manner that the data characters are ouputted in a series sequence in the order in which they were entered into said memory means and such that a said field separator precedes the first entered character in an associated variable character length data field;
means for re-entering a said outputted message into said memory means and including controllable means for passing data characters to be re-entered into said memory means in a said series sequence;
message modifying means for deleting from a said outputted message the data characters in the last entered data field in response to a clear command signal and including control means for selectively controlling said reentry means to prevent re-entry of the last entered character in the last entered data field each time a said outputted message is re-entered into said memory means and independently of the character length of said data field until all of said data characters in said data field have been deleted from said message, said data entry means including means for entering a clear command into said memory means wherein said clear command includes at least one multibit character, and decoding means for decoding said outputted data for the presence of a said clear command and providing a said clear command signal in accordance therewith.

* * * * *

UNITED STATES PATENT AND TRADEMARK OFFICE
CERTIFICATE OF CORRECTION

PATENT NO. : 3,905,022
DATED : September 9, 1975
INVENTOR(S) : John Patrick Klosky, James Lucian Maynard It is certified that error appears in the above–identified patent and that said Letters Patent are hereby corrected as shown below:

Column 59, line 19, change "repsonse" to -- response --. Column 61, line 49, after "means" insert -- for --. Column 62, line 35, change "reentry" to -- re-entry --.

Signed and Sealed this

Eighth Day of February 1977

[SEAL]

Attest:

RUTH C. MASON
*Attesting Officer*

C. MARSHALL DANN
*Commissioner of Patents and Trademarks*